(12) United States Patent
Barin et al.

(10) Patent No.: US 11,512,146 B2
(45) Date of Patent: *Nov. 29, 2022

(54) CHARGE-BEARING CYCLODEXTRIN POLYMERIC MATERIALS AND METHODS OF MAKING AND USING SAME

(71) Applicant: CycloPure, Inc., Encinitas, CA (US)

(72) Inventors: Gokhan Barin, Skokie, IL (US); Jason M. Spruell, Encinitas, CA (US); Moira Brown, Chicago, IL (US); Shan Li, Des Plaines, IL (US)

(73) Assignee: CycloPure, Inc., Encinitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/481,919

(22) Filed: Sep. 22, 2021

(65) Prior Publication Data

US 2022/0017645 A1 Jan. 20, 2022

Related U.S. Application Data

(63) Continuation of application No. 17/174,688, filed on Feb. 12, 2021, now Pat. No. 11,155,646, which is a
(Continued)

(51) Int. Cl.
| | |
|---|---|
| C08G 18/76 | (2006.01) |
| C08L 5/16 | (2006.01) |
| C08B 31/00 | (2006.01) |
| B01J 20/26 | (2006.01) |
| C02F 1/28 | (2006.01) |
| B01J 20/28 | (2006.01) |

(Continued)

(52) U.S. Cl.
CPC .......... *C08B 31/006* (2013.01); *B01J 20/267* (2013.01); *B01J 20/28054* (2013.01); *C02F 1/285* (2013.01); *C08B 37/0012* (2013.01); *C08G 18/7621* (2013.01); *C08L 5/16* (2013.01); *B01J 20/28057* (2013.01); *C02F 2101/36* (2013.01); *C02F 2303/04* (2013.01)

(58) Field of Classification Search
None
See application file for complete search history.

(56) References Cited

U.S. PATENT DOCUMENTS

| | | | |
|---|---|---|---|
| 3,426,011 A | 2/1969 | Parmerter et al. | |
| 3,453,257 A | 7/1969 | Parmerter et al. | |

(Continued)

FOREIGN PATENT DOCUMENTS

| | | | |
|---|---|---|---|
| CN | 1352199 A | 6/2002 | |
| CN | 1658888 A | 8/2005 | |

(Continued)

OTHER PUBLICATIONS

Alsbaiee et al., Rapid removal of organic micropollutants from water by a porous beta-cyclodextrin polymer; Nature vol. 529, pp. 190-194. Dec. 21, 2015.

(Continued)

*Primary Examiner* — Clare M Perrin
(74) *Attorney, Agent, or Firm* — Cooley LLP

(57) ABSTRACT

The present disclosure relates to charge-bearing polymeric materials and methods of their use for purifying fluid samples from micropollutants, such as anionic micropollutants.

30 Claims, 14 Drawing Sheets

Related U.S. Application Data continuation of application No. 16/830,726, filed on Mar. 26, 2020, now Pat. No. 11,001,645, which is a continuation of application No. PCT/US2020/018149, filed on Feb. 13, 2020.

(60) Provisional application No. 62/805,505, filed on Feb. 14, 2019.

(51) Int. Cl.
  *C08B 37/16* (2006.01)
  *C02F 101/36* (2006.01)

(56) References Cited

U.S. PATENT DOCUMENTS

| | | | |
|---|---|---|---|
| 3,453,258 | A | 7/1969 | Parmerter et al. |
| 3,453,259 | A | 7/1969 | Parmerter et al. |
| 3,453,260 | A | 7/1969 | Parmerter et al. |
| 3,459,731 | A | 8/1969 | Gramera et al. |
| 3,553,191 | A | 1/1971 | Parmerter et al. |
| 3,565,887 | A | 2/1971 | Parmerter et al. |
| 4,535,152 | A | 8/1985 | Szejtli et al. |
| 4,565,727 | A | 1/1986 | Giglia et al. |
| 4,616,008 | A | 10/1986 | Hirai et al. |
| 4,638,058 | A | 1/1987 | Brandt et al. |
| 4,678,598 | A | 7/1987 | Ogino et al. |
| 4,746,734 | A | 5/1988 | Tsuchiyama et al. |
| 5,183,809 | A | 2/1993 | Weisz et al. |
| 5,262,404 | A | 11/1993 | Weisz et al. |
| 5,488,021 | A | 1/1996 | DeLiso et al. |
| 5,496,649 | A | 3/1996 | Mallory et al. |
| 6,444,723 | B1 | 9/2002 | Kline |
| 6,881,712 | B2 | 4/2005 | Angell et al. |
| 9,828,458 | B2 | 11/2017 | Suri et al. |
| 11,001,645 | B2 | 5/2021 | Barin et al. |
| 11,155,646 | B2 | 10/2021 | Barin et al. |
| 2001/0008222 | A1 | 7/2001 | Ma et al. |
| 2005/0154198 | A1 | 7/2005 | Trotta et al. |
| 2005/0262646 | A1 | 12/2005 | Berlinger |
| 2006/0067965 | A1 | 3/2006 | Chandra et al. |
| 2010/0311905 | A1 | 12/2010 | Mentink et al. |
| 2014/0178457 | A1 | 6/2014 | Travaglini et al. |
| 2015/0004389 | A1 | 1/2015 | Corinti et al. |
| 2015/0273389 | A1 | 10/2015 | Liu et al. |
| 2015/0361595 | A1 | 12/2015 | Keane et al. |
| 2016/0304630 | A1 | 10/2016 | Dichtel et al. |
| 2016/0370357 | A1* | 12/2016 | Lucas ............ G01N 1/405 |
| 2017/0222458 | A1 | 8/2017 | Chang et al. |
| 2018/0186939 | A1 | 7/2018 | Blanchemain et al. |
| 2019/0015814 | A1 | 1/2019 | Trabolsi et al. |
| 2019/0375858 | A1 | 12/2019 | Xie et al. |
| 2020/0071530 | A1 | 3/2020 | Birkeland |
| 2020/0398252 | A1 | 12/2020 | Ma et al. |
| 2021/0163631 | A1 | 6/2021 | Barin et al. |

FOREIGN PATENT DOCUMENTS

| | | |
|---|---|---|
| CN | 101733009 A | 6/2010 |
| CN | 107376875 A | 11/2017 |
| CN | 107709251 A | 2/2018 |
| CN | 107709441 A | 2/2018 |
| CN | 108554387 A | 9/2018 |
| CN | 108579689 A | 9/2018 |
| CN | 109046280 A | 12/2018 |
| CN | 109053932 A | 12/2018 |
| JP | 2013233473 A | 11/2013 |
| WO | WO-2016172118 A1 | 10/2016 |
| WO | WO-2018200857 A1 | 11/2018 |
| WO | WO-2020073674 A1 | 4/2020 |

OTHER PUBLICATIONS

Alzate-Sanchez et al. "Cotton Fabric Functionalized with a-Cyclodextrin Polymer Captures Organic Pollutants from Contaminated Air and Water," Chem. Mater. 2016, 28, 8340-8346.

Barry et al., "Perfluorooctanoic Acid (PFOA) Exposures and Incident Cancers Among Adults Living Near a Chemical Plant," Environ. Health Perspect. 2013, 121(11-12):1313-1318.

Barzen-Hanson et al., "Discovery of 40 Classes of Per- and Polyfluoroalkyl Substances in Historical Aqueous Film-Forming Foams (AFFFs) and AFFF-Impacted Groundwater," Environ. Sci. Technol. 2017, 51, 2047-2057.

Carpenter et al., "Widespread Micropollutant Monitoring in the Hudson River Estuary Reveals Spatiotemporal Micropollutant Clusters and Their Sources," Environ. Sci. Technol. 2018, 52, 6187-6196.

D'Agostino et al., "Certain Perfluoroalkyl and Polyfluoroalkyl Substances Associated With Aqueous Film Forming Foam Are Widespread in Canadian Surface Waters," Environ. Sci. Technol. 2017, 51, 13603-13613.

Diamanti-Kandarakis, E. et al., "Endocrine-Disrupting Chemicals: An Endocrine Society Scientific Statement," Endocr. Rev. 2009, 30, 293-342.

F. Diedaini-Pilard and B. Perly, "Optimal Performances with Minimal Chemical Modification of Cyclodextrins", The 7th International Cyclodextrin Symposium Abstracts, p. 49 (Apr. 1994).

Gallo et al., "Serum Perfluorooctanoate (PFOA) and Perfluorooctane Sulfonate (PFOS) Concentrations and Liver Function Biomarkers in a Population With Elevated PFOA Exposure," Environ. Health Perspect. 2012, 120, 655-660.

Hu et al., "Detection of Poly- and Perfluoroalkyl Substances (PFASs) in U.S. Drinking Water Linked to Industrial Sites, Military Fire Training Areas, and Wastewater Treatment Plants," Environ. Sci. Technol. Lett. 2016, 3, 344-350.

International Search Report and Written Opinion issued by the International Searching Authority for Application No. PCT/US2020/018149, dated Apr. 20, 2020, 10 pages.

Ji et al., "Removal of GenX and Perfluorinated Alkyl Substances from Water by Amine-Functionalized Covalent Organic Frameworks," Am. Chem. Soc. 2018, 140, 12677-12681.

Kleme et al., "Phenolation of cyclodextrin polymers controls their lead and organic micropollutant adsorption," Chem. Sci. 2018, 9, 8883-8889.

Li et al., "Phenolation of cyclodextrin polymers controls their lead and organic micropollutant adsorption," J. Chromatogr. A 2018, 1541, 52-56.

Ling et al., "Benchmarking Micropollutant Removal by Activated Carbon and Porous-Cyclodextrin Polymers Under Environmentally Relevant Scenarios," Environ. Sci. Technol. 2017, 51, 7590-7598.

Mason et al, "Enhancement of CO2 Affinity in a Polymer of Intrinsic Microporosity by Amine Modification," Macromolecules 2014, 47:1021-1029.

Melzer, et al., "Association Between Serum Perfluorooctanoic Acid (PFOA) and Thyroid Disease in the U.S. National Health and Nutrition Examination Survey," Environ. Health Perspect. 2010, 118, 686-692.

Richardson et al., "Water Analysis: Emerging Contaminants and Current Issues," Anal. Chem. 2018, 90, 398-428.

Sun et al., "Legacy and Emerging Perfluoroalkyl Substances Are Important Drinking Water Contaminants in the Cape Fear River Watershed of North Carolina," Environ. Sci. Technol. Lett. 2016, 3, 415-419.

Tetreault et al., "Intersex and Reproductive Impairment of Wild Fish Exposed to Multiple Municipal Wastewater Discharges," Toxicol. 2011, 104, 278-290.

Xiao et al., "Cross-linker Chemistry Determines the Uptake Potential of Perfluorinated Alkyl Substances by β-Cyclodextrin Polymers," Macromolecules 52(10):3747-3752 (2019).

Xiao et al., "β-Cyclodextrin Polymer Network Sequesters Perfluorooctanoic Acid at Environmentally Relevant Concentrations," J. Am. Chem. Soc. 139:7689-7692 (2017).

Office Action issued by the Chinese Patent Office for Application No. 202080005776.6, dated Nov. 11, 2021, 28 pages including English translation.

(56) References Cited

OTHER PUBLICATIONS

Research on Rural Water Environment Ecological Management Model, First Edition, Liangping Deng et al., pp. 77-78, Yellow River Water Conservation Press.
Fan D., et al., "Research on β-Cyclodextrin Cross-Linked Polymers Removing Chlorobenzene and Nitrobenzene in Micro-Polluted Water", Environmental Science & Technology, Dec. 1, 20105, pp. 258-260.

* cited by examiner

Fig. 1

| % Removal in 0.5 h | Crosslinker | GenX | PFBA | PFHxA | PFHpA | PFOA | PFNA | PFDA | PFUnA | PFDoA | PFBS | PFHxS | PFOS |
|---|---|---|---|---|---|---|---|---|---|---|---|---|---|
| SL-0420-3 | 4,4'-MDI | 0% | 6% | 18% | 19% | 29% | 41% | 63% | 80% | 83% | 16% | 29% | 62% |
| SL-0420-4 | 4,4'-MDI | -8% | 0% | 1% | 3% | 0% | 2% | 1% | -3% | -16% | -9% | -5% | -10% |
| SL-1-010A | 2,4-TDI | 4% | 8% | 21% | 33% | 70% | 89% | 96% | 97% | 90% | 22% | 63% | 96% |
| SL-1-010B | 2,4-TDI | 7% | 9% | 12% | 14% | 9% | 15% | 18% | 22% | 26% | 7% | 8% | 3% |
| MB-1-036 | TFN+CC | 74% | 68% | 80% | 82% | 83% | 85% | 89% | 90% | 91% | 86% | 89% | 91% |
| MB-1-037 | TFN+CC | 94% | 101% | 95% | 96% | 96% | 95% | 94% | 91% | 88% | 96% | 96% | 92% |

| % Removal in 48 h | Crosslinker | GenX | PFBA | PFHxA | PFHpA | PFOA | PFNA | PFDA | PFUnA | PFDoA | PFBS | PFHxS | PFOS |
|---|---|---|---|---|---|---|---|---|---|---|---|---|---|
| SL-0420-3 | 4,4'-MDI | 8% | 9% | 14% | 34% | 76% | 96% | 98% | 98% | 89% | 33% | 64% | 98% |
| SL-0420-4 | 4,4'-MDI | -13% | -7% | 4% | 4% | 4% | -3% | -111% | -203% | 5% | -7% | -1% | -46% |
| SL-1-010A | 2,4-TDI | 8% | 6% | 13% | 38% | 87% | 99% | 100% | 99% | 93% | 6% | 69% | 99% |
| SL-1-010B | 2,4-TDI | 6% | 8% | 14% | 17% | 19% | 23% | -69% | -249% | -75% | 14% | 19% | -7% |
| MB-1-036 | TFN+CC | 97% | 88% | 99% | 99% | 99% | 99% | 99% | 98% | 93% | 99% | 99% | 98% |
| MB-1-037 | TFN+CC | 99% | 106% | 99% | 99% | 99% | 99% | 98% | 94% | 83% | 99% | 99% | 98% |

Fig. 2
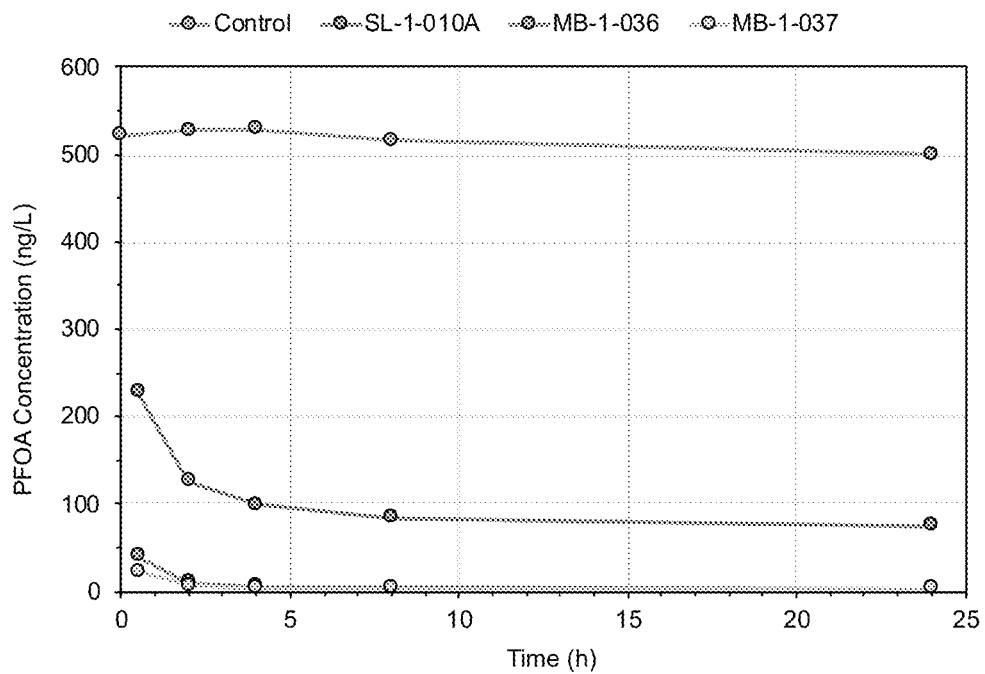
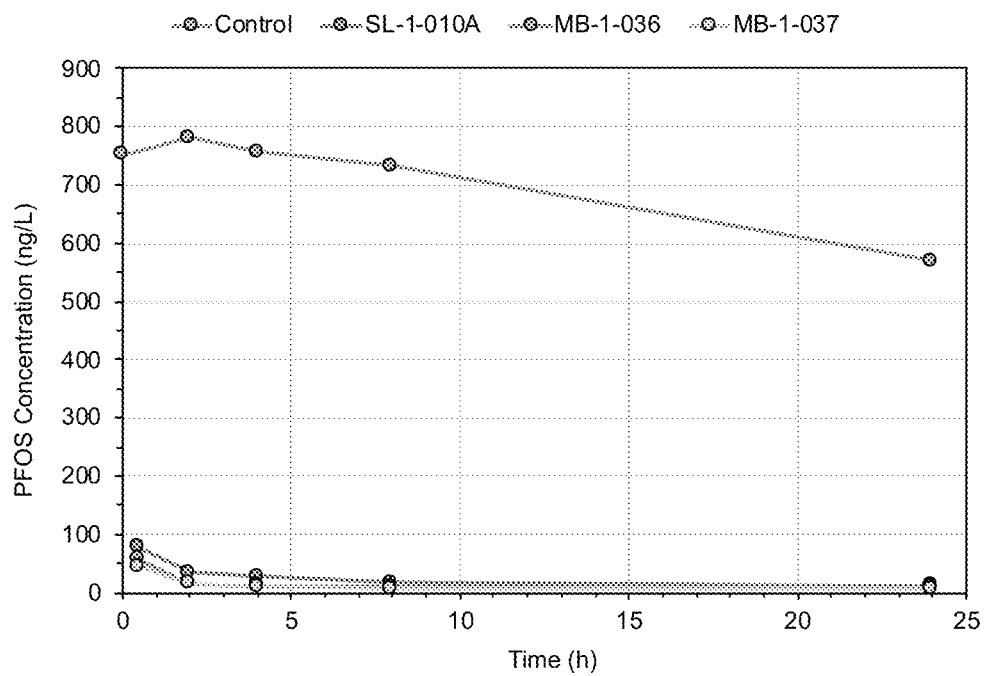

Fig. 3
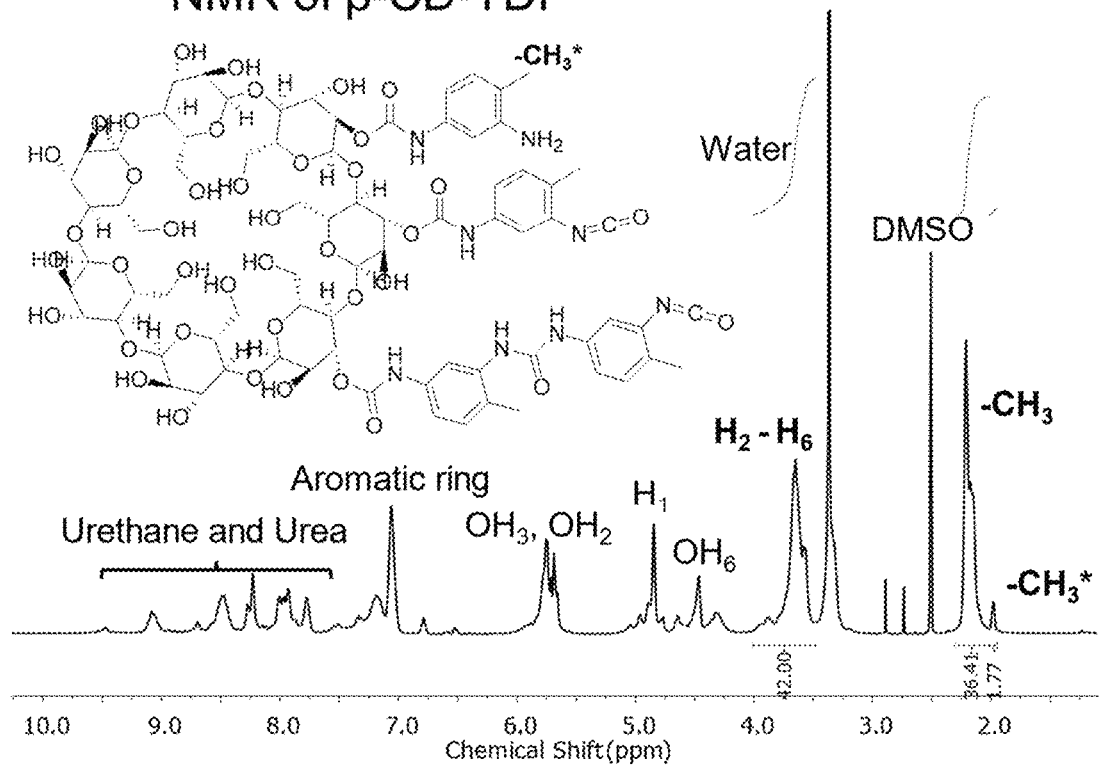
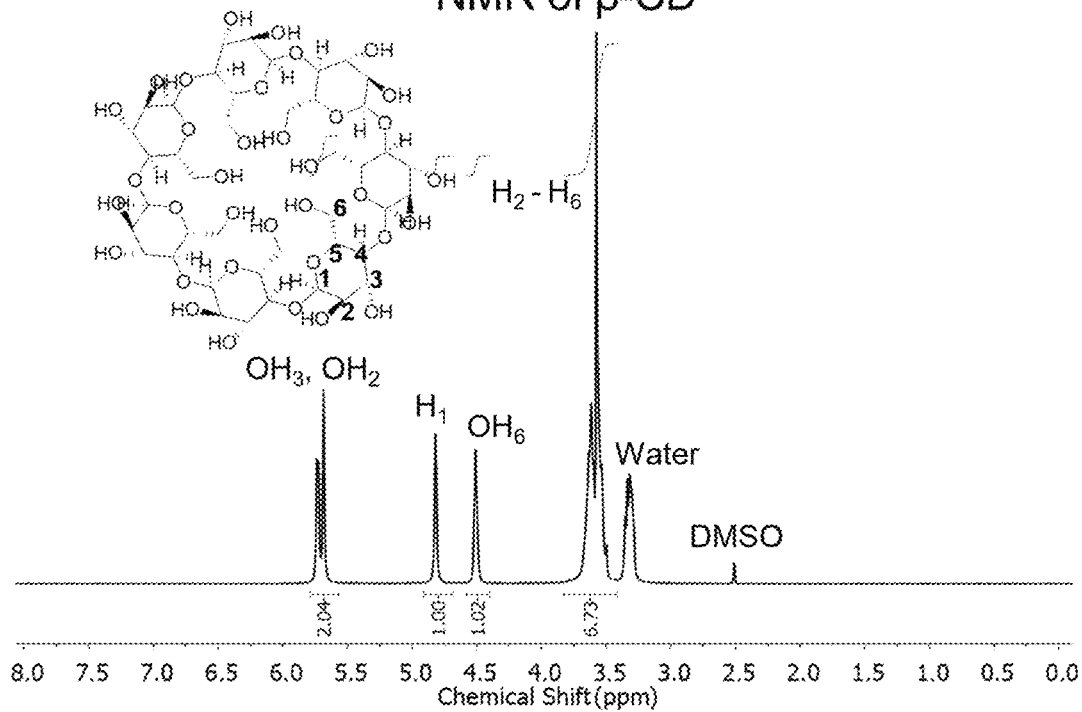

Fig. 7
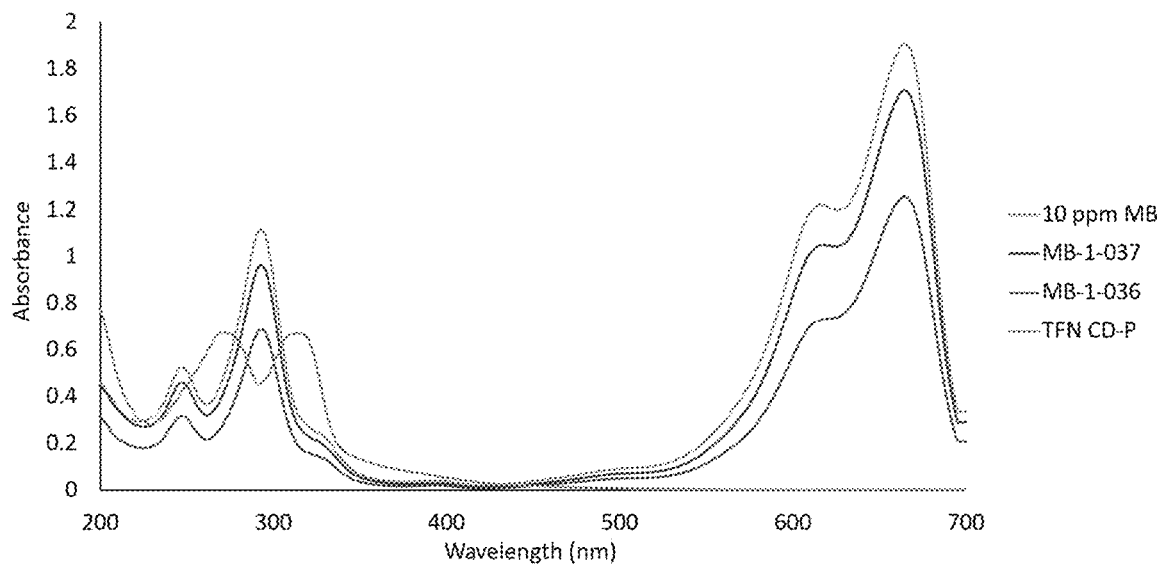
Methylene blue uptake
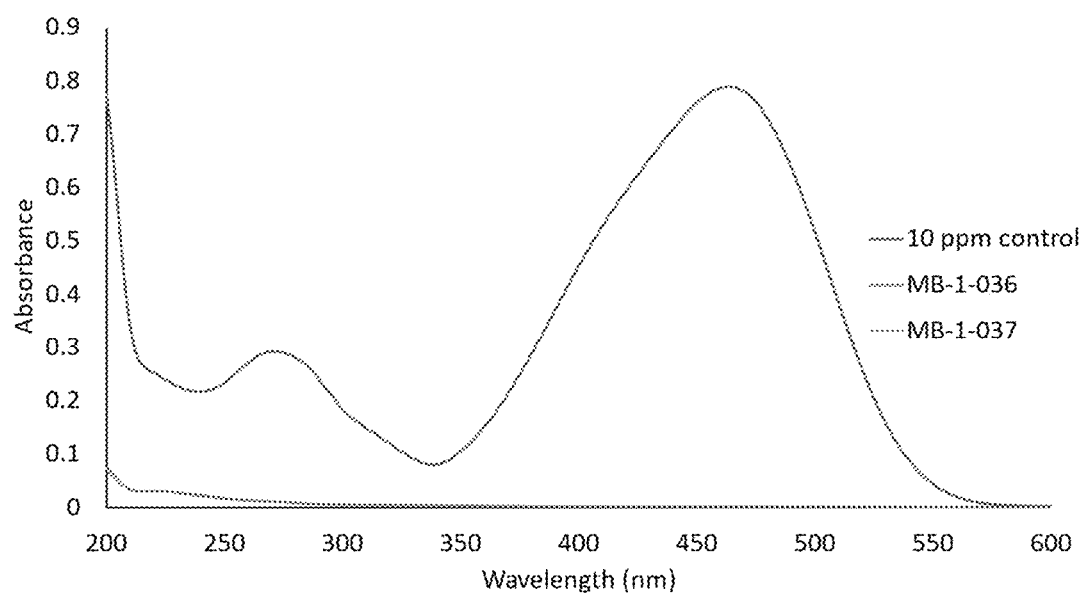
Methyl orange uptake

CHARGE-BEARING CYCLODEXTRIN POLYMERIC MATERIALS AND METHODS OF MAKING AND USING SAME

CROSS REFERENCE TO RELATED APPLICATIONS

This application is a Continuation of application Ser. No. 17/174,688, filed Feb. 12, 2021, which is a Continuation of application Ser. No. 16/830,726, filed Mar. 26, 2020 (now U.S. Pat. No. 11,001,645), which is a Continuation of International Application No. PCT/US2020/018149, filed Feb. 13, 2020, which claims the benefit of priority to U.S. Provisional Application No. 62/805,505, filed Feb. 14, 2019, each of which is hereby incorporated by reference in its entirety.

BACKGROUND

Organic micropollutants (MPs) are present in water resources at ng $L^{-1}$ to µg $L^{-1}$ concentrations as a consequence of human activities.[1,2] Concerns about their negative effects on human health[3-7] and the environment[8-10] motivate the development of technologies that remove MPs more effectively.[11-16] MPs span a wide variety of physiochemical properties including surface charge, size, and chemical functionality. Charged MPs can be cationic, anionic, or zwitterionic and are typically difficult to remove in the presence of complex matrix constituents like natural organic matter (NOM) using conventional adsorption methods like activated carbon. Of the anionic MPs, PFASs present a particular environmental problem because of their resistance to biodegradation and correlation to negative health effects. PFASs have been used in the formulations of thousands of consumer goods[1] and are present in aqueous foam formulations used to suppress aviation fires in training scenarios.[18,19] As a result, they have contaminated surface and ground waters near thousands of airports and military installations.[20] In 2016, Hu and coworkers showed that at least 6 million Americans were served drinking water contaminated with PFASs at or above the US EPA's 2016 health advisory limit for perfluorooctanoic acid (PFOA) and perfluorooctanesulfonic acid (PFOS) of 70 ng $L^{-1}$.[21] PFASs have been linked to cancers,[3] liver damage,[4] thyroid disease[5] and other health problems.[6]

Contaminated water systems are typically remediated with granular activated carbon (GAC), but its modest affinity for PFASs, particularly short chain derivatives, makes it an expensive and stop-gap solution.[23,24] In recent reports,[14,15] it was discovered that noncovalent interactions and the electrostatics of functional groups influence PFAS affinity to adsorbents. For example, a combination of fluorophilic interactions of the crosslinker and a lower concentration of anionic charged functional groups in decafluorobiphenyl-linked CDPs led to high PFOA and PFOS removal from water. In contrast, CDPs crosslinked by epichlorohydrin exhibited inferior PFAS removal.[25]

Adsorption processes can be employed to remove specific contaminants or contaminant classes from fluids like air and water. Activated carbons (ACs) are the most widespread sorbents used to remove organic pollutants, and their efficacy derives primarily from their high surface areas, nanostructured pores, and hydrophobicity. However, no single type of AC removes all contaminants well, particularly anionic MPs. Because of their poorly defined structure and binding site variation, optimal adsorption selectivities require empirical screening at new installations, precluding rational design and improvement. Furthermore, regenerating spent AC is energy intensive (heating to 500-900° C. or other energy intensive procedures) and does not restore full performance. AC also has a slow pollutant uptake rate, achieving its uptake equilibrium in hours to days, such that more rapid contaminant removal requires excess sorbent. Finally, AC can perform poorly for many emerging contaminants, particularly those that are relatively hydrophilic.

An alternative adsorbent material can be made from polymeric cyclodextrin materials produced from insoluble polymers of β-cyclodextrin (β-CD), which are toroidal macrocycles comprised of seven glucose units whose internal cavities are capable of binding organic compounds. β-CD is an inexpensive and sustainably produced monomer derived from cornstarch that is used extensively to formulate and stabilize pharmaceuticals, flavorants, and fragrances, as well as within chiral chromatography stationary phases. Insoluble β-CD polymers have been formed by crosslinking with epichlorohydrin and other reactive compounds, and feature well defined binding sites and high association constants. Insoluble β-CD polymers crosslinked with epichlorohydrin have been investigated as alternatives to AC for water purification, but their low surface areas result in inferior sorbent performance relative to ACs.

Thus there is a need for new sorbents that address the deficiencies of AC and the like and which will provide more effective sorption and/or sequestration properties for MPs (such as anionic MPs). There is a need for an adsorbent that provides rapid anionic MP extraction, high total uptake, and facile regeneration and reuse procedures. This invention meets those needs.

SUMMARY

In some embodiments, the present disclosure provides a porous polymeric material comprising a plurality of cyclodextrins crosslinked with a plurality of crosslinks comprising formula (I):

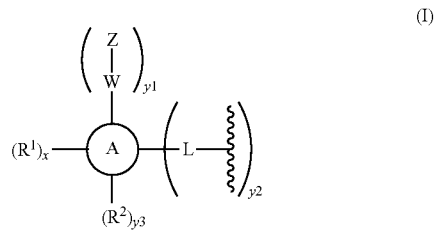

wherein
A is an aryl or heteroaryl moiety;
each $R^1$ is independently selected from the group consisting of H, $C_1$-$C_6$ alkyl, $C_1$-$C_3$ haloalkyl, aryl, heteroaryl, —$CF_3$, —$SO_3H$, —CN, —$NO_2$, —$NH_2$, —NCO, —$C(O)_2R^3$, —$C(O)N(R^3)_2$, and -halogen;
each $R^2$ is independently H, —OH, —O-metal cation, alkyl, aryl, heteroaryl, —SH, —S-metal cation, —S-alkyl, —$C(O)_2H$, or —$C(O)NH_2$;
each $R^3$ is independently —H, —$C_1$-$C_6$ alkyl, —$C_1$-$C_3$ haloalkyl, -aryl, —$C(O)N(R^a)(R^b)$, —$C(O)R^c$, —$CO_2R^c$, —$SO_2N(R^a)(R^b)$, or —$SOR^c$, and each $R^a$ and $R^b$ is independently H, or $C_1$-$C_6$ alkyl.
each W is independently a bond, an alkylene group, an arylene group, a heteroarylene group, —O-arylene-, —$(CH_2)_a$-arylene-, —$SO_2$-arylene-, —NH-arylene-, —S-arylene-, —O— heteroarylene-, —$(CH_2)_a$-heteroarylene-, —SO$_2$-heteroarylene-, —NH-heteroarylene-, —S-heteroarylene-, —(—O—(CH$_2$)$_a$—)$_x$—, —(—NH—(CH$_2$)$_a$—)$_x$—, —(—S—(CH$_2$)$_a$—)$_x$—,

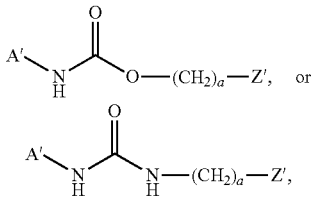

or wherein a is 0-100 and x is 1-100, and each arylene or heteroarylene moiety can be substituted or unsubstituted;

each Z is a cationic moiety or an anionic moiety;

each L is independently a linking moiety selected from the group consisting of —O—, —S—, —N—, $C_1$-$C_6$ substituted or unsubstituted alkylene, $C_1$-$C_3$ haloalkylene,

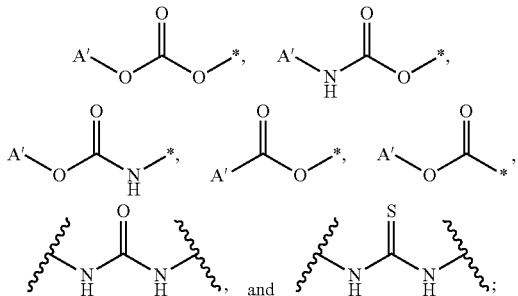

and

A' is a covalent bond to A;

Z' is a covalent bond to Z;

* is a covalent bond to ⌇;

⌇ is a point of attachment to the plurality of cyclodextrin carbon atoms;

x is 0-8;

$y_1$ is 1-4;

$y_2$ is 1-4; and $y_3$ is 0-4.

In some embodiments, the crosslinks of the porous polymeric material comprise formula (II):

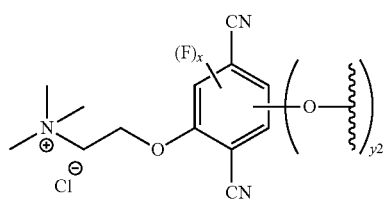

(II)

wherein $y_2$ is 1 or 2; and x is 1 or 2.

In some embodiments, the porous polymeric material of the present disclosure comprises a plurality of linkers of formula (III).

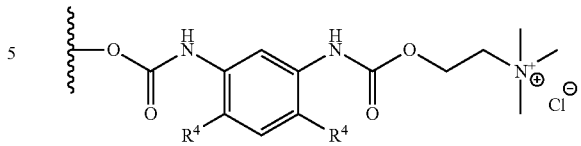

(III)

wherein one $R^4$ is —H and one $R^4$ is -Me.

In some embodiments, the present disclosure provides a supported porous polymeric material comprising porous particles affixed to a solid substrate, wherein said porous particles comprise a plurality of cyclodextrin moieties with a plurality of crosslinks comprising formula (I), (II), or (III).

In some embodiments, the present disclosure provides a method of purifying a fluid sample comprising one or more pollutants, the method comprising contacting the fluid sample with the porous polymeric material or the supported porous polymeric material of the present disclosure whereby at least 50 wt. % of the total amount of the one or more pollutants in the fluid sample is adsorbed by the porous polymeric material.

In some embodiments, the present disclosure provides a method of removing one or more compounds from a fluid sample or determining the presence or absence of one or more compounds in a fluid sample comprising: a) contacting the sample with the porous polymeric material or the supported porous polymeric material of the present disclosure for an incubation period; b) separating the porous polymeric material or supported porous polymeric material after the incubation period from the sample; and c) heating the porous polymeric material or supported porous polymeric material separated in step b), or contacting the porous polymeric material or supported porous polymeric material separated in step b) with a solvent, thereby releasing at least a portion of the compounds from the porous polymeric material or supported porous polymeric material; and d1) optionally isolating at least a portion of the compounds released in step c); or d2) determining the presence or absence of the compounds released in step c), wherein the presence of one or more compounds correlates to the presence of the one or more compounds in the sample.

In some embodiments, the present disclosure provides an article of manufacture comprising the porous polymeric material or the supported porous polymeric material of the present disclosure.

BRIEF DESCRIPTION OF THE DRAWINGS

FIG. 1 shows a comparison of PFAS uptake capability of polymers of the present disclosure at 0.5 hours (top) and 48 hours (bottom).

FIG. 2 shows a comparison between two choline chloride-modified TFN-CDP polymers and a β-CD-TDI polymer for PFOA uptake (top) and PFOS uptake (bottom).

FIG. 3 shows a $^1$H NMR spectrum for β-CD-TDI polymer (top) and β-CD (bottom).

FIG. 7 shows choline-chloride modified β-CD-TFN uptake studies performed with methylene blue (top) and methyl orange (bottom).

DETAILED DESCRIPTION

Figure 4:
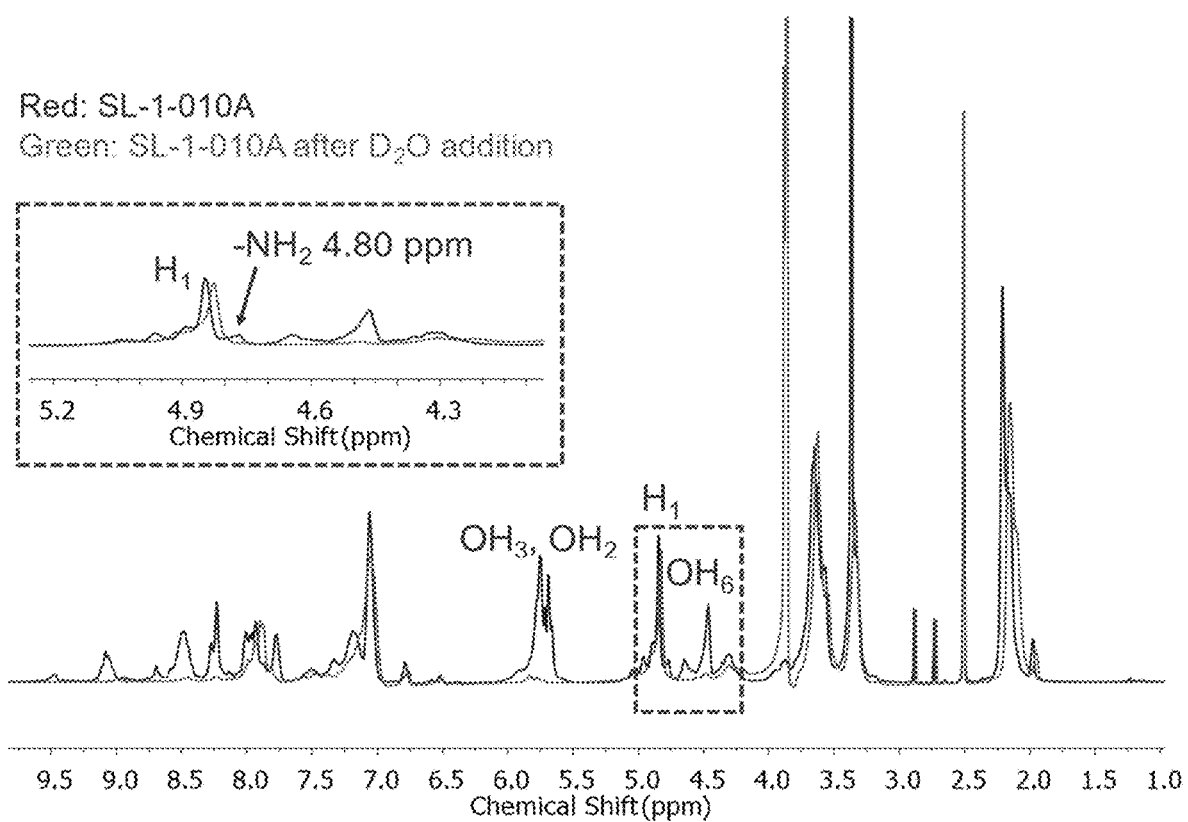
FIG. 4 shows the change in the $^1$H NMR spectrum of β-CD-TDI polymer upon addition of $D_2O$.

All documents cited herein are incorporated by reference in their entirety for all purposes to the same extent as if each individual document was specifically and individually indicated to be incorporated by reference.

As used above, and throughout this disclosure, the following terms, unless otherwise indicated, shall be understood to have the following meanings. If a term is missing, the conventional term as known to one skilled in the art controls.

As used herein, the terms "including," "containing," and "comprising" are used in their open, non-limiting sense.

The articles "a" and "an" are used in this disclosure to refer to one or more than one (i.e., to at least one) of the grammatical object of the article. By way of example, "an element" means one element or more than one element.

The term "and/or" is used in this disclosure to mean either "and" or "or" unless indicated otherwise.

To provide a more concise description, some of the quantitative expressions given herein are not qualified with the term "about". It is understood that, whether the term "about" is used explicitly or not, every quantity given herein is meant to refer to the actual given value, and it is also meant to refer to the approximation to such given value that would reasonably be inferred based on the ordinary skill in the art, including equivalents and approximations due to the experimental and/or measurement conditions for such given value. Whenever a yield is given as a percentage, such yield refers to a mass of the entity for which the yield is given with respect to the maximum amount of the same entity that could be obtained under the particular stoichiometric conditions. Concentrations that are given as percentages refer to mass ratios, unless indicated differently.

The term adsorbent or adsorb is used to refer to compositions or methods of the present disclosure to refer to solid materials as described herein which remove contaminants or pollutants, typically but not exclusively organic molecules, from a fluid medium such as a liquid (e.g., water) or a gas (e.g., air or other commercially useful gases such as nitrogen, argon, helium, carbon dioxide, anesthesia gases, etc.). Such terms do not imply any specific physical mechanism (e.g., adsorption vs. absorption).

The term "cyclodextrin" includes any of the known cyclodextrins such as unsubstituted cyclodextrins containing from six to twelve glucose units, especially, alpha-cyclodextrin, beta-cyclodextrin, gamma-cyclodextrin and/or their derivatives and/or mixtures thereof. The alpha-cyclodextrin consists of six glucose units, the beta-cyclodextrin consists of seven glucose units, and the gamma-cyclodextrin consists of eight glucose units arranged in donut-shaped rings. The specific coupling and conformation of the glucose units give the cyclodextrins rigid, conical molecular structures with hollow interiors of specific volumes. The "lining" of each internal cavity is formed by hydrogen atoms and glycosidic bridging oxygen atoms; therefore, this surface is fairly hydrophobic. The unique shape and physical-chemical properties of the cavity enable the cyclodextrin molecules to absorb (form inclusion complexes with) organic molecules or parts of organic molecules which can fit into the cavity.

Unless otherwise stated, the terms "crosslinker" or "crosslink" or "linker" refer to a monomer capable of reacting with or forming a covalent linkage between one or more cyclodextrins or polymers. For example, if the crosslinker reacts at the end of a polymer chain, it may covalently react with one cyclodextrin moiety of the polymer (e.g. via the glycosidic oxygen of the cyclodextrin). The crosslinker may or may not further react with other monomers or cyclodextrin units or polymer chains to, for example, extend a polymer chain or link two or more polymer chains together. For example the crosslinker may be bound to 1, 2, 3, or 4+ monomers or cyclodextrin units or polymers.

The term "cationic moiety" refers to a group which carries a positive charge (e.g. +1, +2, etc.), for example, ammonium, mono-, di- or trialkylammonium, dialkylsulfonium and trialkylphosphonium.

The term "anionic moiety" refers to a group which carries a negative charge (e.g. −1, −2, etc.), for example, phosphate, carboxylate, alkoxide, and sulfate.

As used herein, "alkyl" means a straight chain or branched saturated chain having from 1 to 10 carbon atoms. Representative saturated alkyl groups include, but are not limited to, methyl, ethyl, n-propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, n-pentyl, isopentyl, neopentyl, n-hexyl and the like, and longer alkyl groups, such as heptyl, and octyl and the like. An alkyl group can be unsubstituted or substituted. Alkyl groups containing three or more carbon atoms may be straight, or branched. As used herein, "lower alkyl" means an alkyl having from 1 to 6 carbon atoms.

The term "alkylene" refers to straight- and branched-chain alkylene groups. Typical alkylene groups include, for example, methylene (—CH$_2$—), ethylene (—CH$_2$CH$_2$—), propylene (—CH$_2$CH$_2$CH$_2$—), isopropylene (—CH(CH$_3$)CH$_2$—), n-butylene (—CH$_2$CH$_2$CH$_2$CH$_2$—), sec-butylene (—CH(CH$_2$CH$_3$)CH$_2$—) and the like.

The term "hydroxyl" or "hydroxy" means an OH group;

It should also be noted that any carbon as well as heteroatom with unsatisfied valences in the text, schemes, examples and Tables herein is assumed to have the sufficient number of hydrogen atom(s) to satisfy the valences.

The term "halo" or "halogen" refers to fluorine, chlorine, bromine, or iodine.

The term "cyano" as used herein means a substituent having a carbon atom joined to a nitrogen atom by a triple bond, i.e., C≡N.

The term "amine" or "amino" as used herein means a substituent containing at least one nitrogen atom. Specifically, $NH_2$, —NH(alkyl) or alkylamino, —N(alkyl)$_2$ or dialkylamino, amide, carboxamide, urea, and sulfamide substituents are included in the term "amino".

Unless otherwise specifically defined, the term "aryl" refers to cyclic, aromatic hydrocarbon groups that have 1 to 3 aromatic rings, including monocyclic or bicyclic groups such as phenyl, biphenyl or naphthyl. Where containing two aromatic rings (bicyclic, etc.), the aromatic rings of the aryl group may be joined at a single point (e.g., biphenyl), or fused (e.g., naphthyl). Furthermore, in the context of the present disclosure, the term aryl is taken to refer to two aryl rings joined by a short linker such as —$CH_2$—, $CR_2$— (where R can be H, alkyl, etc.), —$SO_2$—, —SO—, —NR— (where R can be H, alkyl, etc.), or —O—; for example, aryl may refer to methylene diphenyl or oxybisphenyl respectively). The aryl group may be optionally substituted by one or more substituents, e.g., 1 to 5 substituents, at any point of attachment. The substituents can themselves be optionally substituted. Furthermore when containing two fused rings the aryl groups herein defined may have an unsaturated or partially saturated ring fused with a fully saturated ring. Exemplary ring systems of these aryl groups include, but are not limited to, phenyl, biphenyl, naphthyl, anthracenyl, phenalenyl, phenanthrenyl, indanyl, indenyl, tetrahydronaphthalenyl, tetrahydrobenzoannulenyl, and the like.

Unless otherwise specifically defined, "heteroaryl" means a monovalent monocyclic or polycyclic aromatic radical of 5 to 18 ring atoms or a polycyclic aromatic radical, containing one or more ring heteroatoms selected from N, O, or S, the remaining ring atoms being C. Heteroaryl as herein defined also means a polycyclic (e.g., bicyclic) heteroaromatic group wherein the heteroatom is selected from N, O, or S. The aromatic radical is optionally substituted independently with one or more substituents described herein. The substituents can themselves be optionally substituted. Examples include, but are not limited to, benzothiophene, furyl, thienyl, pyrrolyl, pyridyl, pyrazinyl, pyrazolyl, pyridazinyl, pyrimidinyl, imidazolyl, isoxazolyl, oxazolyl, oxadiazolyl, pyrazinyl, indolyl, thiophen-2-yl, quinolyl, benzopyranyl, isothiazolyl, thiazolyl, thiadiazolyl, thieno[3,2-b]thiophene, triazolyl, triazinyl, imidazo[1,2-b]pyrazolyl, furo[2,3-c]pyridinyl, imidazo[1,2-a]pyridinyl, indazolyl, pyrrolo[2,3-c]pyridinyl, pyrrolo[3,2-c]pyridinyl, pyrazolo[3,4-c]pyridinyl, benzoimidazolyl, thieno[3,2-c]pyridinyl, thieno[2,3-c]pyridinyl, thieno[2,3-b]pyridinyl, benzothiazolyl, indolyl, indolinyl, indolinonyl, dihydrobenzothiophenyl, dihydrobenzofuranyl, benzofuran, chromanyl, thiochromanyl, tetrahydroquinolinyl, dihydrobenzothiazine, dihydrobenzoxanyl, quinolinyl, isoquinolinyl, 1,6-naphthyridinyl, benzo[de]isoquinolinyl, pyrido[4,3-b][1,6]naphthyridinyl, thieno[2,3-b]pyrazinyl, quinazolinyl, tetrazolo[1,5-a]pyridinyl, [1,2,4]triazolo[4,3-a]pyridinyl, isoindolyl, pyrrolo[2,3-b]pyridinyl, pyrrolo[3,4-b]pyridinyl, pyrrolo[3,2-b]pyridinyl, imidazo[5,4-b]pyridinyl, pyrrolo[1,2-a]pyrimidinyl, tetrahydropyrrolo[1,2-a]pyrimidinyl, 3,4-dihydro-2H-1$\lambda^2$-pyrrolo[2,1-b]pyrimidine, dibenzo[b,d]thiophene, pyridin-2-one, furo[3,2-c]pyridinyl, furo[2,3-c]pyridinyl, 1H-pyrido[3,4-b][1,4]thiazinyl, benzooxazolyl, benzoisoxazolyl, furo[2,3-b]pyridinyl, benzothiophenyl, 1,5-naphthyridinyl, furo[3,2-b]pyridine, [1,2,4]triazolo[1,5-a]pyridinyl, benzo [1,2,3]triazolyl, imidazo[1,2-a]pyrimidinyl, [1,2,4]triazolo[4,3-b]pyridazinyl, benzo[c][1,2,5]thiadiazolyl, benzo[c][1,2,5]oxadiazole, 1,3-dihydro-2H-benzo[d]imidazol-2-one, 3,4-dihydro-2H-pyrazolo[1,5-b][1,2]oxazinyl, 4,5,6,7-tetrahydropyrazolo[1,5-a]pyridinyl, thiazolo[5,4-d]thiazolyl, imidazo[2,1-b][1,3,4]thiadiazolyl, thieno[2,3-b]pyrrolyl, 3H-indolyl, and derivatives thereof. Furthermore when containing two fused rings the heteroaryl groups herein defined may have an unsaturated or partially saturated ring fused with a fully saturated ring.

Numerical ranges, as used herein, are intended to include sequential integers unless indicated otherwise. For example, a range expressed as "from 0 to 5" would include 0, 1, 2, 3, 4 and 5.

The present disclosure provides porous (e.g. microporous or mesoporous), typically high surface area cyclodextrin polymeric materials (P-CDPs), as well as methods of making and using these materials. The P-CDPs are comprised of insoluble polymers of cyclodextrin, which is an inexpensive, sustainably produced macrocycle of glucose. The cyclodextrin polymers are crosslinked with linking groups as described herein. The polymers of cyclodextrin are comprised of cyclodextrin moieties that are derived from cyclodextrins. The cyclodextrin moiety(s) can be derived from naturally occurring cyclodextrins (e.g., α-, β-, and γ-, comprising 6, 7, and 8 glucose units, respectively) or synthetic cyclodextrins. The cyclodextrin moiety has at least one —O— bond derived from an —OH group on the cyclodextrin from which it is derived. The cyclodextrin moieties can comprise 3-20 glucose units, including 3, 4, 5, 6, 7, 8, 9, 10, 11, 12, 13, 14, 15, 16, 17, 18, 19, and 20 glucose units, inclusive of all ranges therebetween. In many embodiments, the cyclodextrin moieties are derived from starch, and comprise 6-9 glucose units. The polymeric materials may comprise two or more different cyclodextrin moieties. In particular embodiments, the P-CDP is comprised of insoluble polymers of β-cyclodextrin (β-CD).

The P-CDP can also comprise cyclodextrin derivatives or modified cyclodextrins. The derivatives of cyclodextrin consist mainly of molecules wherein some of the OH groups are converted to OR groups. The cyclodextrin derivatives can, for example, have one or more additional moieties that provide additional functionality, such as desirable solubility behavior and affinity characteristics. Examples of suitable cyclodextrin derivative materials include methylated cyclodextrins (e.g., RAMEB, randomly methylated β-cyclodextrins), hydroxyalkylated cyclodextrins (e.g., hydroxypropyl-β-cyclodextrin and hydroxypropyl-γ-cyclodextrin), acetylated cyclodextrins (e.g., acetyl-γ-cyclodextrin), reactive cyclodextrins (e.g., chlorotriazinyl-β-CD), branched cyclodextrins (e.g., glucosyl-β-cyclodextrin and maltosyl-β-cyclodextrin), sulfobutyl-β-cyclodextrin, and sulfated cyclodextrins. For example, the cyclodextrin moiety further comprises a moiety that binds (e.g., with specificity) a metal such as arsenic, cadmium, copper, or lead.

The P-CDP can also comprise cyclodextrin derivatives as disclosed in U.S. Pat. No. 6,881,712 including, e.g., cyclodextrin derivatives with short chain alkyl groups such as methylated cyclodextrins, and ethylated cyclodextrins, wherein R is a methyl or an ethyl group; those with hydroxyalkyl substituted groups, such as hydroxypropyl cyclodextrins and/or hydroxyethyl cyclodextrins, wherein R is a —$CH_2$—CH(OH)—$CH_3$ or a $^-CH_2CH_2$—OH group; branched cyclodextrins such as maltose-bonded cyclodextrins; cationic cyclodextrins such as those containing 2-hydroxy-3-(dimethylamino)propyl ether, wherein R is $CH_2$—CH(OH)—$CH_2$—$N(CH_3)_2$ which is cationic at low pH; quaternary ammonium, e.g., 2-hydroxy-3-(trimethylammonio)propyl ether chloride groups, wherein R is $CH_2$—CH(OH)—$CH_2$—$N^+(CH_3)_3Cl^-$; anionic cyclodextrins such as carboxymethyl cyclodextrins, cyclodextrin sulfates, and cyclodextrin succinylates; amphoteric cyclodextrins such as carboxymethyl/quaternary ammonium cyclodextrins; cyclodextrins wherein at least one glucopyranose unit has a 3-6-anhydro-cyclomalto structure, e.g., the mono-3-6-anhydrocyclodextrins, as disclosed in "Optimal Performances with Minimal Chemical Modification of Cyclodextrins", F. Diedaini-Pilard and B. Perly, The 7th International Cyclodextrin Symposium Abstracts, April 1994, p. 49 said references being incorporated herein by reference; and mixtures thereof. Other cyclodextrin derivatives are disclosed in U.S. Pat. No. 3,426,011, Parmerter et al., issued Feb. 4, 1969; U.S. Pat. Nos. 3,453,257; 3,453,258; 3,453,259; and 3,453,260, all in the names of Parmerter et al., and all issued Jul. 1, 1969; U.S. Pat. No. 3,459,731, Gramera et al., issued Aug. 5, 1969; U.S. Pat. No. 3,553,191, Parmerter et al., issued Jan. 5, 1971; U.S. Pat. No. 3,565,887, Parmerter et al., issued Feb. 23, 1971; U.S. Pat. No. 4,535,152, Szejtli et al., issued Aug. 13, 1985; U.S. Pat. No. 4,616,008, Hirai et al., issued Oct. 7, 1986; U.S. Pat. No. 4,678,598, Ogino et al., issued Jul. 7, 1987; U.S. Pat. No. 4,638,058, Brandt et al., issued Jan. 20, 1987; and U.S. Pat. No. 4,746,734, Tsuchiyama et al., issued May 24, 1988; all of said patents being incorporated herein by reference.

In some embodiments, the present disclosure provides a porous polymeric material comprising a plurality of cyclodextrins crosslinked with a plurality of crosslinks comprising formula (I):

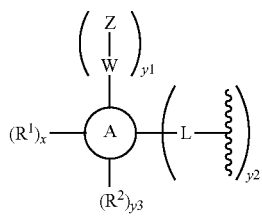
(I)

wherein

A is an aryl or heteroaryl moiety;

each $R^1$ is independently selected from the group consisting of H, $C_1$-$C_6$ alkyl, $C_1$-$C_3$ haloalkyl, aryl, heteroaryl, —$CF_3$, —$SO_3H$, —CN, —$NO_2$, —$NH_2$, —NCO, —$C(O)_2R^3$, —$C(O)N(R^3)_2$, and -halogen;

each $R^2$ is independently H, —OH, —O-metal cation, alkyl, aryl, heteroaryl, —SH, —S-metal cation, —S-alkyl, —$C(O)_2H$, or —$C(O)NH_2$;

each $R^3$ is independently —H, —$C_1$-$C_6$ alkyl, —$C_1$-$C_3$ haloalkyl, -aryl, —$C(O)N(R^a)(R^b)$, —$C(O)R^c$, —$CO_2R^c$, —$SO_2N(R^a)(R^b)$, or —$SOR^c$, and each $R^a$ and $R^b$ is independently H, or $C_1$-$C_6$ alkyl.

each W is independently a bond, an alkylene group, an arylene group, a heteroarylene group, —O-arylene-, —$(CH_2)_a$-arylene-, —$SO_2$-arylene-, —NH-arylene-, —S-arylene-, —O— heteroarylene-, —$(CH_2)_a$-heteroarylene-, —$SO_2$-heteroarylene-, —NH-heteroarylene-, —S-heteroarylene-, —(—O—$(CH_2)_a$—$)_x$—, —(—NH—$(CH_2)_a$—$)_x$—, —(—S—$(CH_2)_a$—$)_x$—,

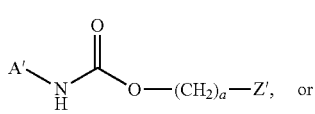

-continued
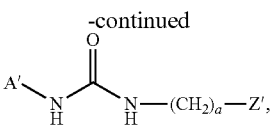

wherein a is 0-100 and x is 1-100, and each arylene or heteroarylene moiety can be substituted or unsubstituted;

each Z is a cationic moiety or an anionic moiety;

each L is independently a linking moiety selected from the group consisting of —O—, —S—, —N—, $C_1$-$C_6$ substituted or unsubstituted alkylene, $C_1$-$C_3$ haloalkylene,

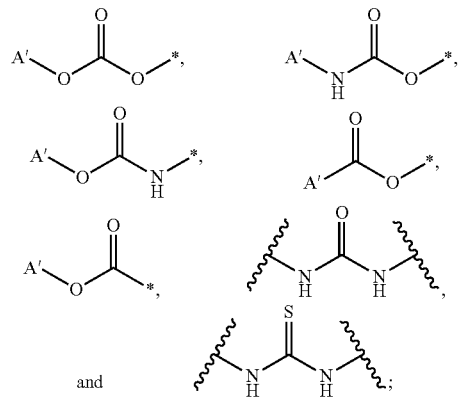
and

A' is a covalent bond to A;

Z' is a covalent bond to Z;

* is a covalent bond to ⸺;

⸺ is a point of attachment to the plurality of cyclodextrin carbon atoms;

x is 0-8;

$y_1$ is 1-4;

$y_2$ is 1-4; and $y_3$ is 0-4.

Each Z is a cationic moiety or an anionic moiety. For example, in some embodiments, each Z is a cationic moiety. In certain embodiments, each cationic moiety is independently —$N(R^3)_3^+$, —$P(R^3)_3^+$, —$S(R^3)_2^+$, or -Heteroaryl$^+$ wherein each $R^3$ is independently —H, —$C_1$-$C_6$ alkyl, —$C_1$-$C_3$ haloalkyl, -aryl, —$C(O)N(R^a)(R^b)$, —$C(O)R^c$, —$CO_2R^c$, —$SO_2N(R^a)(R^b)$, or —$SOR^c$, and each $R^a$ and $R^b$ is independently H, or $C_1$-$C_6$ alkyl. For example, in some embodiments, each cationic moiety is —$N(R^3)_3^+$ where each $R^3$ is H, or $C_1$-$C_6$ alkyl. Accordingly, in some embodiments, each cationic moiety is —$N(Me)_3^+$ or is —$NH_3^+$. In some embodiments, each cationic moiety is —$N(Me)_3^+$. In some embodiments, each cationic moiety is independently -Heteroaryl$^+$. A variety of charged heteroaryls are contemplated in the context of the present disclosure and are readily apparent to a skilled artisan. For example, in some embodiments, -Heteroaryl$^+$ may refer to pyridinium, pyrrolidinium, imidazolium, triazolium, tetrazolium, and the like. In some embodiments, each Z is an anionic moiety. In certain embodiments, each anionic moiety is

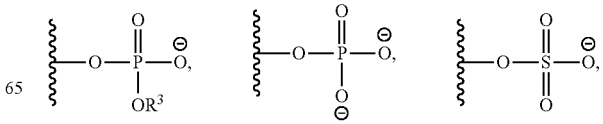

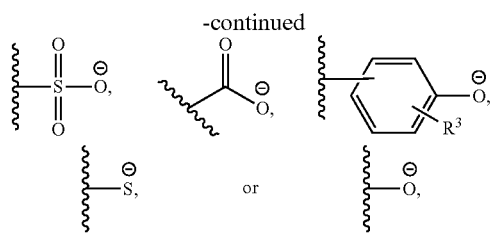

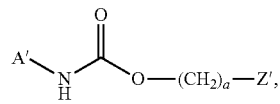

where A' is a covalent bond to A and Z' is a covalent bond to Z. In some embodiments, W is

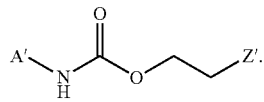

In some embodiments, each instance of —W—Z is taken together to form —O—CH$_2$—CH$_2$—N(R)$_3^+$. In some embodiments, each instance of —W—Z is taken together to form —O—CH$_2$—CH$_2$—N(Me)$_3^+$. In some embodiments, each instance of —W—Z is taken together to form

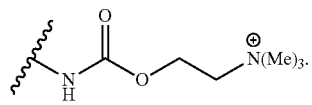

In some embodiments, each L is a linking moiety. In some embodiments, each L is independently a linking moiety selected from the group consisting of —O—, —S—, —N—,

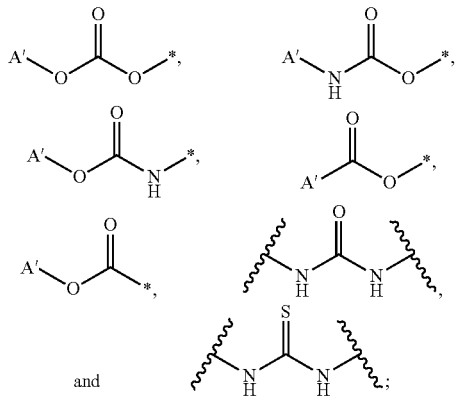

where A' is a covalent bond to A and * is a covalent bond to ξ (which as described herein represents a point of attachment to the plurality of cyclodextrin carbon atoms). In some embodiments, each L is independently —O—. In certain embodiments, when each L is independently

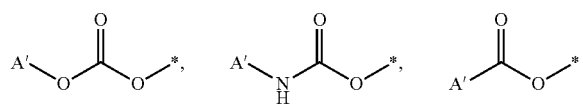

or —O—, the oxygen atom may be a glycosidic oxygen from the plurality of cyclodextrins of the porous polymeric material of the present disclosure. For example, in some embodiments, when each L is independently —O—, the oxygen atom is a glycosidic oxygen atom from the plurality of cyclodextrins of the porous polymeric material of the present disclosure.

wherein each R$^3$ is as defined above.

In accordance with certain embodiments of the present disclosure, each W is independently a bond, an alkylene group (e.g. C$_1$-C$_{10}$, C$_{10}$-C$_{20}$, or C$_{20}$-C$_{100}$), an arylene group, a heteroarylene group, —O-arylene-, —(CH$_2$)$_a$-arylene-, —SO$_2$-arylene-, —NH-arylene-, —S-arylene-, —O-heteroarylene-, —(CH$_2$)$_a$-heteroarylene-, —SO$_2$-heteroarylene-, —NH-heteroarylene-, —S— heteroarylene-, —(—O—(CH$_2$)$_a$—)$_x$—, —(—NH—(CH$_2$)$_a$)$_x$—, or —(—S—(CH$_2$)$_a$—)$_x$—, wherein a is 0-100 and x is 1-100, and each arylene or heteroarylene moiety can be substituted or unsubstituted. The term "arylene" refers to a bivalent group derived from an aryl group (as described herein, including phenyl, biphenyl, naphthyl, etc.) by removing hydrogen atoms from two ring carbons. For example, an arylene can include a phenyl in which the two valencies are situated in an ortho-, meta-, or para-orientation. For polycyclic arylenes, the two valencies can be on the same ring, or on different rings. Arylenes can be derived from any aromatic rings described herein, and can be substituted or unsubstituted. Similarly, the term "heteroarylene" refers to a bivalent group derived from a heteroaryl group (as described herein, including furyl, pyridyl, etc.) by removing hydrogen atoms from two ring atoms (which can be carbon or heteroatoms). The valencies can be on the same ring or different rings (in the case of polycyclic heteroaromatics) and can be on any two ring atoms. Heteroarylenes can be derived from any heteroaromatic rings described herein, and can be substituted or unsubstituted. Thus in some embodiments, each W is a bond (i.e. a covalent bond). In other embodiments, each W is an alkylene group. For example, each W may be, methylene (—CH$_2$—), ethylene (—CH$_2$CH$_2$—), propylene (—CH$_2$CH$_2$CH$_2$—), isopropylene (—CH(CH$_3$)CH$_2$—), n-butylene (—CH$_2$CH$_2$CH$_2$CH$_2$—), sec-butylene (—CH$_2$(CH$_2$CH$_3$)CH$_2$—) and the like. In some embodiments, each W is methylene (—CH$_2$—). In some embodiments, each W is an arylene group (phenylene). In some embodiments, each W is a heteroarylene group (furyl, pyridyl). In some embodiments, each W is —O-arylene- (—O-phenylene). In some embodiments, each W is —(CH$_2$)$_a$-arylene- (—CH$_2$-phenylene). In some embodiments, each W is —SO$_2$-arylene- (—SO$_2$-phenylene). In some embodiments, each W is —NH-arylene- (—NH-phenylene). In some embodiments, each W is —S-arylene- (—S-phenylene). In some embodiments, each W is a heteroarylene group (furylene, pyridylene). In some embodiments, each W is —O-heteroarylene-(—O-pyridinylene). In some embodiments, each W is —(CH$_2$)$_a$-heteroarylene- (—CH$_2$-pyridinylene). In some embodiments, each W is —SO$_2$-heteroarylene-(—SO$_2$-pyridinylene). In some embodiments, each W is —NH-heteroarylene- (—NH-pyridinylene). In some embodiments, each W is —S-heteroarylene- (—S-pyridinylene). In some embodiments, W is —(O—CH$_2$—CH$_2$)$_x$—. In some embodiments, W is —O—CH$_2$—CH$_2$—. In some embodiments, W is In some embodiments, A is an aryl or heteroaryl moiety. In some embodiments, A is an aryl moiety. For example, A may be phenyl, biphenyl, naphthyl, anthracenyl, phenalenyl, phenanthrenyl, indanyl, indenyl, tetrahydronaphthalenyl, or tetrahydrobenzoannulenyl. In some embodiments, A is a heteroaryl moiety. For example, A may be benzothiophene, furyl, thienyl, pyrrolyl, pyridyl, pyrazinyl, pyrazolyl, pyridazinyl, pyrimidinyl, imidazolyl, isoxazolyl, oxazolyl, oxadiazolyl, pyrazinyl, indolyl, thiophen-2-yl, quinolyl, benzopyranyl, isothiazolyl, thiazolyl, thiadiazolyl, thieno[3,2-b]thiophene, triazolyl, triazinyl, imidazo[1,2-b]pyrazolyl, furo[2,3-c]pyridinyl, imidazo[1,2-a]pyridinyl, indazolyl, pyrrolo[2,3-c]pyridinyl, pyrrolo[3,2-c]pyridinyl, pyrazolo[3,4-c]pyridinyl, benzoimidazolyl, thieno[3,2-c]pyridinyl, thieno[2,3-c]pyridinyl, thieno[2,3-b]pyridinyl, benzothiazolyl, indolyl, indolinyl, indolinonyl, dihydrobenzothiophenyl, dihydrobenzofuranyl, benzofuran, chromanyl, thiochromanyl, tetrahydroquinolinyl, dihydrobenzothiazine, dihydrobenzoxanyl, quinolinyl, isoquinolinyl, 1,6-naphthyridinyl, benzo[de]isoquinolinyl, pyrido[4,3-b][1,6]naphthyridinyl, thieno[2,3-b]pyrazinyl, quinazolinyl, tetrazolo[1,5-a]pyridinyl, [1,2,4]triazolo[4,3-a]pyridinyl, isoindolyl, pyrrolo[2,3-b]pyridinyl, pyrrolo[3,4-b]pyridinyl, pyrrolo[3,2-b]pyridinyl, imidazo[5,4-b]pyridinyl, pyrrolo[1,2-a]pyrimidinyl, tetrahydropyrrolo[1,2-a]pyrimidinyl, 3,4-dihydro-2H-1$\lambda^2$-pyrrolo[2,1-b]pyrimidine, dibenzo[b,d]thiophene, pyridin-2-one, furo[3,2-c]pyridinyl, furo[2,3-c]pyridinyl, 1H-pyrido[3,4-b][1,4]thiazinyl, benzooxazolyl, benzoisoxazolyl, furo[2,3-b]pyridinyl, benzothiophenyl, 1,5-naphthyridinyl, furo[3,2-b]pyridine, [1,2,4]triazolo[1,5-a]pyridinyl, benzo [1,2,3]triazolyl, imidazo[1,2-a]pyrimidinyl, [1,2,4]triazolo[4,3-b]pyridazinyl, benzo[c][1,2,5]thiadiazolyl, benzo[c][1,2,5]oxadiazole, 1,3-dihydro-2H-benzo[d]imidazol-2-one, 3,4-dihydro-2H-pyrazolo[1,5-b][1,2]oxazinyl, 4,5,6,7-tetrahydropyrazolo[1,5-a]pyridinyl, thiazolo[5,4-d]thiazolyl, imidazo[2,1-b][1,3,4]thiadiazolyl, thieno[2,3-b]pyrrolyl, or 3H-indolyl. In some embodiments, A is selected from the group consisting of phenyl, naphthyl, pyridyl, benzofuranyl, pyrazinyl, pyridazinyl, pyrimidinyl, triazinyl, quinoline, benzoxazole, benzothiazole, 1H-benzimidazole, isoquinoline, quinazoline, quinoxaline, pyrrole, indole, biphenyl, pyrenyl, and anthracenyl. In some embodiments, A is phenyl. In some embodiments, A is an aryl or heteroaryl ring system as described in U.S. Pat. No. 9,855,545, which is hereby incorporated by reference in its entirety.

In some embodiments, A is the polymerization product of commercially available diisocyanates. For example, in some embodiments, A is the polymerization product of commercially available aryl diisocyanates including but not limited to 2,4-toluene diisocyanate, 2,6-toluene diisocyanate, 4,4'-methylene diphenyl diisocyanate, 2,4'-methylene diphenyl diisocyanate, 1,3-bis(isocyanatomethyl)benzene, 1,3-bis(1-isocyanato-1-methylethyl)benzene, 3,3'-dichloro-4,4'-diisocyanato-1,1'-biphenyl, 3,3'-dimethyl-4,4'-biphenylene diisocyanate, 4,4'-oxybis(phenyl isocyanate), 1,3-phenylene diisocyanate, 1,4-phenylene diisocyanate, 4-chloro-6-methyl-1,3-phenylene diisocyanate, and 1-chloromethyl-2,4-diisocyanatobenzene. In some embodiments, A is

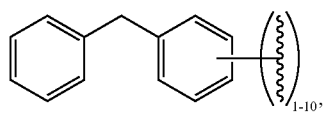

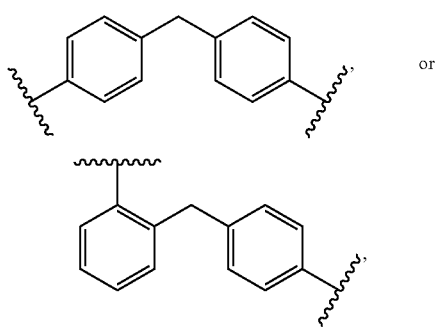

where the wavy line represents any of the substituents attached to A as defined herein. In some embodiments, A is

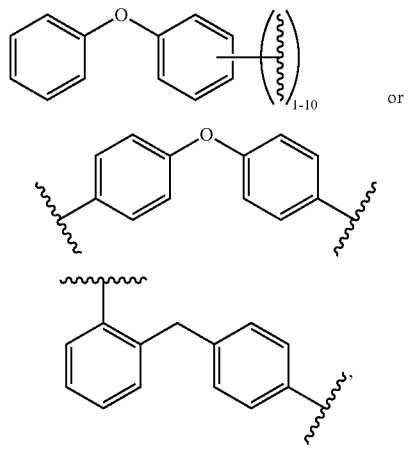

where the wavy line represents any of the substituents attached to A as defined herein. In some embodiments, A is

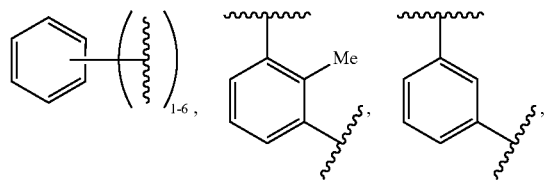

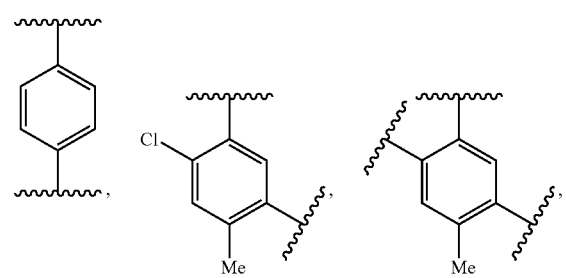

-continued

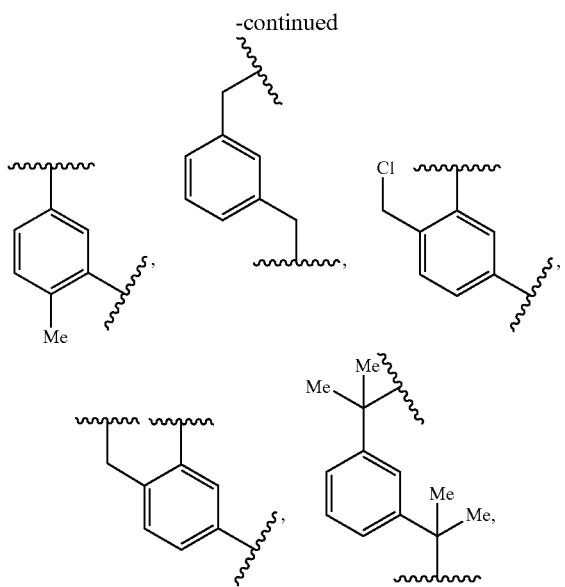

where the wavy line represents any of the substituents attached to A as defined herein, the -Me, —Cl, and —CH$_2$—Cl groups bound to the aryl ring in the preceding structures corresponds to R$^1$ groups, and the —CH$_2$— and —C(Me)$_2$- groups bound to the aryl ring correspond to L groups. In some embodiments, A is

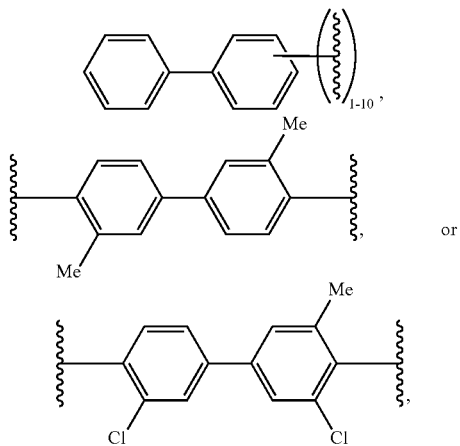

where the wavy line represents any of the substituents attached to A as defined herein, and the -Me and —Cl groups bound to the aryl ring in the preceding structures corresponds to R$^1$ groups.

The porous polymeric material of the present disclosure comprises a plurality of cyclodextrins with a plurality of crosslinks comprising formula (I). The plurality of cyclodextrins of the present disclosure may be any cyclodextrin containing from six to twelve glucose units. For example, in some embodiments, the plurality of cyclodextrins of the present disclosure are selected from the group consisting of α-cyclodextrin, β-cyclodextrin, γ-cyclodextrin, and combinations thereof. In some embodiments, each cyclodextrin is a β-cyclodextrin.

The R$^1$ groups of the plurality of crosslinks comprising formula (I) are each R$^1$ is independently selected from the group consisting of H, C$_1$-C$_6$ alkyl, C$_1$-C$_3$ haloalkyl, aryl, heteroaryl, —CF$_3$, —SO$_3$H, —CN, —NO$_2$, —NH$_2$, —NCO, —C(O)$_2$R$^3$, —C(O)N(R$^3$)$_2$, and -halogen. In certain embodiments, each R$^1$ is independently selected from the group consisting of H, C$_1$-C$_6$ alkyl, C$_1$-C$_3$ haloalkyl, aryl, heteroaryl, —CF$_3$, —SO$_3$H, —CN, —NO$_2$, —NH$_2$, —NCO, —C(O)$_2$R$^3$, —C(O)N(R$^3$)$_2$, and -halogen. In certain embodiments, 0-8 R$^1$ groups are present on the plurality of crosslinks comprising formula (I). For example, 0, 1, 2, 3, 4, 5, 6, 7, or 8 R$^1$ groups are present on each of the individual crosslinks comprising formula (I). It is understood that any positions of A not substituted with R$^1$, R$^2$, —W—Z or -L- will be unsubstituted or have one or more H atoms as required to satisfy the valency of that position. As will be appreciated by a skilled artisan, the number of R$^1$ groups on each of the individual crosslinks of formula (I) may vary throughout the porous polymeric material of the present disclosure. For example, when R$^1$ is —F and the polymerized porous material of the present invention is exposed to reactants capable of substitution (e.g. choline chloride), the —F groups on some crosslinks will be substituted, whereas in other crosslinks, the —F groups may be effectively shielded from the reactants and thus not react. Accordingly, a porous polymeric material of the present disclosure may have multiple linking groups of formula (I) present, and each individual linking group may independently have 0-8 (e.g. 1, 2, or 3) R$^1$ groups.

In some embodiments, the porous polymeric material of the present disclosure may be characterized as having, on average, a fractional number of R$^1$, R$^2$, —W—Z or -L- groups in each crosslinking group. This fractional number of substituents can be calculated by dividing the total number of such groups by the total number of crosslinks in the porous polymeric material. For example, if half of the crosslinking groups are functionalized with a —O—CH$_2$—CH$_2$—N(Me)$_3$$^+$ group (e.g., where W is a —O—CH$_2$—CH$_2$— and Z is —N(Me)$_3$), then the average number (or fraction) of —O—CH$_2$—CH$_2$—N(Me)$_3$$^+$ groups corresponding to —W—Z per crosslinking group is 0.5. For R$^1$, the fractional number of such groups includes values of about 0, about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.5, about 2.7, about 2.8, about 2.9, about 3.0, about 3.1, about 3.2, about 3.3, about 3.4, about 3.5, about 3.6, about 3.7, about 3.8, about 3.9, about 4.0, about 4.1, about 4.2, about 4.3, about 4.4, about 4.5, about 4.6, about 4.7, about 4,8. about 4.9, about 5.0, about 5.1, about 5.2, about 5.3, about 5.4, about 5.5, about 5.6, about 5.7, about 5.8, about 5.9, about 6.0, about 6.1, about 6.2, about 6.3, about 6.4, about 6.5, about 6.6, about 6.7, about 6.8, about 6.9, about 7.0, about 7.1, about 7.2, about 7.3, about 7.4, about 7.5, about 7.6, about 7.7, about 7.8, about 7.9, or about 8.0, inclusive of all ranges between any of these values. For R$^2$, the fractional number of such groups includes values of about 0, about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.5, about 2.7, about 2.8, about 2.9, about 3.0, about 3.1, about 3.2, about 3.3, about 3.4, about 3.5, about 3.6, about 3.7, about 3.8, about 3.9, or about 4.0, inclusive of all ranges between any of these values. For —W—Z, the fractional number of such groups includes values of about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.5, about 2.7, about 2.8, about 2.9, about 3.0, about 3.1, about 3.2, about 3.3, about 3.4, about 3.5, about 3.6, about 3.7, about 3.8, about 3.9, or about 4.0, inclusive of all ranges between any of these values. For -L-, the fractional number of such groups includes values of about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.5, about 2.7, about 2.8, about 2.9, about 3.0, about 3.1, about 3.2, about 3.3, about 3.4, about 3.5, about 3.6, about 3.7, about 3.8, about 3.9, or about 4.0, inclusive of all ranges between any of these values.

Each $R^2$ is independently H, —OH, —O-metal cation, alkyl, aryl, heteroaryl, —SH, —S— metal cation, —S-alkyl, —C(O)$_2$H, or —C(O)NH$_2$. In some embodiments, each $R^2$ is H. In some embodiments, each $R^2$ is —OH. In some embodiments, each $R^2$ is —O-metal cation. In some embodiments, each $R^2$ is alkyl. In some embodiments, each $R^2$ is aryl (e.g., substituted or unsubstituted phenyl or naphthyl). In some embodiments, each $R^2$ is heteroaryl (e.g., substituted or unsubstituted 5- or 6-membered heteroaryl rings with one, two, or three ring heteroatoms selected from the group consisting of O, S, or N). In some embodiments, each $R^2$ is —SH. In some embodiments, each $R^2$ is —S-metal cation. In some embodiments, each $R^2$ is —S-alkyl. In accordance with embodiments of the present disclosure, there may be 1, 2, 3, or 4 $R^2$ groups. For example, 0, 1, 2, 3, or 4 $R^2$ groups are present on the plurality of crosslinks comprising formula (I). As will be appreciated by a skilled artisan, the number of $R^2$ groups on each of the individual plurality of linking groups comprising formula (I) may vary by each individual linking group throughout the porous polymeric material of the present disclosure. Accordingly, a porous polymeric material of the present disclosure may have multiple linking groups of formula (I) present, and each individual linking group may independently have e.g. 0, 1, 2, 3, or 4 $R^2$ groups. When there are more than one $R^2$ groups on the plurality of linking groups of formula (I), the $R^2$ groups may be the same or different. For example, in some embodiments, one or more $R^2$ group is —O-metal cation and one or more $R^2$ group is —OH.

Each $R^3$ is independently —H, —C$_1$-C$_6$ alkyl, —C$_1$-C$_3$ haloalkyl, -aryl, —C(O)N(R$^a$)(R$^b$), —C(O)R$^c$, —CO$_2$R$^c$, —SO$_2$N(R$^a$)(R$^b$), or —SOR$^c$, and each $R^a$ and $R^b$ is independently H, or C$_1$-C$_6$ alkyl. In some embodiments, each $R^3$ is Me. In some embodiments, each $R^3$ is H. When $R^3$ is aryl, the aryl may be, for example, a substituted or unsubstituted phenyl or naphthyl.

In certain embodiments, x is 1-4. For example, x may be 1, 2, 3, or 4. In some embodiments, x is 1 or 2 and $R^1$ is —F.

In certain embodiments, $y_1$ is 1-4. For example, $y_1$ may be 1, 2, 3, or 4. In some embodiments, $y_1$ is 1-2.

In certain embodiments, $y_2$ is 1 or 2.

In certain embodiments, $y_3$ is 0 or 1.

In certain embodiments, the porous polymeric material of the present disclosure comprises a plurality of cyclodextrins crosslinked with a plurality of crosslinks comprising formula (II):

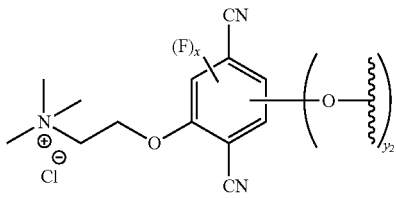

wherein
$y_2$ is 1 or 2; and
x is 1 or 2. In some embodiments, $y_2$ is 2 and x is 1. In some embodiments, each cyclodextrin is β-cyclodextrin.

In certain embodiments, the porous polymeric material of the present disclosure comprises a plurality of linkers of formula (III):

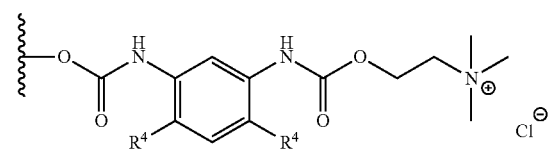

wherein one $R^4$ is —H and one $R^4$ is -Me. In some embodiments, each cyclodextrin is β-cyclodextrin.

In various embodiments, the porous polymeric material of the present disclosure is prepared by crosslinking cyclodextrins of the same structure with crosslinkers of the same structure. In some embodiments, the porous polymeric material of the present disclosure is prepared by crosslinking cyclodextrins of the same structure with two, three, four, or more different crosslinkers. In various embodiments, the porous polymeric material of the present disclosure is prepared by crosslinking two, three, or four different cyclodextrins (i.e., having different structures) with crosslinkers of the same structure. In some embodiments, the porous polymeric material of the present disclosure is prepared by crosslinking two, three, or four different cyclodextrins with two, three, four, or more different crosslinkers.

In some embodiments, some of the crosslinks of the porous polymeric material do not include a cationic or anionic moiety (i.e., corresponding to group "Z" of formula (I)). In such embodiments, the porous polymeric material comprises a plurality of crosslinkers of formula (I) and a plurality of crosslinkers having a structure similar to that of formula (I), except that there is no cationic or anionic moiety corresponding to group "Z". So, for example, such crosslinkers lacking a cationic or anionic moiety can have any of the crosslinker structures described in U.S. Pat. No. 10,086,360, herein incorporated by reference for all purposes, including, for example a plurality of crosslinkers of the following structure (a):

structure (a)

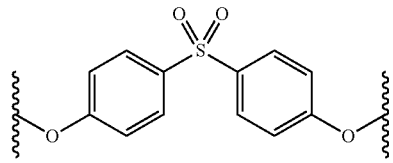

or the following structure (b):

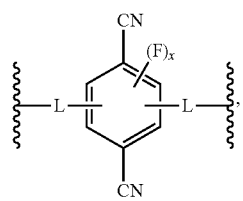

structure (b)

or a combination of structures (a) and (b) (where x in structure (b) is 0, 1, 2, 3, or 4). In such embodiments of porous polymeric materials having crosslinkers of structure (a) and/or structure (b), such materials also include charged crosslinkers of formula (I) as described herein.

In still other embodiments, the porous polymeric materials of the present disclosure comprise a plurality of cationic crosslinkers of the following structure (c):

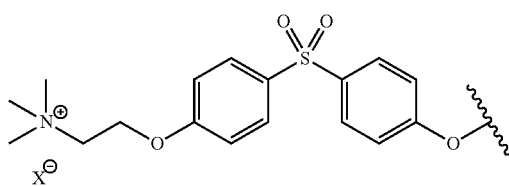

structure (c)

(where X⁻ is a pharmaceutically acceptable anionic counterion such as Cl⁻).

In still other embodiments, the porous polymeric materials of the present disclosure comprise a plurality of cationic crosslinkers of the following structure (d):

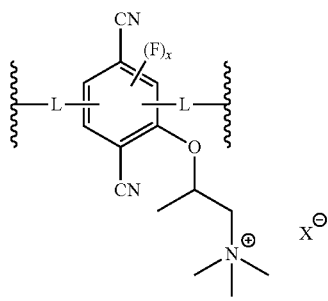

structure (d)

(where x in structure (d) is 0, 1, 2, 3, or 4; and X⁻ is a pharmaceutically acceptable anionic counterion such as Cl⁻).

In still other embodiments, the porous polymeric materials of the present disclosure comprise a plurality of cationic crosslinkers of structure (c) and a plurality of cationic crosslinkers of structure (d). As described herein, any crosslinkers of the present disclosure having an aromatic halide group can be modified to provide a charged moiety, for example by reaction with choline chloride under suitable conditions as described herein.

In other embodiments, the porous polymeric materials of the present disclosure comprise a plurality of anionic crosslinkers of the following structure (e):

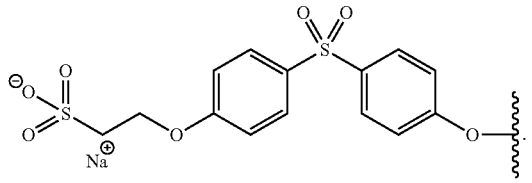

structure (e)

The cationic counterion for structure (e) (depicted as Na⁺) can alternatively be any other pharmaceutically acceptable cationic counterion such as, without limitation, H⁺ or K⁺.

In yet other embodiments, the porous polymeric materials of the present disclosure comprise a plurality of anionic crosslinkers of the following structure (f):

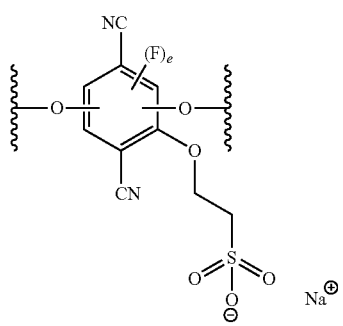

structure (f)

(where x in structure (f) is 0, 1, 2, 3, or 4).

In still other embodiments, the porous polymeric materials of the present disclosure comprise a plurality of cationic crosslinkers of structure (e) and a plurality of cationic crosslinkers of structure (f).

In some embodiments, the present disclosure provides a porous polymeric material comprising a plurality of cyclodextrin moieties crosslinked by one or more polyisocyanates. In some embodiments, the plurality of cyclodextrins are β-cyclodextrin. In some embodiments, the one or more polyisocyanates are aryl diisocyanates including but not limited to 2,4-toluene diisocyanate, 2,6-toluene diisocyanate, 4,4'-methylene diphenyl diisocyanate, 2,4'-methylene diphenyl diisocyanate, 1,3-bis(isocyanatomethyl)benzene, 1,3-bis(1-isocyanato-1-methylethyl)benzene, 3,3'-dichloro-4,4'-diisocyanato-1,1'-biphenyl, 3,3'-dimethyl-4,4'-biphenylene diisocyanate, 4,4'-oxybis(phenyl isocyanate), 1,3-phenylene diisocyanate, 1,4-phenylene diisocyanate, 4-chloro-6-methyl-1,3-phenylene diisocyanate, and 1-chloromethyl-2,4-diisocyanatobenzene, and combinations thereof. In some embodiments, the aryl diisocyanate is 2,4-toluene diisocyanate. In some embodiments, the one or more polyisocyanates are aliphatic diisocyanates including but not limited to 4,4'-diisocyanato-methylenedicyclohexane (HMDI), hexamethylene diisocyanate (HDI), isophorone diisocyanate (IPDI), L-lysine diisocyanate (LDI), trimethylhexamethylene diisocyanate (TMDI), 1,3-bis(isocyanatomethyl)cyclohexane, 1,4-diisocyanatobutane, trimethyl-1,6-diisocyanatohexane, 1,6-diisocyanato-2,2,4-trimethylhexane, trans-1,4-cyclohexylene diisocyanate, 1,8-diisocyanatooctane, 1,12-diisocyanatododecane, and combinations thereof. In some embodiments, the plurality of cyclodextrins are β-cyclodextrin and the one or more polyisocyanates are 2,4-toluene diisocyanates. In some embodiments, the porous polymeric material has a Brunauer-Emmett-Teller (BET) surface area of about 10 m²/g to 2000 m²/g. For example, in some embodiments, the porous polymeric material has a BET surface area of about 10 m²/g, 20 m²/g, 30 m²/g, 40 m²/g, 50 m²/g, 75 m²/g, 100 m²/g, 150 m²/g, 200 m²/g, 250 m²/g, 300 m²/g, 350 m²/g, 400 m²/g, 450 m²/g, 500 m²/g, 550 m²/g, 600 m²/g, 650 m²/g, 700 m²/g, 750 m²/g, 800 m²/g, 850 m²/g, 900 m²/g, 950 m²/g, 1000 m²/g, 1050 m²/g, 1100 m²/g, 1150 m²/g, 1200 m²/g, 1250 m²/g, 1300 m²/g, 1350 m²/g, 1400 m²/g, 1450 m²/g, 1500 m²/g, 1550 m²/g, 1600 m²/g, 1650 m²/g, 1700 m²/g, 1750 m²/g, 1800 m²/g, 1850 m²/g, 1900 m²/g, 1950 m²/g to about 2000 m²/g, including all integers and ranges therebetween. In some embodiments, the porous polymeric material has an amine content from about 0 mmol/g to about 1.0 mmol/g. In some embodiments, the porous polymeric material has an amine content from about 0.1 mmol/g to about 1.0 mmol/g. In some embodiments, the porous polymeric material has an amine content from about 0.15 mmol/g to about 0.35 mmol/g. For example, in some embodiments, the amine content may be about 0.15 mmol/g, about 0.16 mmol/g, about 0.17 mmol/g, about 0.18 mmol/g, about 0.19 mmol/g, about 0.20 mmol/g, about 0.21 mmol/g, about 0.22 mmol/g, about 0.23 mmol/g, about 0.24 mmol/g, about 0.25 mmol/g, about 0.26 mmol/g, about 0.27 mmol/g, about 0.28 mmol/g, about 0.29 mmol/g, about 0.30 mmol/g, about 0.31 mmol/g, about 0.32 mmol/g, about 0.33 mmol/g, about 0.34 mmol/g, and about 0.35 mmol/g including all ranges therebetween. Without being bound by any particular theory, it was discovered that by using as-is CD (i.e. undried) in the polymer synthesis, the resulting polymer had a higher amine content than similar polymers described in the prior art, which led to higher affinity for some micropollutants such as PFASs.

In certain embodiments, the molar ratio of cyclodextrin to linking groups of formula (I), (II), or (III) ranges from about 1:1 to about 1:X, wherein X is three times the average number of glucose subunits in the cyclodextrin. In certain embodiments, the molar ratio of cyclodextrin to linking groups of formula (I), (II), or (III) is about 1:6. In certain embodiments, the molar ratio of cyclodextrin to linking groups of formula (I), (II), or (III) is about 1:5. In certain embodiments, the molar ratio of cyclodextrin to linking groups of formula (I), (II), or (III) is about 1:4. In certain embodiments, the molar ratio of cyclodextrin to linking groups of formula (I), (II), or (III) is about 1:3. In certain embodiments, the molar ratio of cyclodextrin to linking groups of formula (I), (II), or (III) is about 1:2. In various embodiments, the molar ratio of cyclodextrin moieties to aryl crosslinking moieties is about 1:1 to about 1:24, including about 1:1, about 1:1.5, about 1:2, about 1:2.5, about 1:3, about 1:3.5, about 1:4, about 1:4.5, about 1:5, about 1:5.5, about 1:6, about 1:6.5, about 1:7, about 1:7.5, about 1:8, about 1:8.5, about 1:9, about 1:9.5, about 1:10, about 1:10.5, about 1:11, about 1:11.5, about 1:12, about 1:12.5, about 1:13, about 1:13.5, about 1:14, about 1:14.5, about 1:15, about 1:15.5, about 1:16, about 1:16.5, about 1:17, about 1:17.5, about 1:18, about 1:18.5, about 1:19, about 1:19.5, about 1:20, about 1:20.5, about 1:21, about 1:21.5, about 1:22, about 1:22.5, about 1:23, about 1:23.5, or about 1:24, including all ranges of ratios therebetween. In an embodiment, the molar ratio of cyclodextrin moieties to aryl crosslinking moieties is about 1:2.5 to about 1:10.

In some embodiments, a composition according to the present disclosure comprises one or more porous polymeric materials of the present disclosure and one or more support materials, where the porous polymeric material is bound (e.g., covalently, adhesively, or mechanically bonded as described herein) to the support material. For example, in some embodiments, the composition comprises porous polymeric materials comprising a plurality of cyclodextrins crosslinked with a plurality of crosslinks comprising formula (I), and/or (II), and/or (III). Examples of support materials include cellulose (e.g., cellulose fibers), carbon-based materials such as activated carbon, graphene oxide, and oxidized carbon materials, silica, alumina, natural or synthetic polymers, and natural or synthetic polymers modified to include surface hydroxyl groups. One of skill in the art will recognize that any material with mechanical or other properties suitable to act as a support, which can covalently bond to the porous polymeric material, or can serve as a suitable support material if the porous polymeric material is adhesively bonded to the support via a suitable binder material. In an embodiment, the composition is in the form a membrane or a column packing material. In an embodiment, the support is a fiber (e.g., a cellulose, nylon, polyolefin or polyester fiber). In an embodiment, the support is a porous particulate material (e.g., porous silica and porous alumina). In an embodiment, the support is a woven or non-woven fabric. In an embodiment, the support is a garment (such as a protective garment) or a surgical or medical drape, dressing, or sanitary article.

In some embodiments, the P-CDP may be grafted or bonded (e.g., chemically or mechanically bonded) onto a support to provide an adsorbent where the particle size and morphology are well-controlled to give ideal flow characteristics. The term "mechanical bond" refers to a bond formed between two materials by pressure, ultrasonic attachment, and/or other mechanical bonding process without the intentional application of heat, such as mechanical entanglement. The physical entanglement and wrapping of microfibrils to hold in place micron-sized particulate matter is a prime example of a mechanical bond. The term mechanical bond does not comprise a bond formed using an adhesive or chemical grafting. In some embodiments, the P-CDP may be grafted or bonded (e.g., chemically or mechanically bonded) onto a support to provide an adsorbent where the particle size and morphology are further engineered (e.g., by granulation or milling) to provide particles with a well-controlled size and morphology to give ideal flow characteristics.

The P-CDP-support complex may be prepared by a variety of methods, including conventional grafting methods. As used herein, the term "grafting" refers to covalently attaching P-CDPs to a substrate surface through coupling reactions between one or more functional groups on the P-CDP and one or more functional groups on the substrate. In some embodiments, grafting includes an "in situ" process as described herein in which cyclodextrins, linking groups of the present disclosure, and a substrate having surface bound nucleophiles (e.g., hydroxyls) are reacted together such that the linking groups of the present disclosure reacts with the hydroxyl groups of the cyclodextrins and the surface nucleophiles of the substrate, forming a P-CDP which is partially bonded via one or more linking groups of the present disclosure to the substrate. The substrate having surface bound nucleophiles include, but are not limited to hydroxyls (such as microcrystalline cellulose), amines, phosphines, and thiols.

In some embodiments, "grafted" P-CDP-support complexes are prepared by first synthesizing the P-CDPs in a dedicated chemical reactor with adequate control of the reaction conditions and material purification to produce optimized P-CDP particles. The P-CDPs are then chemically reacted with a suitably functionalized substrate. For example, a substrate functionalized with carboxylic acid groups (or activated forms thereof such as acid halides, anhydrides, etc. known in the art) can react with one of more hydroxyls on the P-CDP to form an ester bond with the substrate. Alternatively, the P-CDP can be appropriately functionalized (e.g., by selection of a functionalized cyclodextrin as described herein) of by a subsequent modification of the P-CDP such that it can react with suitable functional groups on the substrate. Any suitable reaction chemistries can be contemplated, such as reactions between carboxylic acids (and derivatives thereof) and hydroxyls to form ester bonds, reactions between carboxylic acids (and derivatives thereof) and amine groups to form amide bonds, reactions between isocyanates and alcohols to make urethanes, reactions between isocyanates and amines to make ureas, reactions between cyclic carbonates and amines to make urethanes, reactions between thiols and alkenes or alkynes to make thioethers, reactions between epoxides and amine groups, photochemical reactions between acrylates, methacrylates, thiols etc. and olefins, and so forth. The reactive functional groups described herein can be on either of the P-CDP or substrate provided the reaction forms a covalent bond between the substrate and the P-CDP. For example, of the reactive functional groups are hydroxyls and carboxylic acids (forming an ester bond after reaction), the hydroxyl groups can be present on the P-CDP and the carboxyl groups on the substrate or vice-versa.

In other embodiments, the substrate can be coated with a "primer" having reactive functional groups as described above. The primer adheres to the surface of the substrate, and under suitable conditions can react with a suitably functionalized P-CDP to for a covalent bond between the P-CDP and the primer.

The P-CDP particles may be engineered to achieve specific particle sizes. In some embodiments, the P-CDP is produced in the form of crosslinked particles which may require further reduction in size (e.g., for the purposes of forming stable dispersions or slurries, or in providing optimal flow characteristics). A variety of means that are readily apparent to a skilled artisan can be employed to reduce the particle size of the P-CDP such as grinding or milling. Grinding and milling can be employed to create smaller particles with sizes less than 1 micron. Typical milling operations can be used by a skilled artisan and include both wet and dry milling. Milling can be employed through a variety of methods including, but not limited to: ball mill, autogeneous mill, SAG mill, pebble mill, rod mill, Buhrstone mill, tower mill, vertical shaft impactor mill, and the like. Milling media includes, but is not limited to: metals, silicates, and other inorganic materials in various form factors including, rods, balls, and irregular shapes. In some embodiments, the milling is performed on dry P-CDP powder material in a dry process to produce a finer dry powder or on wet aqueous slurries of the P-CDP powder with or without emulsifying agents to produce a finer particulate dispersion. Emulsifying agents may be used and are readily apparent to a skilled artisan, including, but not limited to: small molecule and polymeric surfactant compounds with nonionic, anionic, or cationic character. A skilled artisan will appreciate that using fine particulate form factors will enable a variety of benefits, such as (1) more stable aqueous dispersions that remain homogeneous over time by resisting separation, (2) enable a high loading of material by weight in the dispersion with values of 50% by weight or higher, (3) produce particulate matter that can be evenly coated or applied to various substrates, surfaces, fibers, yarns, fabrics and the like to produce a finished material with minimal perceptible changes in "hand," and (4) produce dispersions that are stable to dilution and blending with other emulsions or solutions such as binders, surfactants, wetting agents, or softeners. In some embodiments, the final particle diameter includes <1 micron, 1-5 micron, 5-10 micron, 10-15 micron, and 15-20 micron, or ranges therebetween.

If larger particle sizes are desired, the composition may be granulated to form agglomerates of larger particle size. Thus, in some embodiments, granules (e.g., self-supporting granules) are produced from P-CDP particle powders of various sizes. Broadly, this process will transform P-CDP particle powders in the size regimes ranging from 1-30 microns to granules in excess of 100 microns, 200 microns, 300 microns, and larger. This process may be achieved via granulation techniques common to the pharmaceutical industry (*Handbook of Granulation Technology*, Ed. Parikh, D. M., 2005, Taylor & Francis Group) in which the powders are bound together via physical and/or chemical means in batch or continuous modes. In the simplest form, particles of the P-CDP are blended mechanically with a fluid (e.g., aqueous) mixture containing an adhesive binder—typically a synthetic, semi-synthetic, or natural polymer. Suitable semi-synthetic polymers that can be used include cellulose ethers, specifically ethylcellulose, methylcellulose, hydroxypropylcellulose, carboxymethylcellulose, starch and starch derivatives, and others. Suitable fully synthetic polymers such as polyvinylpyrrolidone or polyethylene glycol can be used. Other suitable binders include sizes and other coatings used in the textile industry and paper industries including polyamide amine epichlorohydrin (PAE) or polymeric glyoxal crosslinkers, polyvinylalcohol, and starch-based sizes. In order to create robust granules which are resistant to dissolution in water or other solvents, further covalent crosslinking may be facilitated via the addition of small molecule crosslinkers such as glyoxal, formaldehyde, diisocyanate, and/or diepoxide functionalities. In addition to covalent crosslinking, electrostatic agglomeration of polyelectrolytes can also be utilized as a binding motif in which cationic polyelectrolytes form suitable adhesive properties when blended with anionic polyelectrolytes in the presence of P-CDP powders and/or support structures. Polycations can comprise those commonly used for flocculation including, but not limited to polydiallyldimethylammonium chloride (polyDADMAC), acidic polyethyleneimine, and polyacrylamides. Polyanions can comprise those commonly used for flocculation including, but not limited to sodium polyacrylate, sodium polystyrene sulfonate, and polyvinylsulfonate.

Mechanical blending during the granulation may be achieved via low shear processes such as rotary drum mixing or overhead mechanical stirring. As will be readily apparent to a skilled artisan, the stirring rate and total length of stirring time effects the granule size. Granulation may also be conducted in fluidized beds or via spray drying techniques. In each case, the P-CDP particle are combined with the aqueous or solvent borne mixture containing the binder compounds and the mechanical or physical agitation is conducted at a specified shear for a determined number of cycles. The resultant particles will display a step growth change in their average diameters and can also display a changed polydispersity. The physical properties of these granules depend on the binder selected, the crosslinking chemistry, and the physical process used in their granulation. These larger granular particles will be suitable for packed bed column filtration commonly employed for water filtration and industrial separations.

In some embodiments, the present disclosure provides a stable aqueous dispersion comprising P-CDP particles. In some embodiments, the P-CDP particles of the present disclosure, which can be used in such stable aqueous dispersions are from about 1 µm to about 150 µm. For example, the P-CDP particles are from about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, to about 150 µm. A stable aqueous dispersion may be used in "grafting" applications. For example, the stable aqueous dispersion may be used in applications with chemical binders or fibrillating fibers for mechanical loading and binding, and incorporation into thermally-bonded particulate pressed forms and into solution processed polymer form factors.

The P-CDP materials of the present disclosure can also be prepared on a support material (alternatively termed a "substrate"), for example covalently bonded, adhesively bonded, or mechanically attached to a support such as a fibrous substrate. The support material can be any material that has one or more groups (e.g., hydroxyl or amino, thiol, or phosphine, or other group as described herein) that can form an interaction (e.g., a covalent or mechanical bond) with a crosslinking agent or cyclodextrin. For example, one end of a crosslinking agent (e.g., the linking groups of Formulas (I), (II), and/or (III)) is covalently bound to the substrate material and another end of the crosslinking agent is covalently bound to a cyclodextrin glucose unit or a reactive center on modified cyclodextrin (such as an acid halide or activated ester bound to the cyclodextrin). It is desirable that the support material not dissolve (e.g., to an observable extent by, for example, visual inspection, gravimetric methods, or spectroscopic methods) under use conditions, for example in aqueous media. Examples of support materials include, but are not limited to, microcrystalline cellulose, cellulose nanocrystals, polymer materials (e.g., acrylate materials, methacrylate materials, styrenic materials (e.g., polystyrene), polyester materials, nylon materials, and combinations thereof or inorganic materials (e.g., silicates, silicones, metal oxides such as alumina, titania, zirconia, and hafnia, and combinations thereof). In various examples, the polymer materials are homopolymers, copolymers, or resins (e.g., resins comprising polymeric materials). The support material may be hydroxyl or amino containing polymer beads or irregular particles. The support material can be in the form a fiber (e.g., pulps, short cut, staple fibers, and continuous filaments), fiber bundles (e.g., yarn—both spun and continuous filament), fiber mats (e.g., nonwovens—both staple and continuous filament), fabrics (e.g., knits, woven, nonwovens), membranes (e.g., films, spiral wound, and hollow fibers, cloth, particulate (e.g., a powder), or a solid surface. In some embodiments, the fibrous substrate is a cellulosic substrate. Cellulosic substrates can comprise any suitable form of cellulose, such as cellulose derived from plant sources such as wood pulp (e.g., paper or paper fibers), cotton, regenerated cellulose, modified cellulosics such cellulose esters and/or ethers, and the like, starch, polyvinyl alcohols and derivatives thereof. The cellulosic substrate can be in the form of a fabric, such as a woven or nonwoven fabric, or as fibers, films, or any other suitable shape, particularly shapes that provide high surface area or porosity. In a particular embodiment, the P-CDP materials of the present disclosure are bonded to fibers, for example, a cellulosic fiber or a fabric, such as cotton.

In addition to the substrates listed in the preceding paragraph, the substrate may include any of the following: polyvinylamine, polyethylenimine, proteins, protein-based fibers (e.g., wool), chitosan and amine-bearing cellulose derivatives, polyamide, vinyl chloride, vinyl acetate, polyurethane, melamine, polyimide, polystyrene, polyacryl, polyamide, acrylate butadiene styrene (ABS), Barnox, PVC, nylon, EVA, PET, cellulose nitrate, cellulose acetate, mixed cellulose ester, polysulfone, polyether sulfone, polyvinylidene fluoride (PVDF) or polytetrafluoroethylene (PFTE or Teflon R.), polyethylene, polypropylene, polycarbonate, phosphine or thiol functional materials, and silicone or combinations thereof. The substrate may also consist of silicon or silicon oxide, or glass (e.g. as microfibres). Suitable materials further include textiles or synthetic or natural fiber-based materials. The material may exhibit any form or shape and may for instance be in the form of a sheet, bead, granule, rod, fiber, foam or tube, and may be rigid, flexible or elastic.

If necessary, the material surface may be activated by any method known in the art, such as known surface activation techniques, including for instance corona treatment, oxygen plasma, argon plasma, selective plasma bromination, chemical grafting, allyl chemistry, chemical vapour deposition (CVD) of reactive groups, plasma activation, sputter coating, etching, or any other known technique. For instance in the case of a glass surface, such an activation is usually not required as such a surface is herein considered already activated. The purpose of the activation of the surface is to provide for a surface suitable for the covalent attachment of a surface-modifying functionality or (directly) of a primer polymer. Following its optional activation, the surface may be further functionalized. The purpose of the functionalization of the surface is to provide for functional group suitable for the covalent attachment of a pre-coat polymer.

The skilled artisan is well aware of the various possibilities of attaching polymers to optionally activated surfaces. These techniques generally involve the introduction of amino-, silane-, thiol-, hydroxyl- and/or epoxy-functionalities to the surface, and the subsequent attachment thereto of the polymer.

The functionalization may also comprise the introduction of spacers or linker to the surface for the attachment of the primer polymer to the surface at a predetermined distance. A suitable spacer is for instance an alkylation by reacting the surface with for instance aminoalkylsilane.

The P-CDP may be bound to the substrate via the linking groups of the present disclosure (e.g. via a hydroxyl or amino group of the linking group). A "linker moiety" refers to the intervening atoms between the P-CDP and substrate. The terms "linker" and "linking moiety" herein refer to any moiety that connects the substrate and P-CDP to one another. The linking moiety can be a covalent bond or a chemical functional group that directly connects the P-CDP to the substrate. The linking moiety can contain a series of covalently bonded atoms and their substituents which are collectively referred to as a linking group. In some embodiments, linking moieties are characterized by a first covalent bond or a chemical functional group that bonds the P-CDP to a first end of the linker group and a second covalent bond or chemical functional group that bonds the second end of the linker group to the substrate. The first and second functionality, which independently may or may not be present, and the linker group are collectively referred to as the linker moiety. The linker moiety is defined by the linking group, the first functionality if present and the second functionality if present. In certain embodiments, the linker moiety contains atoms interposed between the P-CDP and substrate, independent of the source of these atoms and the reaction sequence used to synthesize the conjugate. In some embodiments, the linker moiety is an aryl moiety as described herein. In some embodiments, the linker has one or more of the following functionalities: multifunctional isocyanate (e.g., a diisocyanate), epoxy, carboxylic acid, ester, activated ester, cyanuric chloride, cyanuric acid, acid chloride, halogen, hydroxyl, amino, thiol, and phosphine.

In some embodiments, the P-CDP is grafted or bonded onto microcrystalline cellulose (CMC). CMC is available in a variety of median particles sizes from about 10-about 500 µm including about 10 µm, 20 µm, 45 µm, 50 µm, 65 µm, 75 µm, 100 µm, 150 µm, 180 µm, 190 µm, 200 µm, 225 µm, 250 µm, 275 µm, 300 µm, 325 µm, 350 µm, 375 µm, 400 µm, 425 µm, 450 µm, 475 µm, and about 500 µm and all particle sizes therebetween. In some embodiments, P-CDP is grafted or bonded onto CMC having a median particle size of about 50 µm. In one example, CMC is commercialized as Avicel™. In other embodiments, the P-CDP is grafted or bonded onto a polymeric substrate other than cellulose, as described herein, in which the surface is treated to produce surface functional groups as disclosed herein, such as hydroxyl groups.

In some embodiments, the P-CDP-substrate complex (e.g., a P-CDP crosslinked with an aryl linker of formula (I)-CMC substrate complex) has a polymer thickness (i.e., the thickness of the porous P-CDP particles on the surface of the substrate) of between about 1 nm to about 2000 nm. For example, P-CDP-substrate complex has a polymer thickness of about 1, 2, 3, 4, 5, 6, 7, 8, 9, 10, 20, 30, 40, 50, 60, 70, 80, 90, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, to about 2000 nm. In some embodiments, P-CDP-substrate complex has a polymer thickness of less than 1000 nm. In some embodiments, P-CDP-substrate complex as a polymer thickness of about 800 nm. As will be readily apparent to a skilled artisan, a having a lower thickness (e.g., less than 1000 nm) will allow for faster kinetics to absorb contaminants, for example aqueous contaminants.

In some embodiments, the P-CDP-substrate complex (e.g., a P-CDP crosslinked with an aryl linker of formula (I)-CMC substrate complex) has a contaminant adsorption capacity of up to 500 mg contaminant/g CD. For example, the adsorption capacity may be up to about 1, 2, 3, 4, 5, 6, 7, 8, 9, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, to about 500 mg contaminant/g CD. In some embodiments, the adsorption capacity is up to about 200 mg contaminant/g CD. In some embodiments, the contaminant is an anionic micropollutant (e.g. PFASs). In some embodiments, the cyclodextrin is β-cyclodextrin. In some embodiments, the linking groups are the linking groups of Formulas (I), (II), and/or (III).

In some embodiments, the P-CDP-substrate complex (e.g., a P-CDP crosslinked with an aryl linker of formula (I)-CMC substrate complex) has an equilibrium contaminant adsorption capacity of up to 500 mg contaminant/g CD. For example, the equilibrium adsorption capacity may be up to about 1, 2, 3, 4, 5, 6, 7, 8, 9, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, to about 500 mg contaminant/g CD. In some embodiments, the equilibrium adsorption capacity is up to about 200 mg contaminant/g CD. In some embodiments, the contaminant is an anionic micropollutant (e.g. PFASs). In some embodiments, the cyclodextrin is β-cyclodextrin. In some embodiments, the linking groups are the linking groups of Formulas (I), (II), and/or (III).

In some embodiments, the P-CDP-substrate complex (e.g., a P-CDP crosslinked with an aryl linker of formula (I)-CMC substrate complex) has a relaxation time of less than 2 minutes. As will be appreciated by a skilled artisan, where processes with high relaxation times slowly reach equilibrium, while processes with small relaxation times adapt to equilibrium quickly. In some embodiments, the contaminant is an anionic micropollutant (e.g. PFASs). In some embodiments, the cyclodextrin is β-cyclodextrin. In some embodiments, the linking groups are the linking groups of Formulas (I), (II), or (III).

In some embodiments, any of the P-CDP materials disclosed herein are grafted or bonded onto CMC directly or via a linker group as defined herein. In some embodiments, the P-CDP is homogenously distributed on the CMC surface. In some embodiments, the aryl linker is an aryl linker of formula (I). In some embodiments, the aryl linker is a linking groups of Formula (II). In some embodiments, the aryl linker is a linking groups of Formula (III). In some embodiments, the median particle size is about 50 µm. In other embodiments, the median particle size is from about 1-about 250 µm.

CMC can also be distinguished by a particle shape known to impact flow characteristics among other things. A non-limiting list of particle shapes includes spherical (round-shaped), rod-shaped, and needle-like. Particles can also be described as flat, flat and elongated, or be characterized by their aspect ratio. In some embodiments, the CMC has a spherical particle shape. In some embodiments, the CMC is present in the form of agglomerates of smaller CMC particles. Such CMC agglomerates can have particle sizes in the range of 200 µm up to about 2 mm. For example, the particle sizes of CMC agglomerates can be about 200 µm, about 300 µm, about 400 µm, about 500 µm, about 600 µm, about 700 µm, about 800 µm, about 900 µm, about 1 mm, about 1.2 mm, about 1.3 mm, about 1.4 mm, about 1.5 mm, about 1.6 mm, about 1.7 mm, about 1.8 mm, about 1.9 mm, or about 2 mm, inclusive of all ranges therebetween.

In some embodiments, the P-CDP is grafted or bonded onto CMC via a linking groups of Formula (I). In some embodiments, the P-CDP is grafted or bonded onto CMC via a linking groups of Formula (Ia). In some embodiments, the P-CDP is grafted or bonded onto CMC via a linking groups of Formula (II). In some embodiments, the P-CDP is grafted or bonded onto CMC via a linking group of Formula (III).

In some embodiments, P-CDP of the present disclosure is grafted or bonded onto CMC via an aryl linker, and the aryl linker is homogenously distributed on the CMC crystal. In some embodiments, the median particle size is about 100 nm.

In addition to the use of CMC as illustrated herein, examples of other potential support materials include those materials described above, such as activated carbon, graphene oxide, as well as silica and alumina.

In some embodiments, it is desirable that the supported P-CDP materials disclosed herein (e.g., a P-CDP crosslinked with an aryl linker of formula (I)-CMC substrate complex) are in the form of particles having a narrow dispersity of particle sizes. In some embodiments, the particle size distribution has a low relative span of about 5 or less, where relative span is defined by the ratio $(D_{90}-D_{10})/D_{50}$, where $D_{90}$, $D_{50}$, and $D_{10}$ are, respectively the diameters at which 90%, 50%, and 10% of the particles in the distribution have a smaller diameter. Suitable spans are no more than 5, 4.5, 4, 3.5, 3, 2.5, 2, 1, 0.9, 0.8, 0.7, 0.6, 0.5, 0.4, 0.3, 0.2, or 0.1, including all ranges therebetween.

In other various embodiments, the P-CDP may be grafted or bonded onto cellulose nanocrystals (CNCs). CNCs are the crystalline regions of cellulose microfibrils obtained after mechanical, chemical, and enzyme treatments. Depending on the source and preparation method, CNCs are available with lengths ranging from about 1-1000 nm and widths ranging from about 3-50 nm, inclusive of all values therebetween. For example, the CNCs have a length of about 1, 2, 3, 4, 5, 6, 7, 8, 9, 10, 15, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, 950, to about 1000 nm. The CNCs have a width of about 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or about 50. In some embodiments, the P-CDP-CNC substrates may be 2-3 times the size (length and width) as the unbound CNCs. The CNCs are further characterized by aspect ratio values (L/D) ranging from about 2-100 (George, J., et al., Cellulose nanocrystals: synthesis, functional properties, and applications. *Nanotechnology, Science and Applications.* 2015; 8:45-54). For example, the CNCs have an aspect ratio of about 2, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 100.

In some embodiments, the P-CDP is grafted or bonded onto CNC via the linking groups are the linking groups of Formulas (I), (II), and/or (III) as described herein. In some embodiments, the P-CDP is grafted or bonded onto CMC via a linking groups of Formula (I). In some embodiments, the P-CDP is grafted or bonded onto CMC via a linking groups of Formula (II). In some embodiments, the P-CDP is grafted or bonded onto CMC via a linking groups of Formula (III).

In some embodiments, P-CDP is grafted or bonded onto CNC via a linker, and the linker is homogenously distributed on the CNC crystal. In some embodiments, the median particle size is about 100 nm.

CNC can also be distinguished by particle shape known to impact flow characteristics among other things. A non-limiting list of particle shapes includes spherical (round-shaped), rod-shaped, and needle-like. Particles can also be described as flat, flat and elongated, or be characterized by their aspect ratio. In some embodiments, the CNC has an aspect ratio of between about 5 to about 100. For examples, the aspect ratio may be about 5, 10, 15, 20, 25, 30, 35, 40, 45, 50, 55, 60, 65, 70, 75, 80, 85, 90, 95 to about 100. In some embodiments, the CNC aspect ratio is about 20-25. In some embodiments, the CNCs are needle-like. In some embodiments, the CNC is present in the form of agglomerates of smaller CNC particles. Such CNC agglomerates can have particle sizes which are 5-100 times larger than the sizes of the individual particles, depending on the sizes and number of the particles constituting the aggregates.

In some embodiments, the substrate is a fabric or fiber. Thus, in some embodiments, the present disclosure provides a composition comprising a P-CDP grafted or bonded (e.g., chemically or mechanically) to a fiber. In some embodiments, the P-CDP is grafted or bonded onto a fiber via the linker of formulas (I), (II), and/or (III), as described herein. In some embodiments, the fiber is a nonwoven fiber. In some embodiments, the present disclosure provides a composition comprising a P-CDP grafted or bonded (e.g., chemically, adhesively, or mechanically) to a fabric. In some embodiments, the P-CDP is grafted or bonded onto a fabric via the linker of formulas (I), (II), or (III).

Fibers suitable for use include, but are not limited to fibers comprising any of the polymers disclosed herein, for example fibers made from highly oriented polymers, such as gel-spun ultrahigh molecular weight polyethylene fibers (e.g., SPECTRA® fibers from Honeywell Advanced Fibers of Morristown, N.J. and DYNEMA® fibers from DSM High Performance Fibers Co. of the Netherlands), melt-spun polyethylene fibers (e.g., CERTRAN® fibers from Celanese Fibers of Charlotte, N.C.), melt-spun nylon fibers (e.g., high tenacity type nylon 6,6 fibers from Invista of Wichita, Kans.), melt-spun polyester fibers (e.g., high tenacity type polyethylene terephthalate fibers from Invista of Wichita, Kans.), and sintered polyethylene fibers (e.g., TENSYLON® fibers from ITS of Charlotte, N.C.). Suitable fibers also include those made from rigid-rod polymers, such as lyotropic rigid-rod polymers, heterocyclic rigid-rod polymers, and thermotropic liquid-crystalline polymers. Suitable fibers also include those made from regenerated cellulose including reactive wet spun viscose rayon (Viscose from Birla of India or Lenzing of Austria), cuproammonium based rayon (Cupro® Bemberg from Asahi Kasei of Japan), or air gap spun from NMMO solvent (Tencel® from Lenzing of Austria). Suitable fibers made from lyotropic rigid-rod polymers include aramid fibers, such as poly(p-phenyleneterephthalamide) fibers (e.g., KEVLAR® fibers from DuPont of Wilmington, Del. and TWARON® fibers from Teijin of Japan) and fibers made from a 1:1 copolyterephthalamide of 3,4'-diaminodiphenylether and p-phenylenediamine (e.g., TECHNORA® fibers from Teijin of Japan). Suitable fibers made from heterocyclic rigid-rod polymers, such as p-phenylene heterocyclics, include poly(p-phenylene-2,6-benzobisoxazole) fibers (PBO fibers) (e.g., ZYLON® fibers from Toyobo of Japan), poly(p-phenylene-2,6-benzobisthiazole) fibers (PBZT fibers), and poly[2,6-diimidazo[4,5-b:4',5'-e]pyridinylene-1,4-(2,5-dihydroxy)phenylene] fibers (PIPD fibers) (e.g., M5® fibers from DuPont of Wilmington, Del.). Suitable fibers made from thermotropic liquid-crystalline polymers include poly(6-hydroxy-2-napthoic acid-co-4-hydroxybenzoic acid) fibers (e.g., VECTRAN® fibers from Celanese of Charlotte, N.C.). Suitable fibers also include carbon fibers, such as those made from the high temperature pyrolysis of rayon, polyacrylonitrile (e.g., OPF® fibers from Dow of Midland, Mich.), and mesomorphic hydrocarbon tar (e.g., THORNEL® fibers from Cytec of Greenville, S.C.). In certain possibly preferred embodiments, the yarns or fibers of the textile layers comprise fibers selected from the group consisting of gel-spun ultrahigh molecular weight polyethylene fibers, melt-spun polyethylene fibers, melt-spun nylon fibers, melt-spun polyester fibers, sintered polyethylene fibers, aramid fibers, PBO fibers, PBZT fibers, PIPD fibers, poly(6-hydroxy-2-napthoic acid-co-4-hydroxybenzoic acid) fibers, carbon fibers, and combinations thereof.

The P-CDP materials of the present disclosure can be adhered to such fibers by means of a suitable binder polymer as described herein, or chemically bonded to such fibers by functionalizing the surface of the fibers as described herein (e.g., surface oxidation to produce surface hydroxyl groups) and either forming the P-CDP in situ on the fiber surface, or by reacting a suitably functionalized P-CDP directly with the functionalized fiber surface, or indirectly via a linker moiety as described herein.

The fibers may be converted to nonwovens (either before or after attachment of the P-CDP) by different bonding methods. Continuous fibers can be formed into a web using industry standard spunbond type technologies while staple fibers can be formed into a web using industry standard carding, airlaid, or wetlaid technologies. Typical bonding methods include: calendar (pressure and heat), thru-air heat, mechanical entanglement, hydrodynamic entanglement, needle punching, and chemical bonding and/or resin bonding. The calendar, thru-air heat, and chemical bonding are the preferred bonding methods for the starch polymer fibers. Thermally bondable fibers are required for the pressurized heat and thru-air heat bonding methods.

The fibers of the present invention may also be bonded or combined with other synthetic or natural fibers to make nonwoven articles. The synthetic or natural fibers may be blended together in the forming process or used in discrete layers. Suitable synthetic fibers include fibers made from polypropylene, polyethylene, polyester, polyacrylates, and copolymers thereof and mixtures thereof. Natural fibers include cellulosic fibers and derivatives thereof. Suitable cellulosic fibers include those derived from any tree or vegetation, including hardwood fibers, softwood fibers, hemp, and cotton. Also included are fibers made from processed natural cellulosic resources such as rayon.

The fibers of the present invention may be used to make nonwovens, among other suitable articles. Nonwoven articles are defined as articles that contains greater than 15% of a plurality of fibers that are continuous or non-continuous and physically and/or chemically attached to one another. The nonwoven may be combined with additional nonwovens or films to produce a layered product used either by itself or as a component in a complex combination of other materials. Preferred articles are disposable, nonwoven articles. The resultant products may find use in filters for air, oil and water; textile fabrics such as micro fiber or breathable fabrics having improved moisture and odor absorption and softness of wear; electrostatically charged, structured webs for collecting and removing dust and pollutants; medical textiles such as surgical drapes, wound dressing, bandages, dermal patches; textiles for absorbing water and oil for use in oil or water spill clean-up, etc. The articles of the present invention may also include disposable nonwovens for hygiene and medical applications to absorb off-odors. Hygiene applications include such items as wipes; diapers, particularly the top sheet or back sheet; and feminine pads or products, particularly the top sheet.

The yarns or fibers of the textile layers can have any suitable weight per unit length (e.g., denier). Typically, the fibers have a weight per unit length of about 1 to about 50 denier per filament (1 to about 50 g per 9000 meters). The yarns contain a plurality of filaments from 10 to about 5000.

In some embodiments, the P-CDP is adhesively bound to a substrate such as a fiber or fabric via a binder. In some embodiments, the P-CDP is coated on a substrate such as a fiber or fabric via a binder. In some embodiments, the P-CDP is bound to or coated on a substrate such as a fiber or fabric via a binder by introducing the surface to stable aqueous dispersions of the P-CDP particles in conjunction with binders. The P-CDP particle dispersion may be 1-50% by weight and a polymeric binder material may be present in an emulsion or solution in 1-50% by weight. For example, the P-CDP particle dispersion may be present at about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or about 50% by weight. The polymeric binder material may be present in an emulsion or solution at about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or about 50% by weight. Additional auxiliary agents can be used as minor components by weight to control the wetting by the substrate (wetting agent), solution foaming or de-foaming, softening agent for substrate hand, and/or catalyst for binder curing.

A variety of coating techniques known in the art can be applied, such as: dip and squeeze, solution casting, foam coating, or spraying of the formulated solution onto the substrate of interest. Substrates include, but are not limited to: woven, knit or nonwoven fabrics, continuous filament yarns, spun yarns, spun fibers, wood surfaces, and thermoplastic surfaces. In some embodiments, upon application of the formulated solution to the substrate, the combined system will be dried to remove the water solvent at which time an even film of P-CDP particles mixed with polymeric binder will be present. During the drying process, the binder material present as an emulsified polymer will flow together and become a continuous phase. Depending on the choice of binder, the P-CDP particles may be held in place through mechanical means or adhesion to the binder continuous phase only, or additional covalent linkages could be present if a cure-able binder is selected. Such covalent linkages could extend the underlying substrate which would further increase the durability of the P-CDP particle coating.

As will be readily apparent to a skilled artisan, the resultant P-CDP particle film conforms to the underlying substrate and is durable to physical abrasion, and washing such that the article can be deployed. Furthermore, if the P-CDP particles have access to the aqueous or vapor phase within the coating, they will demonstrate the same selective and high affinity small molecule adsorption characteristics as the monolithic particles. Such form factors can be converted into filter cartridges, pleated filters, nonwoven needlepunched filters, hygienic nonwovens, and apparel.

A variety of binders known to a skilled artisan may be used in the context of the present disclosure, such as any of those disclosed in US Patent Publication No. 2014/0178457 A1, which is hereby incorporated by reference in its entirety. Suitable binders include, but are not limited to, latex binders, isocyanate binders (e.g., blocked isocyanate binders), acrylic binders (e.g., nonionic acrylic binders), polyurethane binders (e.g., aliphatic polyurethane binders and polyether based polyurethane binders), epoxy binders, urea/formaldehyde resins, melamine/formaldehyde resins, polyvinylalcohol (PvOH) resins (disclosed in U.S. Pat. No. 5,496,649, which is hereby incorporated by reference in its entirety) and crosslinked forms thereof, poly-ethylenevinylalcohol (EvOH) and crosslinked forms thereof, poly-ethyleneviny- lacetate (EVA), starch and starch derivatives, cellulose ether derivatives, and cellulose ester derivatives. Small molecule, polymeric or inorganic crosslinking agents could be used additionally including formaldehyde, glyoxal, diisocyanates, diepoxides, and/or sodium tetraborate, and combinations thereof.

In some embodiments, the P-CDP particles are mechanically bound to a surface, such as a fibrillating fiber. Fibrillating fibers are used to create high surface area, extended networks which can wrap around and entrap particulate matter. Fibers such as fibrillating polyolefin (such as Mitsui Fybrel®), fibrillating regenerated cellulose (such as Lenzing Tencel™) or fibrillating acrylic (such as Sterling Fibers CFF™) are deployed in wet laid processes to create specialty papers which excellent mechanical properties, good wet strength, and the ability to hold particulate matter (U.S. Pat. No. 4,565,727, which is hereby incorporated by reference in its entirety), Onxy Specialty Papers, Helsa Corporation, and others. In particular, powdered activated carbon particles with diameters greater than 5 microns have been loaded into specialty carbon papers that are deployed in liquid and vapor filtration applications such as point of use water filters or cabin air filters.

In the paper making process, an aqueous dispersion or slurry blend of short cut fibers (such as wood pulp, polyester, nylon, or polyolefin), fibrillating fibers (such as Fybrel®, Tencel™, or CFF™), and particle powder material are mixed (e.g., under high shear). This mixture can then be rapidly passed through a nonwoven mesh or screen to deposit a wet laid nonwoven web. This web is dried (e.g., in hot air oven or on heated rolls) to remove the water carrier. Further bonding may be achieved through cold or hot calendaring either in flat format or with a patterned roll to produce the bonded specialty paper. The particulate powder used can be a dispersion of P-CDP particulates of defined particle size. Particulate size can be set via grinding and milling techniques as defined previously. The particulate loading in the finished nonwoven can be as high as 60% by weight. The particulate can be used alone or blended with other particulate such as powdered activated carbon. Additional chemical binders, such as those described herein, may be used to alter or enhance the properties of the paper and will be applied as one skilled in the art.

The resultant powder loaded papers are amenable to a high loading of P-CDP adsorbent particles in a convenient paper filter form factor for water and/or air filtration. The paper can be used in the flat form, cut into a variety of shapes, or pleated and bonded into a filter media cartridge.

In some embodiments, the P-CDP particles are mechanically entangled in yarn (e.g., continuous filament yarn). In some embodiments, the P-CDP particles are mechanically entangled in continuous filament yarn. As will be readily apparent to a skilled artisan, a special subset of yarn finishing enables the mechanical binding of particulate matter within a continuous filament yarn in some circumstances. When a yarn (e.g., continuous filament) comprised of multiple filaments of a typical synthetic polymer such as polyethyleneterephthalate (PET) or polyamide (nylon 6 or nylon 6,6) that bears microfibrillating tendencies on each filament surface, there exists the possibility to incorporate particulate within the yarn bundles. The P-CDP particles of the present disclosure can be incorporated into the yarn in a variety of ways. One non-limiting example is to apply a dispersion of the P-CDP particles of interest via dip coating or oil roll application onto a moving yarn bundle during the false twist texturing process. In this process, the filaments are mechanically separated via twisting, first in one direction followed by the opposite direction. After the first twisting, the filaments are individualized and void space is presented within the yarn bundle. The dispersion solution is applied at this point within the process after which the bundles are twisted back to the standard orientation and the yarn heated to dry the solution. This process enables the application of dispersion particles within the yarn bundles that are held in place by the continuous filaments and microfibrils emanating from the continuous filament surface. Such approaches have been used to apply various micron sized particles to continuous filament yarns, including microcapsules (US Patent Publication No. 2005/0262646 A1, which is hereby incorporated by reference in its entirety), metallic silver microparticles (US Patent Publication No. 2015/0361595 A1, which is hereby incorporated by reference in its entirety), and (US Patent Publication No. 2006/0067965 A1, which is hereby incorporated by reference in its entirety) other functional particles to synthetic fiber yarn bundles. These textured and particle loaded yarns may then be processed through typical means to create knit and woven fabrics for use in apparel, upholstery, medical, displays, or other uses.

In some embodiments, the P-CDP particles are incorporated into thermally-bonded, particulate pressed forms. A common form factor for powdered absorbent material is in thermally-bonded pressed forms. Such form factors can contain as high as 95% by weight P-CDP particles, with the addition of fibrillating fibers (Fybrel®, Tencel™, or CFF™), sometimes inorganic materials such as attapulgite clays, and finally an organic binder material (most typically cellulose esters and similar derivatives) to create a porous composite structure with adequate mechanical strength and particulate holding efficiency for medium pressure filtration applications such as faucet filters and refrigerator filters (U.S. Pat. Nos. 5,488,021 and 8,167,141, both of which are hereby incorporated by reference in their entireties).

P-CDP dry particles or dispersion can be used in place of or blended with other adsorbent materials to form such a composite adsorbent P-CDP particulate-containing forms as described above. In such embodiments, the solid dry components may be dry blended, optionally including dry P-CDP particles and organic binder powder with or without inorganic clays and/or fibrillating fibers. If an aqueous dispersion of P-CDP particles is used, they may be diluted with water and added to the mixture. Water is added (e.g., in 80-150 wt %) and the mixture is blended (e.g., under high shear) to create a plastic material. This material may be formed into the desired form factor, dried and cured at temperatures ranging from 125 to 250° C. This final form factor presents the P-CDP adsorbent particles in a form factor common to and useful for point of use water filters.

In some embodiments, the P-CDP particles are incorporation into solution processed polymer form factors. A variety of means are available to produce filter membrane materials. For example, via solution cast films or extrude hollow fibers of membrane polymers where controlled coagulation creates a condensed film of controlled pore size. In some embodiments, a polymer such as cellulose acetate dissolved in a water miscible organic solvent such as NMP, DMSO, or THE is used. This solution can be cast as a film into a water bath which causes rapid coagulation of the cellulose acetate polymer and densification of the film. These films may be processed on roll to roll equipment and many layers are wrapped to create a spiral wound membrane filter for use in micro-filtration, ultra-filtration, gas filtration, or reverse osmosis applications. In place of cellulose acetate, common polymers used include polyamides, polyolefins, polysulfones, polyethersulfones, polyvinylidene fluoride, and similar engineered thermoplastics. It is also possible to extrude hollow fibers into the aqueous solution to create membrane fibers through the phase inversion process that are known as hollow-fiber membranes commonly used for dialysis, reverse osmosis, and desalination applications.

In some embodiments, the P-CDP particle matter is incorporated into membrane material to enhance the performance of the membrane materials. For example, it is possible to have present in the aqueous coagulation bath a small quantity of P-CDP particle dispersion that will become incorporated into the dense portions or porous portions of the membrane during the phase inversion process. A second manner to incorporate the P-CDP particles into the membrane is the incorporation of a small amount of well-dispersed particles into the organic solution of the membrane polymer that become encapsulated in the membrane following coagulation. Through each of these methods, the production of P-CDP loaded polymer forms may be enabled. In various embodiments, such as micro-filtration, ultra-filtration, and reverse osmosis, the P-CDP particle incorporation acts to enhance the micropollutant removal of the membrane system.

In some embodiments, the P-CDP particles are incorporated into melt extruded thermoplastics (e.g., fibers and molded parts). Having access to small diameter dry powder P-CDP particle material of low polydispersity enables its incorporation into melt processed polymer forms including fibers and molded parts. Typical thermoplastics of use include polyethyleneterephthalate, co-polyesters, polyolefins, and polyamides. Typical extrusion temperatures are between 250-300° C. and therefore P-CDP particle stability to those temperatures either under air (most preferred) or inert atmosphere is required. Single or twin-screw extrusion is used to blend and mix the powdered material at elevated temperatures under shear with the thermoplastic in up to five weight percent. Once adequately mixed, the blended components can be extruded through small round or otherwise shaped orifices and drawn to produce fibers bearing the particulate matter linear densities ranging from 1 to 20 denier per filament. A common particle added to most thermoplastic fibers is titanium dioxide added to whiten and deluster the fiber. The P-CDP particles will be added in a similar fashion. In the most ideal embodiment, the P-CDP particles will migrate to the surface of the fibers and bloom due to their higher surface energy such that a portion of the particles are present and accessible by the vapor or liquid phase. In other embodiments, instead of extruding the polymer melt through small orifices, it can be blow molded or otherwise melt processed to produce a plastic part. This plastic part will also bear the P-CDP particles that bloom to the surface and become active for the removal of small molecule micropollutants (e.g. anionic MPs) from the vapor and liquid phase.

The P-CDP of the present disclosure can be supported or formed into a variety of shapes (or form-factors) suitable for various applications. For example, the P-CDP materials of the present disclosure can be in the form of powders, granules, formed into discs, e.g., in a cellulosic material such as paper or other non-woven forms, or extruded or pressed into various shapes suitable for, e.g., filtration, water treatment, sample absorption, etc. as described herein.

While it is not unknown to provide adsorbents in a supported form, it is important that the methods used to affix the adsorbent to the substrate or support are sufficiently robust so as to withstand the use conditions. Further, the means of attachment to the substrate should not interfere with or block the adsorption mechanism of the adsorbent. The adsorbents disclosed herein can be attached to supports, as described herein, so that the resulting performance characteristics are only minimally affected by the attachment method. In various embodiments, the supported polymeric materials of the present invention provide performance characteristics which are at least 50% of the same performance characteristic which would be provided by the same composition of adsorbent prepared without a support material (based on equivalent amounts of the adsorbent) when measured under identical conditions. So for example a porous material grafted to microcrystalline cellulose (e.g., a P-CDP crosslinked with an aryl linker of formula (I)—CMC substrate complex) may have at least 50% of one or more of a particular performance characteristic found in unsupported porous material tested under the same conditions.

In some embodiments, the performance characteristic can be the amount of uptake (adsorption capacity) of a particular pollutant, measured as the milligrams of pollutant adsorbed per gram P-CDP particle under particular conditions. In other embodiments, the performance characteristic can be the equilibrium adsorption capacity ($q_e$), defined as discussed herein as:

$$q_e = q_{max} \frac{C_e K_L}{C_e K_L + 1}$$

wherein $q_{max}$ (mg pollutant/g adsorbent) is the maximum adsorption capacity of the sorbent for a particular pollutant at equilibrium, $K_L$ (mol$^{-1}$) is the equilibrium constant and $c_e$(mM) is the pollutant concentration at equilibrium.

In still other embodiments, the performance characteristic is the rate at which equilibrium adsorption of a pollutant is reached (rate of equilibrium adsorption for a particular adsorbent. This rate can be expressed as the time required for a supported or unsupported P-CDP of the present disclosure to reach equilibrium for a particular adsorbed species (or pollutant).

In still other embodiments, the performance characteristic is the rate at which competing adsorbents sequester pollutants. Competing adsorbents may be unsupported P-CDPs as described herein, or other agents, such as activated carbons (powdered or granular), ion-exchange resins, and specialized resins used for solid-phase microextraction (e.g., HLB).

For any of these performance characteristics disclosed above, the performance of the supported P-CDP of the present disclosure is at least about 50%, 60%, 70%, 80%, 90%, 100%, 120%, 140%, 160%, 180%, 200%, 220%, 240%, 260%, 280%, 300%, 350%, 400%, 450%, 500% or greater, inclusive of all values, ranges, and subranges therebetween compared to unsupported P-CDP of the same composition, tested under essentially the same conditions, e.g., with the same pollutant, temperature, pressure, exposure time, etc.

The performance characteristics of the present disclosure can be measured, for example based on bisphenol A or PFASs or another suitable specie as disclosed herein, by a variety of methods which will be readily apparent to a skilled artisan. For example, the contaminant may be measured at initial concentrations of BPA or another suitable specie ranging from 1 ppb (or 1 microgram/L or 5 nM) to 1 ppt (or 1 g/L or 5 mM) in any aqueous sample, including but not limited to drinking water, wastewater, ground water, aqueous extracts from contaminated soils, landfill leachates, purified water, or other waters containing salts, or other organic matter. The pH may be range from 0-14. For example, the pH may be 0, 1, 2, 3, 4, 5, 6, 7, 8, 9, 10, 11, 12, 13, or 14, inclusive of all ranges therebetween. The performance characteristics may be measured substantially as described herein (e.g., in Examples 1 and 2), with routine modifications (such as temperature and pressure) also being envisioned.

In some embodiments, the present disclosure provides an article of manufacture comprising one or more P-CDPs or one or more P-CDP-substrate complexes of the present disclosure.

In an embodiment, the article of manufacture is protective equipment. In an embodiment, the article of manufacture is clothing. For example, the article of manufacture is clothing comprising one or more P-CDPs or one or more P-CDP-substrate complexes of the present disclosure (e.g., clothing such as a uniform at least partially coated with the porous polymeric material or composition). In another example, the article is filtration medium comprising one or more P-CDPs or one or more P-CDP-substrate complexes of the present disclosure. The filtration medium can be used as a gas mask filter. In an embodiment, the article is a gas mask comprising the filtration medium. In some embodiments, the article is an extraction device.

In another embodiment, the article is a solid phase microphase (SPME) extraction device comprising one or more P-CDPs or one or more P-CDP-substrate complexes of the present disclosure, where the P-CDPs or P-CDP-substrate complexes is the extracting phase the device.

In another embodiment, the article is a device for a solid-phase extraction of polar and semi-polar organic molecules. The device comprises one or more P-CDPs or one or more P-CDP-substrate complexes of the present disclosure instead of HLB media (hydrophilic/lipophilic balanced). The article with the one or more P-CDPs or one or more P-CDP-substrate complexes outperforms the HLB media.

In another embodiment, the article is a device for liquid filtration of polar and semi-polar organic molecules. The device comprises one or more P-CDPs or one or more P-CDP-substrate complexes of the present disclosure adhered within a fibrous web (as disclosed in U.S. Pat. No. 7,655,112, which is hereby incorporated by reference in its entirety). Other embodiments include the device comprising P-CDP powders fused via thermoplastic binder polymer to create porous monolithic filtration media (as disclosed in U.S. Pat. No. 4,753,728, which is hereby incorporated by reference in its entirety).

The P-CDP materials of the present disclosure, in the various forms and form factors disclosed herein (including supported and unsupported P-CDP materials) can be used in any application in which it is desirable to separate compounds (e.g., anionic or cationic MPs) from a fluid (gases such as air, liquids such as water, aqueous beverages, biological fluids, etc.). The P-CDP materials can be used to "trap" or adsorb desired species for further analysis or quantification (e.g., in analytical testing for environmental pollutants in air or water), to separate mixtures (e.g., in a chromatographic separation), or to isolate desirable or valuable species which are present as a dilute form in a fluid. In some embodiments, the P-CDP materials of the present disclosure can be used to purify a fluid (e.g., by removing undesirable or noxious impurities), or can be used to isolate desirable compounds from a mixture or dilute fluid solution.

In some embodiments, the present disclosure provides a method of removing one or more compounds (e.g. anionic MPs) from a fluid sample or determining the presence or absence of one or more compounds in a fluid sample comprising: a) contacting the sample with the porous polymeric material of the present disclosure or the supported porous polymeric material of the present disclosure for an incubation period; b) separating the porous polymeric material or supported porous polymeric material after the incubation period from the sample; and c) heating the porous polymeric material or supported porous polymeric material separated in step b), or contacting the porous polymeric material or supported porous polymeric material separated in step b) with a solvent, thereby releasing at least a portion of the compounds from the porous polymeric material or supported porous polymeric material; and d1) optionally isolating at least a portion of the compounds released in step c); or d2) determining the presence or absence of the compounds released in step c), wherein the presence of one or more compounds correlates to the presence of the one or more compounds in the sample. In some embodiments, the one or more cyclodextrin moieties are β-cyclodextrin moieties. In some embodiments, said determining is carried out by gas chromatography, liquid chromatography, supercritical fluid chromatography, or mass spectrometry. In some embodiments, said contacting is by flowing the aqueous phase across, over, around, or through the supported porous polymeric material. In some embodiments, the aqueous sample is contacted with the P-CDP-substrate complex under static conditions for an incubation period and after the incubation period the aqueous sample is separated from the porous polymeric material. In some embodiments, the sample is a food and the compounds are volatile organic compounds. In some embodiments, the aqueous sample is drinking water, wastewater, ground water, aqueous extracts from contaminated soils, or landfill leachates. In some embodiments, the sample is a perfume or fragrance and the compounds are volatile organic compounds. In some embodiments, the compounds are anionic micropollutants, heavy metals, and/or dyes. In some embodiments, the compounds are anionic MPs, such as PFASs (e.g. polyfluorinated alkyl compounds and/or perfluorinated alkyl compounds). In some embodiments, the PFASs are PFOA and/or PFOS.

In an embodiment, a method of purifying an aqueous sample comprising one or more organic compounds is provided, the method comprising contacting the aqueous sample with the porous polymeric material of the present disclosure or the supported porous polymeric material of the present disclosure such that, for example, at least 50% to at least 99% of the one or more pollutants is bound to one or more of the cyclodextrin (e.g., β-cyclodextrin) moieties of the porous polymeric material. For example, the aqueous sample is flowed across, around, or through the porous polymeric material. In another example, the aqueous sample contacted with the porous polymeric material or the supported porous polymeric material under static conditions for an incubation period and after the incubation period the aqueous sample is separated (e.g., by filtration) from the porous polymeric material. The method can be used to purify aqueous samples such as drinking water, wastewater, ground water, aqueous extracts from contaminated soils, and landfill leachates. In some embodiments, the organic compounds are anionic MPs, such as PFASs.

In an embodiment, a method of determining the presence or absence of compounds (e.g., anionic MPs) in a sample comprises: a) contacting the sample with the porous polymeric material of the present disclosure or the supported porous polymeric material of the present disclosure for an incubation period (e.g., 1 minute or less, 5 minutes or less, or 10 minutes or less); b) isolating the complex from a) from the sample; and c) heating the complex material from b) or contacting the complex from b) with a solvent (e.g., methanol) such that at least part of the compounds are then released by the porous material; and d) determining the presence or absence of any compounds, wherein the presence of one or more compounds correlates to the presence of the one or more compounds in the sample, or isolating (e.g., by filtration) the compounds. For example, the determining (e.g., analysis) is carried out by gas chromatography or mass spectrometry. For example, the sample is a food or beverage (e.g., milk, wine, fruit juice (e.g., orange juice, apple juice, and grape juice), or an alcoholic beverage (e.g., beer and spirits)) and the compounds are volatile organic compounds. The porous polymeric material or supported porous polymeric material can be the extracting phase in a solid phase microextraction (SPME) device. In some embodiments, the organic compounds are anionic MPs, such as PFASs.

In an embodiment, a method for removing compounds (e.g., organic compounds) from a sample comprises: a) contacting the sample with the porous polymeric material of the present disclosure or the supported porous polymeric material of the present disclosure for an incubation period such that at least some of the compounds are sequestered in the polymer; b) isolating complex from a) from the sample; c) heating the complex from b) or contacting the complex from b) with a solvent (e.g., methanol) such that at least part of the compounds are released by the porous polymeric material; and d) optionally, isolating at least a portion of the compounds. In some embodiments, the compounds are anionic MPs, such as PFASs.

A variety of compounds can be involved (e.g., sequestered, detected, and/or isolated) in the methods. The compounds can be organic compounds. The compounds can be desirable compounds such as flavorants (e.g., compounds that impact the palatability of foods) or pharmaceutical compounds (or pharmaceutical intermediates), contaminants (e.g., PCBs, PBAs, etc.), and/or adulterants. In some embodiments, the compounds are anionic MPs, such as PFASs. In some embodiments, the compounds are anionic MPs selected from the group consisting of gemfibrozil, oxybenzone, diclofenac, ioxynil, ketoprofen, naproxen, sulfamethoxazole, warfarin, 2,4-dichlorophenoxyacetic acid, clofibric acid, ibuprofen, 2-methyl-4-chlorophenoxyacetic acid, mecoprop, valsartan, perfluorobutanoic acid, perfluorobutane sulfonic acid, perfluoropentanoic acid, perfluoropentane sulfonic acid, perfluorohexanoic acid, perfluorohexane sulfonic acid, perfluoroheptanoic acid, perfluoroheptane sulfonic acid, perfluorooctanoic acid, perfluorooctane sulfonic acid, perfluorononanoic acid, perfluorononane sulfonic acid, perfluorodecanoic acid, perfluorodecane sulfonic acid, perfluoroundecanoic acid, perfluorododecanoic acid, perfluorotridecanoic acid, perfluorotetradecanoic acid, 2,3,3,3-tetrafluoro-2-(heptafluoropropoxy) propanoate, and combinations thereof.

The cyclodextrins are chiral. In an embodiment, a chiral compound is sequestered, detected, and/or isolated. In an embodiment, a chiral column (e.g., a preparative-scale or analytical-scale column is packed with a chiral porous polymeric material or composition comprising chiral porous polymeric material) is used to separate and detect or isolate (or at least significantly enrich the sample in one enantiomer) a single enantiomer of a compound.

In the methods, the porous polymeric material or the supported porous polymeric material can be regenerated (e.g., for reuse in the methods). For, example, the porous polymeric material is regenerated by heating and/or exposure to solvent (e.g., alcohols such as methanol or ethanol, and aqueous mixtures thereof).

The following examples are provided to illustrate the present disclosure, and should not be construed as limiting thereof.

Example 1: Synthesis of β-CD-TDI Polymer

Figure 5:
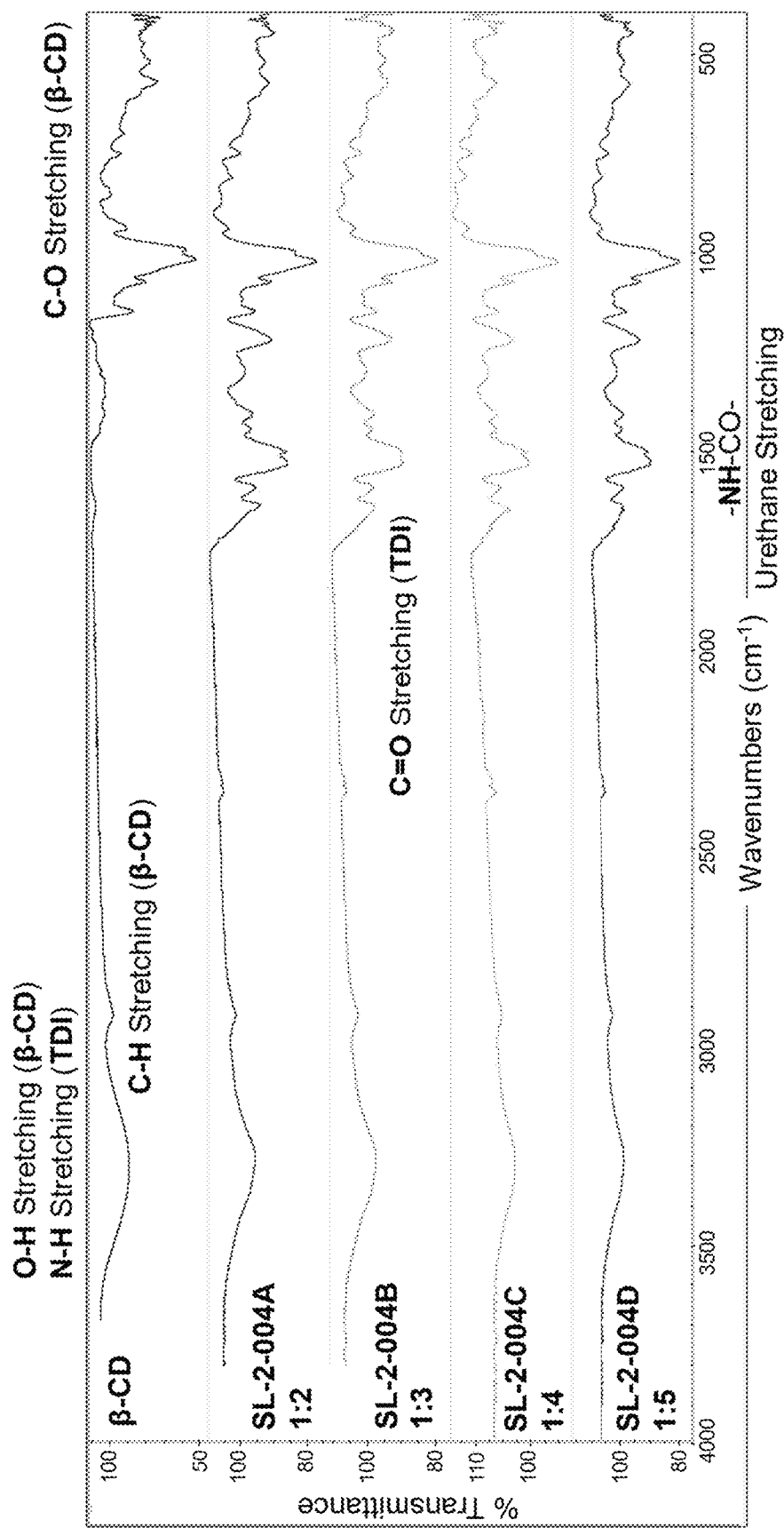
FIG. 5 shows a comparison of various β-CD-TDI polymers made with different β-CD:TDI molar equivalents.
Figure 6:
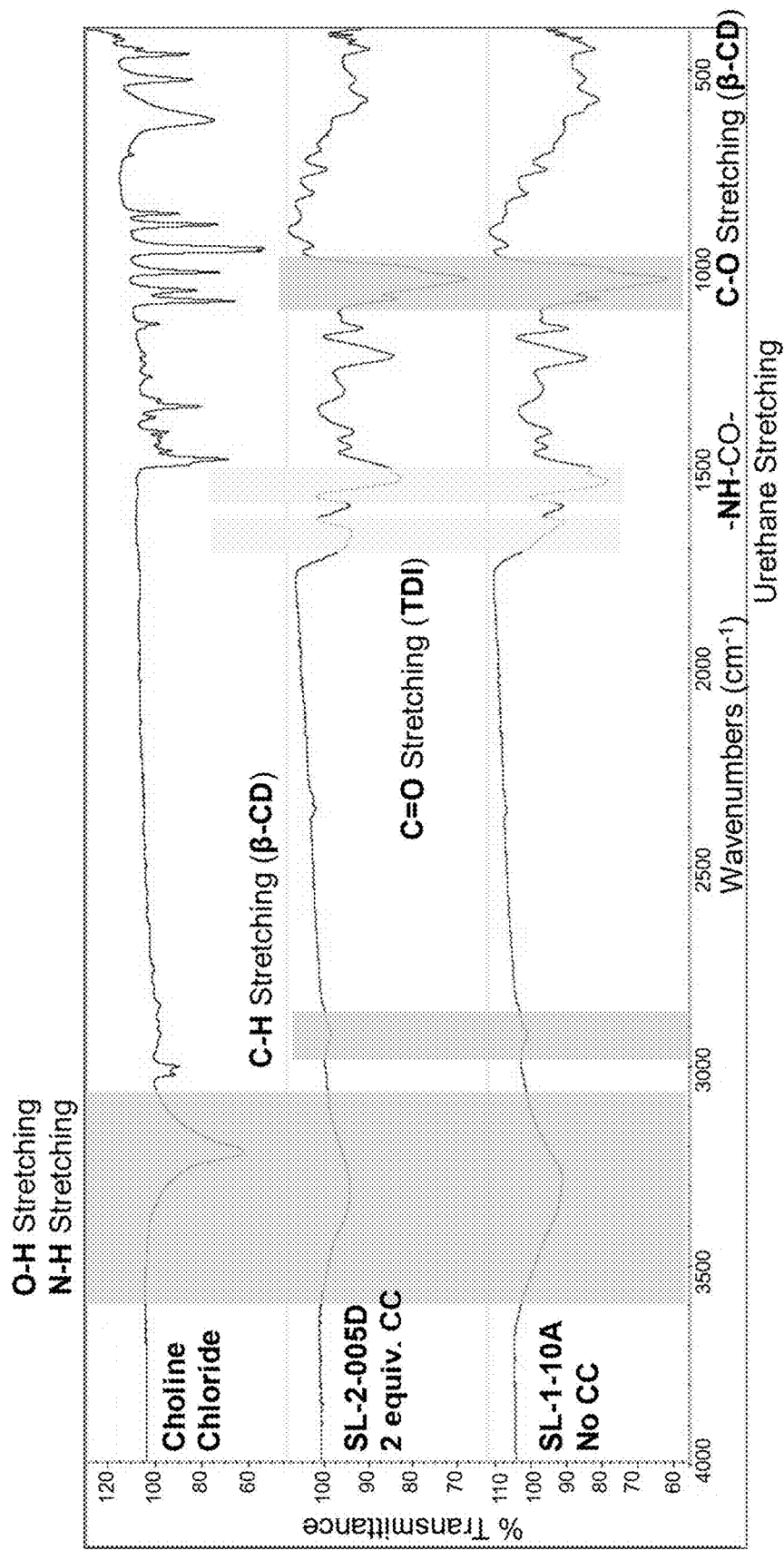
FIG. 6 shows a comparison of choline chloride-modified β-CD-TDI polymers made with different molar equivalents of choline chloride.
Figure 6:
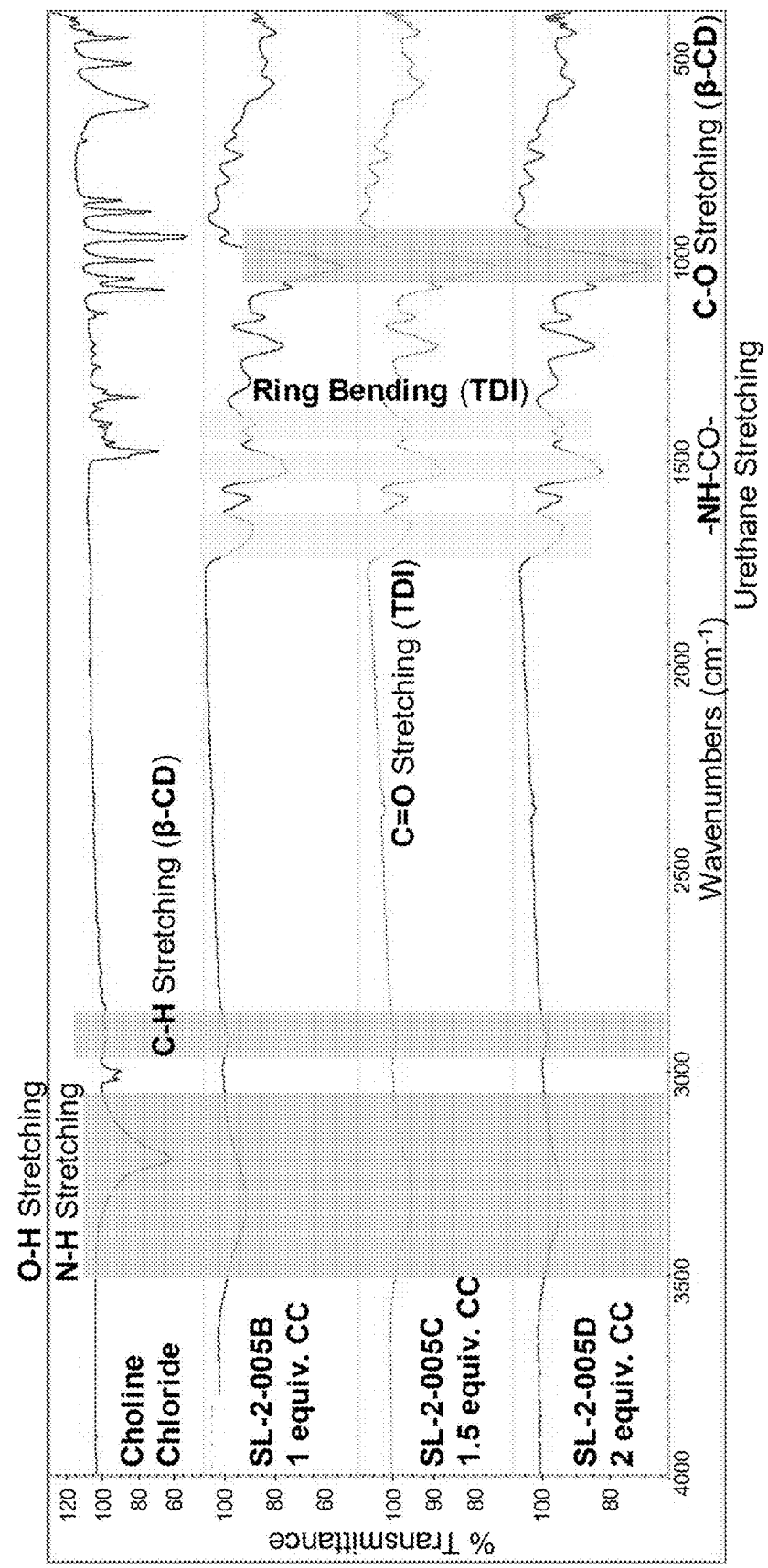

Reagents: β-CD: Wacker, Cavamax W7 (Used as-is); Tolylene-2,4-diisocyanate (TDI): Sigma Aldrich, 95%, Product #T39853; N,N-Dimethylformamide (DMF): Fisher Chemical, Certified ACS grade, Catalog #D119-4; Water: Deionized (DI) water from Milli-Q system Procedure: β-CD (60.0 g, 0.0529 mol, 1 eq.) was dissolved in 120 mL DMF in a 500 mL one-neck round bottom flask at a magnetic stir rate of 400 rpm and the temperature was set to 80° C. An oil bath equipped with thermocouple was used for heating. After completely dissolving β-CD, TDI (36.8 g, 0.2115 mol, 4 eq.) was added subsequently to the flask at 80° C. Air bubbles were observed likely due to the presence of water in the reaction medium. After about 1 min when there was no bubble produced, the flask was capped with a rubber septum. After 3 h, the reaction was stopped by adding 30 mL of methanol and turning off the heating. The resulting viscous clear solution was precipitated into 1.2 L methanol to obtain white powder product. After 1 h stirring, the crude product was filtered under vacuum using a Buchner funnel. The filtered polymer powder was transferred back to a 2-L beaker and washed again with 1.5 L DI water×2 times and 1.2 L methanol×1 time. During each cycle the washing time was 1 h. After final filtration, wet solid product was transferred to an evaporating dish, which was placed into a vacuum oven at 80° C. to yield 72.6 g dry polymer. It was observed that starting at a 6 equivalence of TDI and above, a hard gel is obtained which is difficult to work up. In contrast, TDI:CD ratios in the range of 2:1-5:1 provide a powder material upon stopping the reaction with methanol (Table 1). These polymers are also soluble in a variety solvents such as DMF but not in water. See FIG. 5 for a further comparison of the polymers of Table 1.

TABLE 1

Synthesis of β-CD-TDI polymers

| Material | β-CD:TDI ratio | Solvent | T (° C.) | Time | Yield | Notes |
|---|---|---|---|---|---|---|
| SL-2-001A | 1:4 | Anhydrous DMF | 80 | 16 h | 58% | White powder* |
| SL-2-002B | 1:6 | Anhydrous DMF | 80 | 16 h | n/a | Gel |
| SL-2-002C | 1:8 | Anhydrous DMF | 80 | 16 h | n/a | Gel |
| SL-2-002D | 1:10 | Anhydrous DMF | 80 | 16 h | n/a | Gel |
| SL-2-004A | 1:2 | Anhydrous DMF | 80 | 3 h | 36% | White powder |
| SL-2-004B | 1:3 | Anhydrous DMF | 80 | 3 h | 55% | White powder |
| SL-2-004C | 1:4 | Anhydrous DMF | 80 | 3 h | 61% | White powder |
| SL-2-004D | 1:5 | Anhydrous DMF | 80 | 3 h | 72% | White powder |
| SL-2-004E | 1:6 | Anhydrous DMF | 80 | 3 h | n/a | Gel |

*Washed with methanol × 1, water × 2, and methanol × 1.

β-CD-TDI Optimization Studies

The β-CD-TDI polymer was further optimized by checking the solubility of β-CD (as-is and dried) in regular and anhydrous DMF, the results of which are shown in Table 2. As-is β-CD has a water content in the range of 12-14% water.

TABLE 2

Solvents and β-CD water content comparison in the synthesis of β-CD-TDI polymers

| Solubility test | Regular DMF | Anhydrous DMF |
|---|---|---|
| As-is β-CD | 0.5 g/mL | 0.5 g/mL |
| Dried β-CD | 0.25 g/mL | 0.22 g/mL |

As shown in Table 2, the solubility of β-CD is significantly affected based on its water content. Consequently, when dried β-CD is used, the polymerization can only be carried out lower initial concentrations that impact reaction yields. In comparison, the water content of DMF is insignificant and therefore has less impact on the solubility, prompting us to use regular DMF in the reaction. A comparison of β-CD-TDI polymers made via small and large scale batches is shown below in Table 3.

TABLE 3

A comparison of β-CD-TDI polymers made via small and large scale batches

| Material | β-CD:TDI ratio | DMF (anhydrous) volume | [TDI] (mol/L) | T (° C.) | Time | Yield |
|---|---|---|---|---|---|---|
| SL-1-010A | 1:4.7 | 4 mL | 1.76 | 80 | 3 h | 79% |
| SL-2-003 | 1:4.7 | 120 mL | 1.76 | 80 | 3 h | 82% |

Water content of β-CD used: 14%

It was previously understood that the use of dried β-CD and anhydrous solvents was critical for making polyurethane-type CD polymers; however, as described herein, using "wet" solvents (also referred to as "regular" solvents) such as DMF and/or as-is β-CD, the resulting polymer is structurally different than the polymers described in the literature and are much more effective for PFAS sequestration. It was surprisingly discovered that using wet/regular solvents resulted in partial isocyanate reduction, shown below in Scheme 1 for TDI.

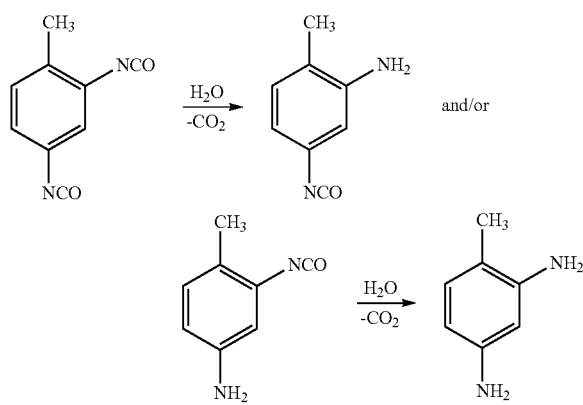

Scheme 1: Effects of water on isocyanate groups of TDI.

The presence of amine groups into the polymerization reaction is believed to result in the formation of urea linkages in addition to the urethane linkages which result from the crosslinking of β-CD and TDI under anhydrous conditions (e.g. completely anhydrous conditions). Additionally, the presence of free amines in the β-CD-TDI polymer are believed to contribute to PFAS removal. The high amine and urea content provides a polymer that is structurally different from the prior art and which is more advantageous for the removal of anionic micropollutants (e.g. PFAS).

Elemental analysis data shows that final CD:TDI ratio is 1:8-1:10 when a feed ratio of 1:4 is used, which suggests the presence of excess TDI units on cyclodextrins. Additionally, $^1$H NMR spectroscopy shows the presence of —$CH_3$ protons resulting from the amine functionalized phenyl unit (FIG. 3). Amine groups can be quantified using the —$CH_3$ peak at ~1.9 ppm that originates from a TDI unit with amine groups on it. The ratio of that integration to total integration of —$CH_3$ peaks provide the percentage of TDIs with amines. Since absolute TDI density can be calculated from the elemental analysis data, the concentration (mmol/g) of amine groups in the polymers can be calculated by correlating NMR and EA data. See Table 4. The β-CD-TDI polymer additionally tested positive in the chloranil test, further confirming the amine presence.

TABLE 4

Determination of amine content of β-CD-TDI polymers made with regular DMF

| | | NMR Integration (based on one β-CD unit) | | | | Elemental Analysis | | |
|---|---|---|---|---|---|---|---|---|
| Sample | CD:TDI feed ratio | $CH_3$ (total) | $CH_3$ (amine) | TDI:CD ratio | Amine (%) | TDI:CD ratio | [TDI] mmol/g | [Amine] mmol/g |
| SL-1-010A | 1:4.7 | 38.18 | 1.77 | 12.7 | 4.6% | 9.6 | 3.32 | 0.15 |
| SL-2-001A | 1:4 | 25.23 | 1.59 | 8.4 | 6.3% | 6.2 | 2.69 | 0.17 |
| SL-2-003 | 1:4.7 | 31.68 | 1.78 | 10.6 | 5.6% | 6.8 | 2.82 | 0.16 |
| SL-2-004A | 1:2 | 43.16 | 4.19 | 14.4 | 9.7% | 11.3 | 3.52 | 0.34 |
| SL-2-004B | 1:3 | 39.38 | 2.66 | 13.1 | 6.7% | 9.5 | 3.30 | 0.22 |
| SL-2-004C | 1:4 | 37.76 | 2.45 | 12.6 | 6.5% | 9.2 | 3.23 | 0.21 |
| SL-2-004D | 1:5 | 39 | 1.92 | 13.0 | 4.9% | 9.2 | 3.24 | 0.16 |

The amine-containing β-CD-TDI polymers were further tested against a panel of 12 PFASs (FIG. 1) as well as against the binary mixture of PFOA and PFOS (FIG. 2). The polymer made with 4 eq. of TDI (SL-1-010A) showed 70% removal of PFOA and excellent removal of PFOS (96%) in only 30 min and reached nearly 90% PFOA and 100% PFOS removal over 48 h in the panel study. A similar removal performance was also observed when tested for the binary mixture of PFOA and PFOS.

Example 2: Synthesis and PFAS Removal Activity of β-CD-Isocyanate Polymers

Following the general procedure outlined in example 1, β-CD-isocyanate polymers obtained from 4,4'-MDI were synthesized and tested for their ability to remove PFASs.

The polymers of Table 5 were tested for their ability to remove PFASs. All experiments were conducted with 1000 ng/L of each of 12 PFASs and 10 mg/L of adsorbent. Control experiments were performed with no adsorbent. These experiments were conducted in triplicate. Samples were taken at the following times: 0 h, 0.5 h, 9 h, and 48 h. FIG.

1 shows the results at 0.5 and 48 h, with polymers made from 4,4'-MI and 2,4-TDI being particularly effective at PFAS sequestration. Although faster removal kinetics was observed in the TDI polymer (SL-1-010A), the MDI polymer (SL-0420-3) also had good removal performance over the course of 48 h. Polymers obtained from 6 eq. of TDI and MDI did not exhibit good removal of either PFOA or PFOS, most likely due to the formation of hard gel during their synthesis which renders binding sites inaccessible in the particle.

TABLE 5

β-CD polymers made with different isocyanates

| Polymer | Crosslinker | CD:isocyanate ratio | Sieved from |
|---|---|---|---|
| SL-1-010A | 2,4-TDI | 1:4 | 230 mesh |
| SL-1-010A | 2,4-TDI | 1:6 | 80 mesh |
| SL-1-0420-3 | 4,4'-MDI | 1:4 | 230 mesh |
| SL-1-0420-4 | 4,4'-MDI | 1:6 | 80 mesh |

Example 3: Synthesis and PFAS Removal Activity of Choline Chloride-Modified β-CD-TFN Polymer In this example, positive charges were added onto CD polymers in order to enhance the binding affinity for anionic PFASs. Without being bound by any particular theory it is believed that the presence of phenol groups produced in a side reaction during polymerization results in anionic charge on the polymer and diminishes the PFOA and PFOS uptake of polymers. This effect was experimentally observed in another polymer formulation, TFN-CDP, which demonstrates good removal performance against a broad range of micropollutants except negatively charged ones including PFASs. TFN-CDP can be produced in relatively large scales using tetrafluoroterephthalonitrile (TFN) as the crosslinker. Therefore, it was desired to modify the adsorption properties for PFASs by incorporation of positive charges on the polymer backbone. In this example, choline chloride—a quaternary ammonium salt with a hydroxyl group—was chosen as an additive to the polymerization reaction of TFN-CDP. Choline chloride can react with TFN just like β-CD and thus is incorporated into the polymer, which hereafter will be denoted as TFN-CDP+ (Scheme 2).

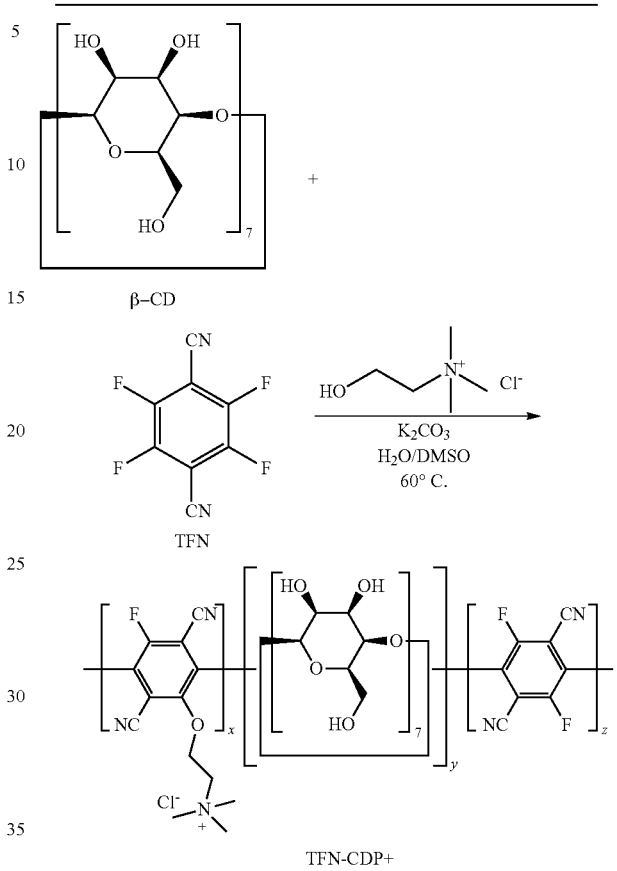

Scheme 2: Synthetic overview for choline chloride-modified β-CD-TFN polymers

TABLE 6

Synthetic conditions and yields for TFN-CDP+ polymers

| Sample Name | β-CD eq. | TFN eq. | K2CO3 eq. | CC eq. | Yield (%) | Crosslinker: CD | [β-CD] (mmol/g) | [CC] (mmol/g) | BPA uptake (%) | MO uptake (%) |
|---|---|---|---|---|---|---|---|---|---|---|
| MB-1-036 | 1 | 6 | 20 | 3 | 81 | 5.5 | 0.37 | 0.63 | 74 | >99 |
| MB-1-037 | 1 | 6 | 20 | 6 | 74 | 5.6 | 0.35 | 0.96 | 67 | >99 |

*CC: Choline chloride. BPA uptake measured under following conditions: [BPA]$_0$ = 23 ppm, [Polymer] = 1 mg,mL, Contact time = 1 min. MO uptake measured under following conditions: [MO]$_0$ = 10 ppm, [Polymer] = 1 mg/mL, Contact time = 1 h.

TABLE 7

Porosity comparison for TFN-CDP+ polymers

| Sample | Choline Chloride (eq) | Surface area (m$^2$/g) |
|---|---|---|
| MB-1-036 | 3 | 574 |
| MB-1-037 | 6 | 19 |

TABLE 8

Elemental analysis for TFN-CDP+ polymers

| Sample | Feed equivalents | | | Ratios | | | | | TFN:CD ratio | C (mmol/g) | F (mmol/g) | Cl (mmol/g) |
|---|---|---|---|---|---|---|---|---|---|---|---|---|
| | β-CD | TFN | CC | C:N | N:F | N:Cl | F:Cl | C:Cl | | | | |
| MB-1-036 | 1 | 6 | 3 | 7.45 | 2.23 | 7.51 | 3.36 | 55.98 | 5.49 | 35.2 | 2.1 | 0.63 |
| MB-1-037 | 1 | 6 | 6 | 7.19 | 2.73 | 5.07 | 1.86 | 36.44 | 5.64 | 35.1 | 1.8 | 0.96 |

Prior to measuring PFAS removal, a comparison of BPA (a neutral molecule) and methyl orange (MO, a negatively charged dye molecule) uptakes of TFN-CDP and TFN-CDP+ was performed. While BPA uptake was not affected, MO uptake was significantly improved, from ~30% for TFN-CDP to >99% for TFN-CDP+. As expected, TFN-CDP+ polymers demonstrated significantly less affinity towards positively charged molecules such as methylene blue compared to TFN-CDP (Table 9; FIG. 7). Encouraged by this preliminary data, TFN-CDP+ was tested for the removal of PFOA and PFOS at environmentally relevant concentrations.

TABLE 9

MP removal efficiencies of choline cloride modified and unmodified TFN-CDP

| Sample | BPA | Methyl Orange | Methylene Blue |
|---|---|---|---|
| MB-1-036 | 74% | 99% | 34% |
| MB-1-037 | 67% | 99% | 10% |
| TFN-CDP | 80% | 30% | 100% |

Although further experiments are needed to fully characterize the adsorption mechanism, this approach allows one to (1) take advantage of dual binding mechanism (inclusion complex with β-CD and ionic interactions) at the same time in a single material and/or (2) enhance the binding affinity of the inclusion complex through the presence of positive charges in the vicinity of CD cavities. Furthermore, TFN-CDP+ is still synthesized in one step and the amount of positive charges incorporated can be easily modified by changing the amount of choline chloride used in the reaction.

Experimental: β-CD (1 g, 0.881 mmol), TFN (1.06 g, 5.286 mmol), $K_2CO_3$ (2.44 g, 17.621 mmol), choline chloride (0.37 g, 2.643 mmol), and 5.4 mL $H_2O$/DMSO (2:3, v/v) were added to a 20-mL scintillation vial equipped with a magnetic stir bar. The mixture was stirred at 60° C. for 20 h. Additional solvent (1 mL) was added after the first hour of stirring. After 20 h, 10 mL of water was added and stirred to disperse the polymer for 30 min. After filtering, the crude product was transferred to a centrifuge tube. The sample was washed with hot methanol (~40 mL) three times (30 min for each cycle). After decanting methanol, DI water (~30 mL) was added. 1 M HCl was added dropwise while stirring the sample until the pH was stable between 3-4. The crude product was further washed two more times with hot methanol (~40 mL). The final methanol wash was filtered under vacuum and product was dried at 80° C. overnight.

Testing PFOA and PFOS removal performance—PFAS adsorption experiments were performed to measure the removal performance of different TFN-CDP+ polymers. In an effort to facilitate the screening process for a large number of polymer formulations, adsorption kinetics were performed using a mixture of 12 PFASs in nanopure water. The understanding of adsorption kinetics is essential as it reveals information on adsorbent doses and required contact times that are relevant for treatment processes. In addition to providing insights into PFOA and PFOS uptake, this panel study also allowed assessment of performance against other PFASs such as GenX and short- and long-chain PFASs in order to determine broad-spectrum PFAS removal capabilities of these polymers. The results summarized in FIG. 1 show the removal percentages for each PFAS at 30 min and 48 h contact times. These experiments were conducted in triplicate with ~1 ppb of each of the 12 PFASs in nanopure water at a polymer loading of 10 mg/L. Control experiments were also performed with no adsorbent and reported removal percentages are corrected for any losses observed during the control experiments. All polymers were sieved with 230 mesh.

Impressively, the two derivatives of TFN-CDP+ (namely, MB-1-036 and MB-1-037 made from 3 and 6 eq. of choline chloride, respectively) demonstrated the best removal performance of all polymers tested, with near complete removal of all PFASs in the panel. Over 30 min, MB-1-037 displayed effective removal of GenX and short-chain PFASs, in addition to PFOA and PFOS, presumably due to its higher quaternary ammonium loading (FIG. 2).

After performing initial screening under the panel study, removal assessments were narrowed to select polymers using a binary mixture of PFOA and PFOS (Table 10). In this specific task, all adsorption experiments were conducted with 0.5 ppb of PFOA and 1 ppb of PFOS at a polymer loading of 10 mg/L. Control experiments were performed with no adsorbent and all measurements were done in triplicate. Samples from each solution were taken for analysis at predetermined time points: 0, 0.5, 2, 4, 8, and 24 h. Polymers selected for these measurements were SL-1-010A (TDI), MB-1-036 (TFN+CC), and MB-1-037 (TFN+CC). All the polymers tested demonstrated great removal of PFOS over 24 h, but SL-1-010A (TDI) and two TFN-CDP+ derivatives displayed high removal (>90%) in only 30 min. As for removal of PFOA, even though SL-1-010A (TDI) showed similar performance to the panel study, MB-1-036 and MB-1-037 outperformed the other two polymers in terms of both kinetics and removal capacity over 24 h.

TABLE 10

Removal data of selected polymers for PFOA (0.5 ppb) and PFOS (1 ppb) mixture.

| | Crosslinker | 0.5 h | 2 h | 4 h | 8 h | 24 h |
|---|---|---|---|---|---|---|
| % Removal for PFOA | | | | | | |
| SL-1-010A | 2,4-TDI | 56% | 75% | 81% | 84% | 85% |
| MB-1-36 | TFN + CC | 93% | 98% | 99% | 99% | 99% |
| MB-1-37 | TFN + CC | 96% | 99% | 99% | 99% | 99% |

TABLE 10-continued

Removal data of selected polymers for PFOA (0.5 ppb) and PFOS (1 ppb) mixture.

| | Crosslinker | 0.5 h | 2 h | 4 h | 8 h | 24 h |
|---|---|---|---|---|---|---|
| % Removal for PFOS | | | | | | |
| SL-1-010A | 2,4-TDI | 90% | 96% | 97% | 98% | 98% |
| MB-1-36 | TFN + CC | 93% | 97% | 98% | 98% | 98% |
| MB-1-37 | TFN + CC | 95% | 98% | 98% | 99% | 99% |

Micropollutant Adsorption Studies

β-CD is known to form a stable inclusion complex with micropollutants. BPA and MO were chosen as model compounds to study the uptake of neutral and negatively charged micropollutants, respectively, for understanding the adsorption mechanism in choline chloride-modified TFN-CDP polymers. Furthermore, fitting the micropollutant adsorption data as a function of concentration to a Langmuir model (Equations 1 and 2) enables the determination of the thermodynamic parameters of the materials tested.

The single-site Langmuir model that considers homogeneous adsorption surface, is given as $$q_e = \frac{q_{max} \cdot K_L \cdot c_e}{1 + K_L \cdot c_e} \quad \text{(Equation 1)}$$

where $q_e$ (mg/g) is the amount of MP adsorbed per gram of adsorbent at equilibrium. $q_{max}$ (mg/g) is the maximum adsorption capacity of adsorbent at saturation, $K_L$ (L/mg) is the equilibrium constant and $c_e$ (mg/L or ppm) is the concentration at equilibrium. The dual-site Langmuir model that takes the two distinct adsorption sites into account, is given as $$q_e = \frac{q_{max,1} \cdot K_{L,1} \cdot c_e}{1 + K_{L,1} \cdot c_e} + \frac{q_{max,2} \cdot K_{L,2} \cdot c_e}{1 + K_{L,2} \cdot c_e} \quad \text{(Equation 2)}$$

where $q_e$ (mg/g) is the amount of MP adsorbed per gram of adsorbent at equilibrium. $q_{max,1}$ and $q_{max,2}$ (mg/g) are maximum adsorption capacities of adsorbent for each site at saturation, $K_{L,1}$ and $K_{L,2}$ (L/mg) are equilibrium constants and $c_e$ (mg/L or ppm) is the concentration at equilibrium. By fitting the experimental adsorption data using nonlinear regression, $q_{max}$ and $K_L$ parameters can be obtained. Single-site Langmuir model was determined to be suitable for fitting the BPA adsorption data, whereas MO adsorption data were best fitted using the dual-site model.

Figure 8:
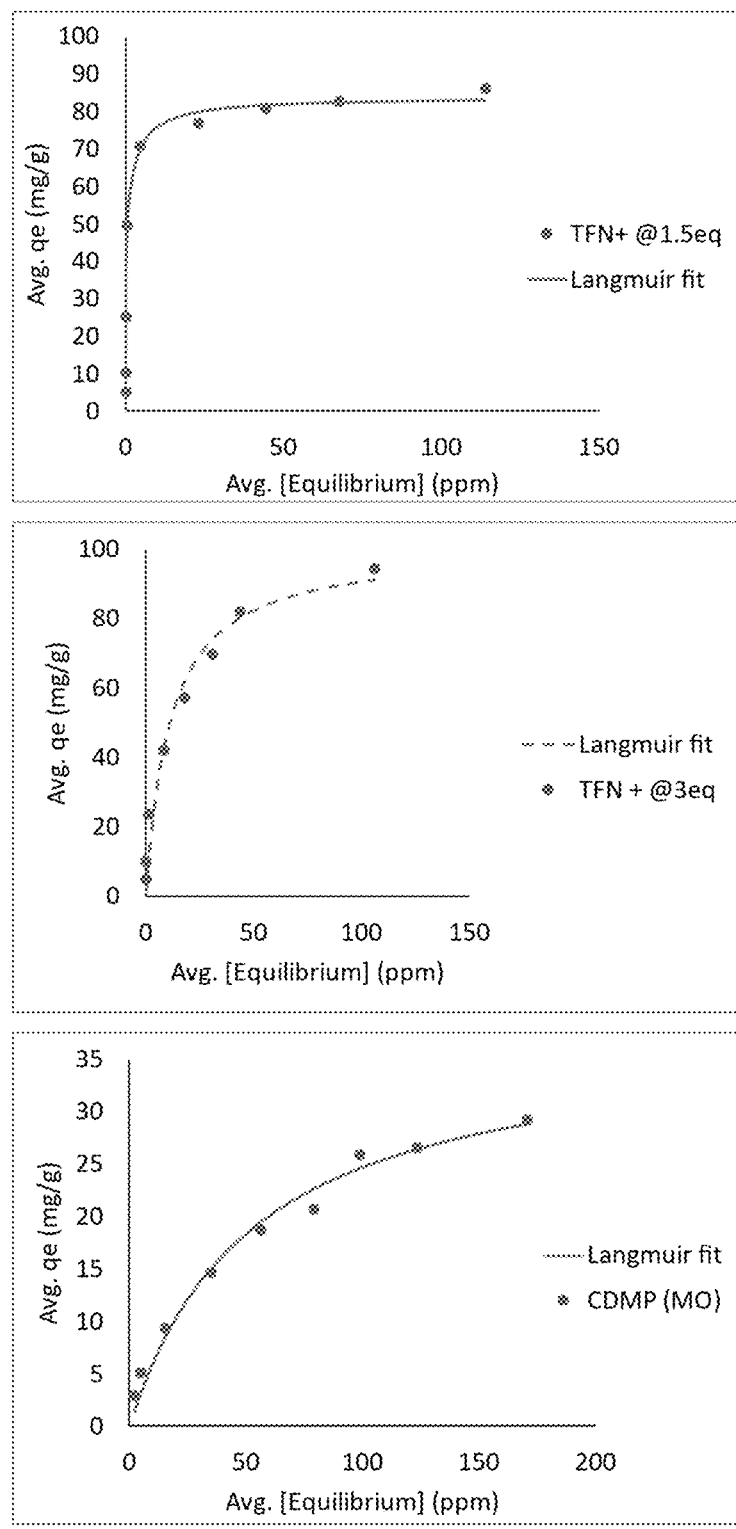
FIG. 8 shows MO uptake isotherms for modified TFN-CDP polymers with 1.5 (top) and 3.0 (middle) equivalents of choline chloride, and unmodified TFN-CDP (bottom). Dots represent the experimental data points and straight lines are the fitted curves using a Langmuir model.
Figure 9:
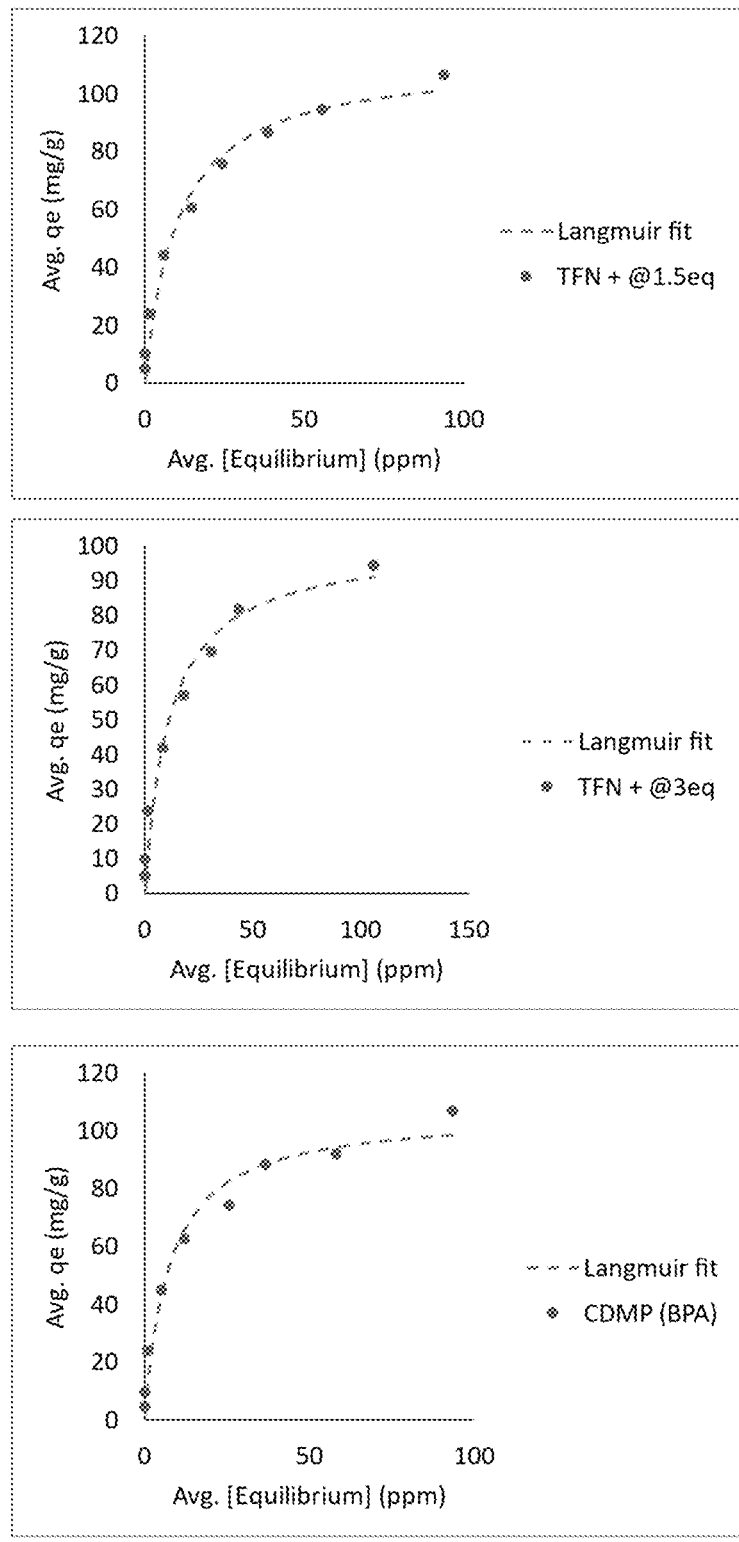
FIG. 9 shows BPA uptake isotherms for modified TFN-CDP polymers with 1.5 (top) and 3.0 (middle) equivalents of choline chloride, and unmodified TFN-CDP (bottom). Dots represent the experimental data points and straight lines are the fitted curves using a Langmuir model.

For choline chloride-modified TFN-CDP polymers, maximum MO capacities ($q_{max,1}$) of 46.6 and 78.8 mg/g were found for polymers made with 1.5 and 3.0 equivalents of choline chloride, respectively, for the first adsorption site (Table 11; FIG. 8). The second adsorption site ($q_{max,2}$) displayed maximum uptake capacities of 37.3 and 33.0 mg/g, both of which are quite similar to the maximum capacity of unmodified TFN-CDP ($q_{max}$=37.6 mg/g). This data, as well as similarities between $K_L$ and $K_{L,2}$ values, suggests that the second adsorption site in choline chloride-modified TFN-CDP polymers is associated with MO adsorption within the CD cavity. The comparison between $K_{L,1}$ and $K_{L,2}$ values also indicates a significantly stronger first adsorption site which likely originates from the interaction of anionic MO molecules with quaternary ammonium sites. BPA adsorption data were fitted using a single-site Langmuir model and similar $K_L$ values were determined for all three polymers, indicating the presence of similar adsorption site for a neutral molecule. Maximum BPA capacities of 112.1 and 100.1 mg/g were found for the two choline chloride-modified TFN-CDP polymers and a capacity of 106.1 mg/g was determined for the unmodified TFN-CDP (Table 11; FIG. 9). Notably, these saturation uptake values are in good agreement with the density of CD sites in these polymers. This observation also suggests that BPA adsorption occurs within the cavity of CDs.

TABLE 11

Langmuir fitting parameters for BPA and MO adsorption

| Sample | MP | $q_{max,1}$ | $K_{L,1}$ | $q_{max,2}$ | $K_{L,2}$ | $R^2$ | [CD] (mmol/g) | [N⁺] (mmol/g) | Calc. $q_{max}$ for [CD] (mg/g) | Calc. $q_{max}$ for [N⁺] (mg/g) | Calc. total $q_{max}$ (mg/g) |
|---|---|---|---|---|---|---|---|---|---|---|---|
| MB-1-051 (1.5 eq CC) | MO | 46.6 | 27.9 | 37.3 | 0.37 | 0.9828 | 0.48 | 0.15 | 157 | 49 | 206 |
| MB-1-036 (3 eq CC) | MO | 78.8 | 54.4 | 33.0 | 0.19 | 0.9970 | 0.37 | 0.63 | 121 | 206 | 327 |

| Sample | MP | $q_{max}$ | $K_L$ | $R^2$ | [CD] (mmol/g) | Calc. $q_{max}$ for [CD] (mg/g) | Calc. total $q_{max}$ (mg/g) |
|---|---|---|---|---|---|---|---|
| TFN-CDP | MO | 37.6 | 0.02 | 0.9828 | 0.51 | 167 | 167 |
| MB-1-051 (1.5 eq CC) | BPA | 112.1 | 0.10 | 0.9711 | 0.48 | 109 | 109 |
| MB-1-036 (3 eq CC) | BPA | 100.6 | 0.09 | 0.9651 | 0.37 | 84 | 84 |
| TFN-CDP | BPA | 106.1 | 0.14 | 0.9714 | 0.51 | 116 | 116 |

Figure 10:
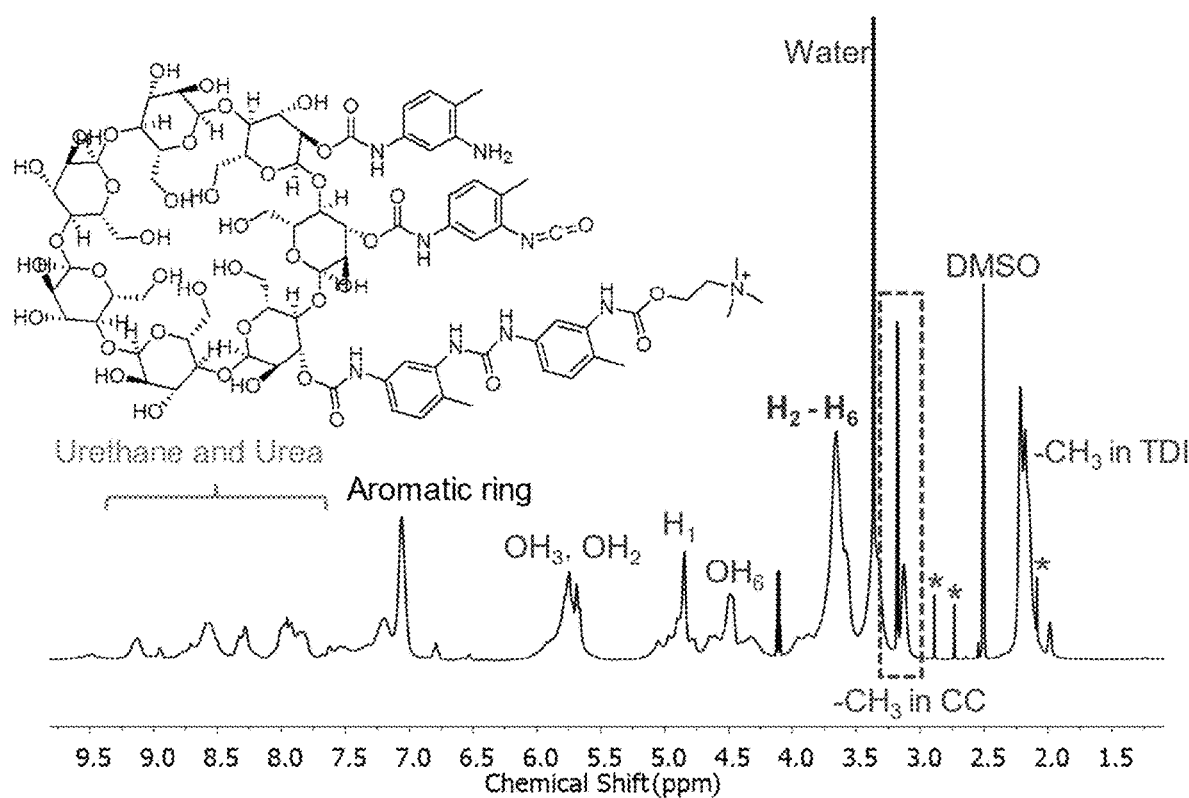
FIG. 10 shows a $^1$H NMR spectrum of a choline chloride-modified β-CD-TDI polymer made with 1:6:1 molar equivalents of β-CD:TDI:choline chloride.
Figure 11:
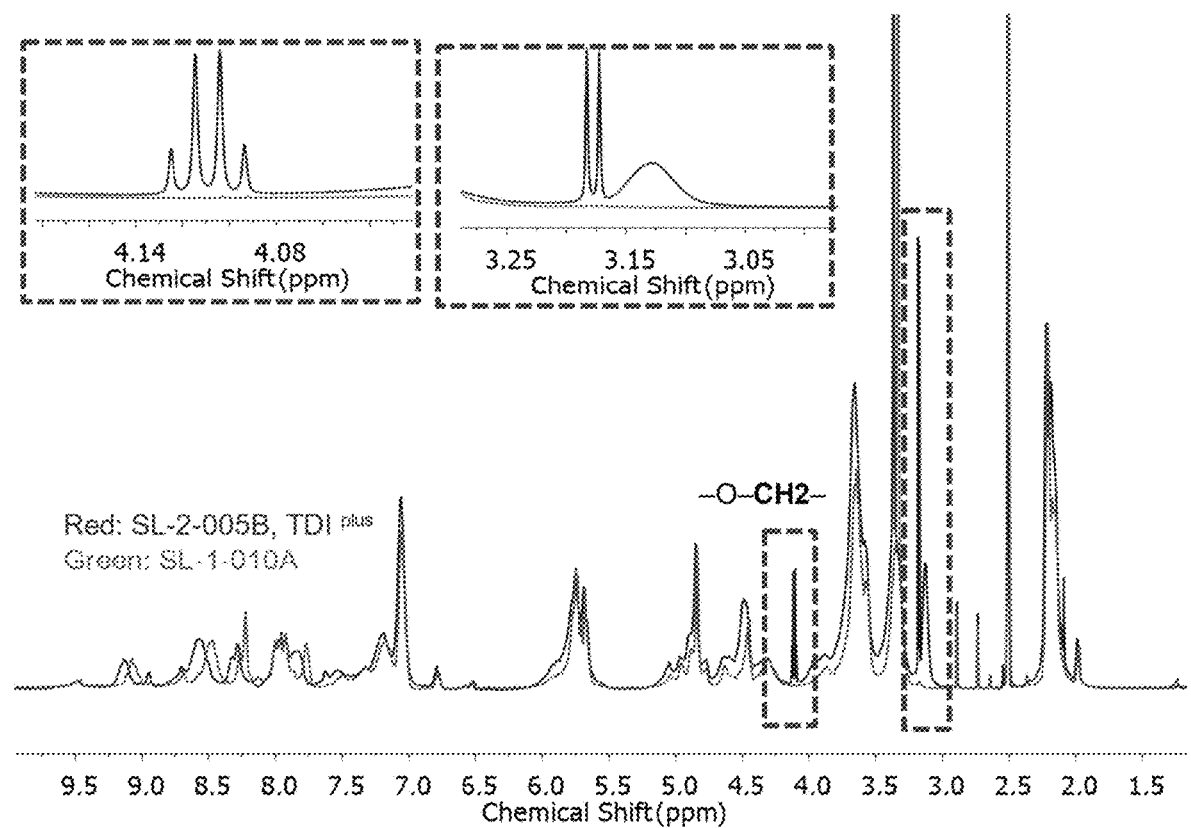
FIG. 11 shows a comparison of a choline chloride-modified β-CD-TDI polymer and a β-CD-TDI polymer.
Figure 12:
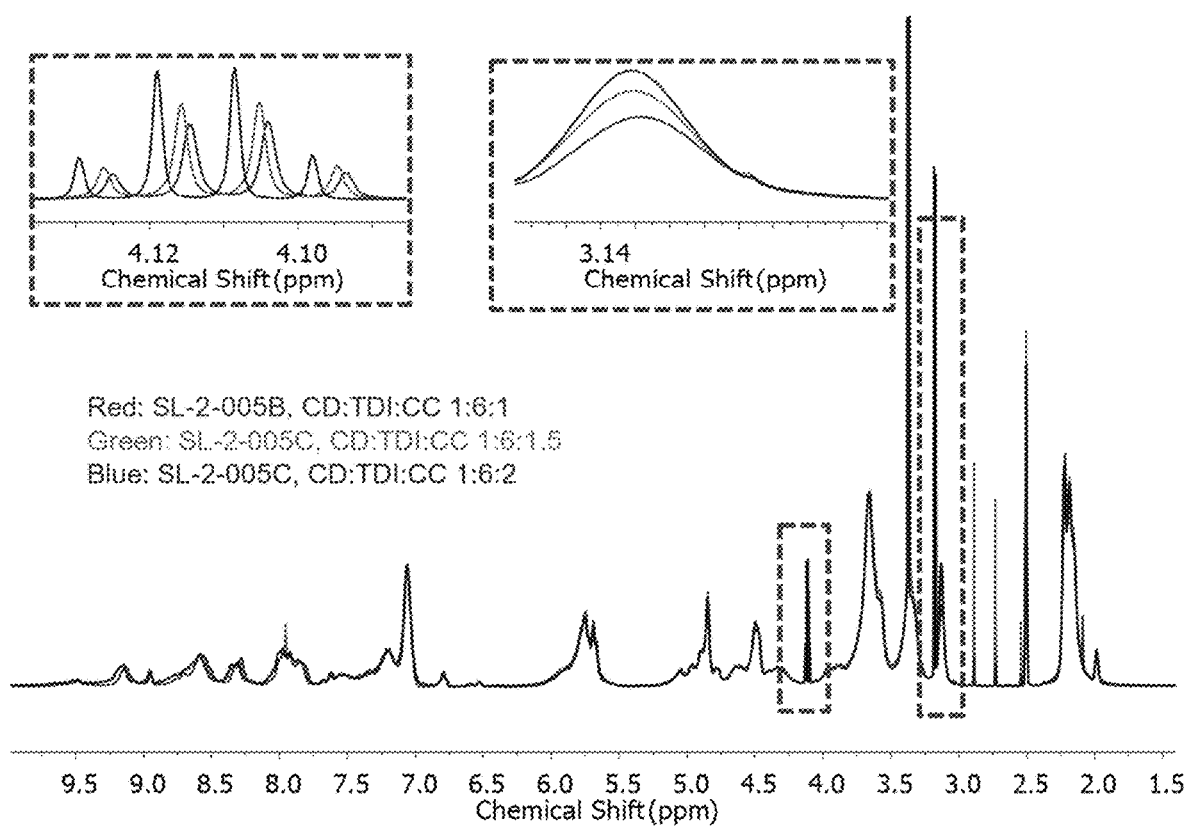
FIG. 12 shows a comparison between three choline chloride-modified β-CD-TDI polymers with different choline chloride loading amounts.

Example 4: Synthesis and PFAS Removal Activity of Choline Chloride-Modified β-CD-TDI Polymer β-CD (2 g, 1.76 mmol, 1 eq.) was dissolved in 5 mL DMF in a 20 mL scintillation vial equipped with a magnetic stir bar at a stir rate of 400 rpm and a temperature of 80° C. 4 g Choline chloride was dissolved in 10 mL DMSO at 80° C. to achieve a concentration of 0.4 g/mL. A variety of stoichiometric ratios of choline chloride solution ((0.3075 mL, 0.1230 g, 0.5 eq.), (0.6150 mL, 0.2460 g, 1 eq.), (0.9225 mL, 0.369 g, 1.5 eq.), or (1.2300 mL, 0.492 g, 2 eq.)) was added to the β-CD solution at 80° C. After mixing for 5 min at 80° C., toluene diisocyanate (2,4-TDI, 1.8417 g, 10.57 mmol, 6 eq.) was added subsequently. Air bubbling was observed after the diisocyanate addition, presumably due to the moisture in the reaction system. After about 1 min when bubbling subsided, the vial was capped. After 3 h, the reaction was stopped by adding 10 mL of methanol and turning off the heating. White powder product precipitated out after methanol addition. The mixture was transferred to a 50 mL polypropylene centrifuge tube. After centrifuging, the solvent was decanted and the crude product was washed with water (40 mL×2 times), and methanol (40 mL×2 times). In each wash cycle, the mixture was stirred for 30 min and followed by centrifuge. In the final cycle, the product in methanol was filtered under vacuum and dried at 80° C. overnight. FIG. 10 shows a $^1$H NMR spectrum of a choline chloride-modified β-CD-TDI polymer made with 1:6:1 molar equivalents of β-CD:TDI:choline chloride in 5 mL of DMF at 80° C. for 3 hours. The appearance of urethane and urea groups at 7.75-9.5 ppm indicates successful incorporation of choline chloride into the polymer. The following chemical shifts are also found in the $^1$H NMR spectrum: 6.75-7.75 ppm (protons from the aromatic ring in TDI); 5.5-6 μm (protons from —OH groups that are attached to C2 and C3 in β-CD); 4.8-5 ppm (protons that are attached to C1 in β-CD); 4.25-4.75 ppm (protons from —OH groups that are attached to C6 in β-CD); 4.1 ppm (protons from —O—CH2- groups in choline chloride); 3.5-4 ppm (protons that are attached to C2-C6 in β-CD); 3.3-3.5 ppm (protons from water); 3.1-3.2 ppm (protons from —CH3 groups in choline chloride); 2.5 ppm (DMSO); 1.9-2.1 ppm (protons from —CH3 groups in TDI); Peaks noted with star are from residual solvent. FIG. 11 shows a comparison of a choline chloride-modified β-CD-TDI polymer and a β-CD-TDI polymer, with the key difference being the broad peak centered around 3.13 ppm. Sharp peaks at 4.1 ppm and 3.1-3.2 ppm originates from unreacted choline chloride. FIG. 12 shows a comparison between three choline chloride-modified β-CD-TDI polymers with different choline chloride loading amounts, which supports the position that with increasing amount of choline chloride, the peak intensity increases at 3.13 ppm.

Figure 13:
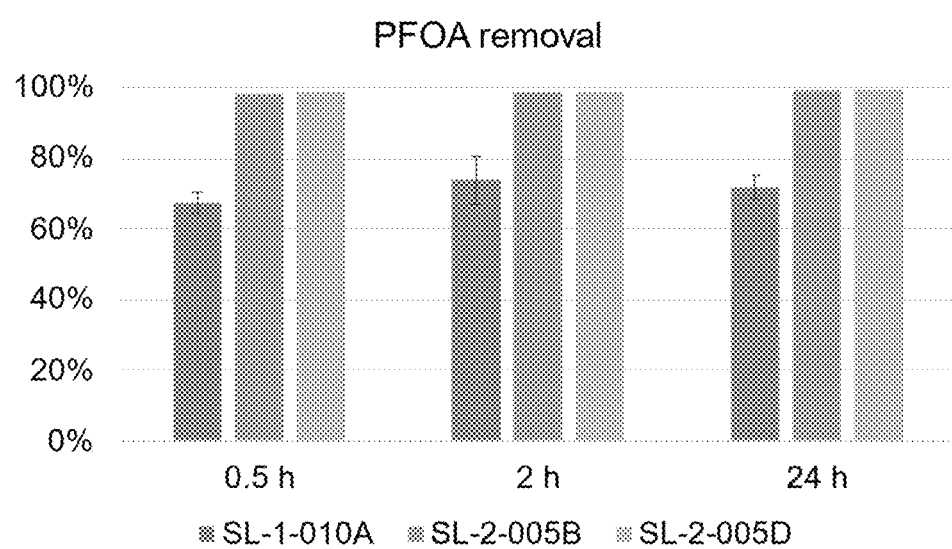
FIG. 13 shows PFOA uptake of choline chloride-modified β-CD-TDI polymers.

In accordance with the synthetic procedure outlined above, a variety of polymers were made with varying stoichiometric equivalents as shown below in Table 12. Furthermore, the polymers were tested for their PFOA uptake. The results show that by incorporating choline chloride into a R-CD-TDI polymer, cationic charge can be added to the polymer in a controlled fashion, resulting in PFOA uptake increasing from 70% to 99% when compared to SL-1-010A polymer (Table 12). See also FIG. 13.

TABLE 12

Synthesis of choline chloride-modified β-CD-TDI polymers

| Material | β-CD:TDI:CC ratio | Solvent | T (° C.) | Time | Yield | PFOA uptake* | Notes |
|---|---|---|---|---|---|---|---|
| SL-2-004E | 1:6:0 | DMF | 80 | 3 h | n/a | n/a | Gel |
| SL-2-005A | 1:6:0.5 | DMF | 80 | 3 h | n/a | n/a | Gel |
| SL-2-005B | 1:6:1 | DMF | 80 | 3 h | 73% | 98% | |
| SL-2-005C | 1:6:1.5 | DMF | 80 | 3 h | 73% | 99% | |
| SL-2-005D | 1:6:2 | DMF | 80 | 3 h | 60% | 99% | |

*500 ppt PFOA/1000 ppt PFOS, 10 mg/L polymer loading at 0.5 h.

EQUIVALENTS

While the present invention has been described in conjunction with the specific embodiments set forth above, many alternatives, modifications and other variations thereof will be apparent to those of ordinary skill in the art. All such alternatives, modifications and variations are intended to fall within the spirit and scope of the present invention.

REFERENCES (1) Richardson, S. D.; Ternes, T. A. *Anal. Chem.* 2018, 90, 398-428.
(2) Carpenter, C. M. G.; Helbling, D. E. *Environ. Sci. Technol.* 2018, 52, 6187-6196.
(3) Barry, V. Winquist, A. Steenland, K. *Environ. Health Perspect.* 2013, 121, 1313-1318.
(4) Gallo, V.; Leonardi, G.; Genser, B.; Lopez-Espinosa, M.-J.; Frisbee, S. J.; Karlsson, L.; Ducatman, A. M.; Fletcher, T. *Environ. Health Perspect.* 2012, 120, 655-660.
(5) Melzer, D.; Rice, N.; Depledge, M. H.; Henley, W. E.; Galloway, T. S. *Environ. Health Perspect.* 2010, 118, 686-692.
(6) DeWitt, J. C. Dietert, R. R., Ed.; Molecular and Integrative Toxicology; Springer International Publishing. Cham, 2015.
(7) Diamanti-Kandarakis, E.; Bourguignon, J.-P.; Giudice, L. C.; Hauser, R.; Prins, G. S.; Soto, A. M.; Zoeller, R. T.; Gore, A. C. *Endocr. Rev.* 2009, 30, 293-342.
(8) Vajda, A. M.; Barber, L. B.; Gray, J. L.; Lopez, E. M.; Woodling, J. D.; Norris, D. O. *Environ. Sci. Technol.* 2008, 42, 3407-3414.
(9) Tetreault, G. R.; Bennett, C. J.; Shires, K.; Knight, B.; Servos, M. R.; McMaster, M. E. *Aquat. Toxicol.* 2011, 104, 278-290.
(10) Gagné, F.; Bouchard, B.; Andre, C.; Farcy, E.; Fournier, M. *Comp. Biochem. Physiol. —C Toxicol. Pharmacol.* 2011, 153, 99-106.
(11) Alsbaiee, A.; Smith, B. J.; Xiao, L.; Ling, Y.; Helbling, D. E.; Dichtel, W. R. *Nature* 2016, 529, 190-194.
(12) Alzate-Sánchez, D. M.; Smith, B. J.; Alsbaiee, A.; Hinestroza, J. P.; Dichtel, W. R. *Chem. Mater.* 2016, 28, 8340-8346.
(13) Ling, Y.; Klemes, M. J.; Xiao, L.; Alsbaiee, A.; Dichtel, W. R.; Helbling, D. E. *Environ. Sci. Technol.* 2017, 51, 7590-7598.
(14) Xiao, L.; Ling, Y.; Alsbaiee, A.; Li, C.; Helbling, D. E.; Dichtel, W. R. *J. Am. Chem. Soc.* 2017, 139, 7689-7692.
(15) Ji, W.; Xiao, L.; Ling, Y.; Ching, C.; Matsumoto, M.; Bisbey, R. P.; Helbling, D. E.; Dichtel, W. R. *J. Am. Chem. Soc.* 2018, 140, 12677-12681.
(16) Klemes, M. J.; Ling, Y.; Chiapasco, M.; Alsbaiee, A.; Helbling, D. E.; Dichtel, W. R. *Chem. Sci.* 2018, 9, 8883-8889.
(17) Li, C.; Klemes, M. J.; Dichtel, W. R.; Helbling, D. E. *J. Chromatogr. A* 2018, 1541, 52-56.
(18) D'Agostino, L. A.; Mabury, S. A. *Environ. Sci. Technol.* 2017, 51, 13603-13613.
(19) Barzen-Hanson, K. A.; Roberts, S. C.; Choyke, S.; Oetjen, K.; McAlees, A.; Riddell, N.; McCrindle, R.; Ferguson, P. L.; Higgins, C. P.; Field, J. A. *Environ. Sci. Technol.* 2017, 51, 2047-2057.
(20) Breysse, P. N. *U.S. Department of Health and Human Services: Agency for Toxic Substances and Disease Registry: Toxicological profile for Perfluoroalkyls.* 2018.
(21) Hu, X. C.; Andrews, D. Q.; Lindstrom, A. B.; Bruton, T. A.; Schaider, L. A.; Grandjean, P.; Lohmann, R.; Carignan, C. C.; Blum, A.; Balan, S. A.; et al. *Environ. Sci. Technol. Lett.* 2016, 3, 344-350.
(22) Kannan, K.; Corsolini, S.; Falandysz, J.; Fillmann, G.; Kumar, K. S.; Loganathan, B. G.; Mohd, M. A.; Olivero, J.; Van Wouwe, N.; Yang, J. H.; et al. *Environ. Sci. Technol.* 2004, 38, 4489-4495.
(23) Sun, M.; Arevalo, E.; Strynar, M.; Lindstrom, A.; Richardson, M.; Kearns, B.; Pickett, A.; Smith, C.; Knappe, D. R. U. *Environ. Sci. Technol. Lett.* 2016, 3, 415-419.

(24) Eschauzier, C.; Beerendonk, E.; Scholte-Veenendaal, P.; De Voogt, P. *Environ. Sci. Technol.* 2012, 46, 1708-1715.
(25) Xiao, L.; Ching, C.; Ling, Y.; Nasiri, M.; Klemes, M. J.; Reineke, T. M.; Helbling, D. E.; Dichtel, W. R. (*Submitted to Chem. Mater.* December 2018) 2019, 1-9.
(26) Mason, C. R.; Maynard-Atem, L.; Heard, K. W. J.; Satilmis, B.; Budd, P. M.; Friess, K.; Lanč, M.; Bernardo, P.; Clarizia, G.; Jansen, J. C. *Macromolecules* 2014, 47, 1021-1029.
(27) Vojkovsk, T. *Pept. Res.* 1995, 8, 236-237.
(28) Mařík, J.; Song, A.; Lam, K. S. *Tetrahedron Lett.* 2003, 44, 4319-4320.
(29) Buckley, D.; Henbest, H. B.; Slade, P. *J. Chem. Soc.* 1957, 4891, 4891.

The invention claimed is:

1. A porous polymeric material comprising a plurality of cyclodextrins crosslinked with a plurality of polyisocyanate crosslinkers, wherein one or more of the plurality of cyclodextrins are bound to a linker of formula (I):

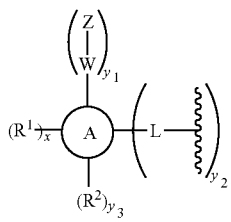

wherein
A is an aryl or heteroaryl moiety;
each $R^1$ is independently selected from the group consisting of H, $C_1$-$C_6$ alkyl, $C_1$-$C_3$ haloalkyl, aryl, heteroaryl, —$CF_3$, —$SO_3H$, —CN, —$NO_2$, —$NH_2$, —NCO, —$C(O)_2R^3$, —$C(O)N(R^3)_2$, and -halogen;
each $R^2$ is independently H, —OH, —O-metal cation, alkyl, aryl, heteroaryl, —SH, —S-metal cation, —S-alkyl, —$C(O)_2H$, or —$C(O)NH_2$;
each $R^3$ is independently —H, —$C_1$-$C_6$ alkyl, —$C_1$-$C_3$ haloalkyl, -aryl, —$C(O)N(R^a)(R^b)$, —$C(O)R^c$, —$CO_2R^c$, —$SO_2N(R^a)(R^b)$, or —$SOR^c$, wherein each $R^a$, $R^b$, and $R^c$ is independently H, or $C_1$-$C_6$ alkyl;
each W is independently a bond, an alkylene group, an arylene group, a heteroarylene group, —O-arylene-, —$(CH_2)_a$-arylene-, —$SO_2$-arylene-, —NH-arylene-, —S-arylene-, —O— heteroarylene-, —$(CH_2)_a$-heteroarylene-, —$SO_2$-heteroarylene-, —NH-heteroarylene-, —S— heteroarylene-, —(—O—$(CH_2)_a$—)$_x$—, —(—NH—$(CH_2)_a$—)$_x$—, —(—S—$(CH_2)_a$—)$_x$—,

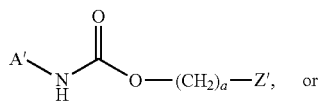

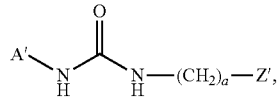

wherein a is 0-100 and x is 1-100, and each arylene or heteroarylene moiety can be substituted or unsubstituted;
each Z is an anionic moiety;
each L is

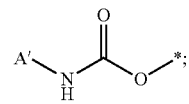

A' is a covalent bond to A;
Z' is a covalent bond to Z;
* is a covalent bond to {;
{ is a point of attachment to the plurality of cyclodextrin carbon atoms;
x is 0-8;
$y_1$ is 1-4;
$y_2$ is 1-4; and
$y_3$ is 0-4.

2. The porous polymeric material of claim 1, wherein each Z is

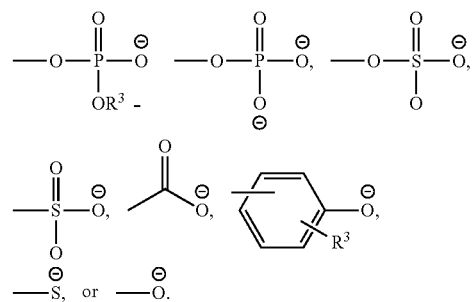

3. The porous polymeric material of claim 1, wherein each cyclodextrin is selected from the group consisting of α-cyclodextrin, β-cyclodextrin, γ-cyclodextrin, and combinations thereof.

4. The porous polymeric material of claim 1, wherein x and $y_3$ are each 0.

5. The porous polymeric material of claim 1, wherein the aryl moiety is

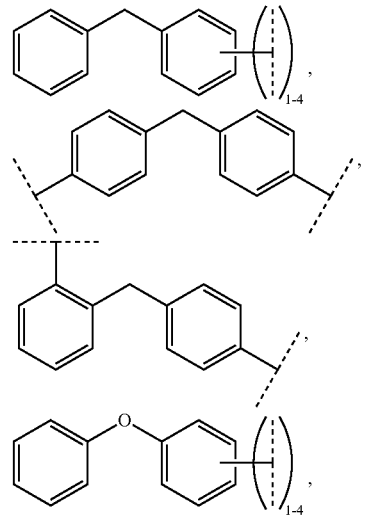

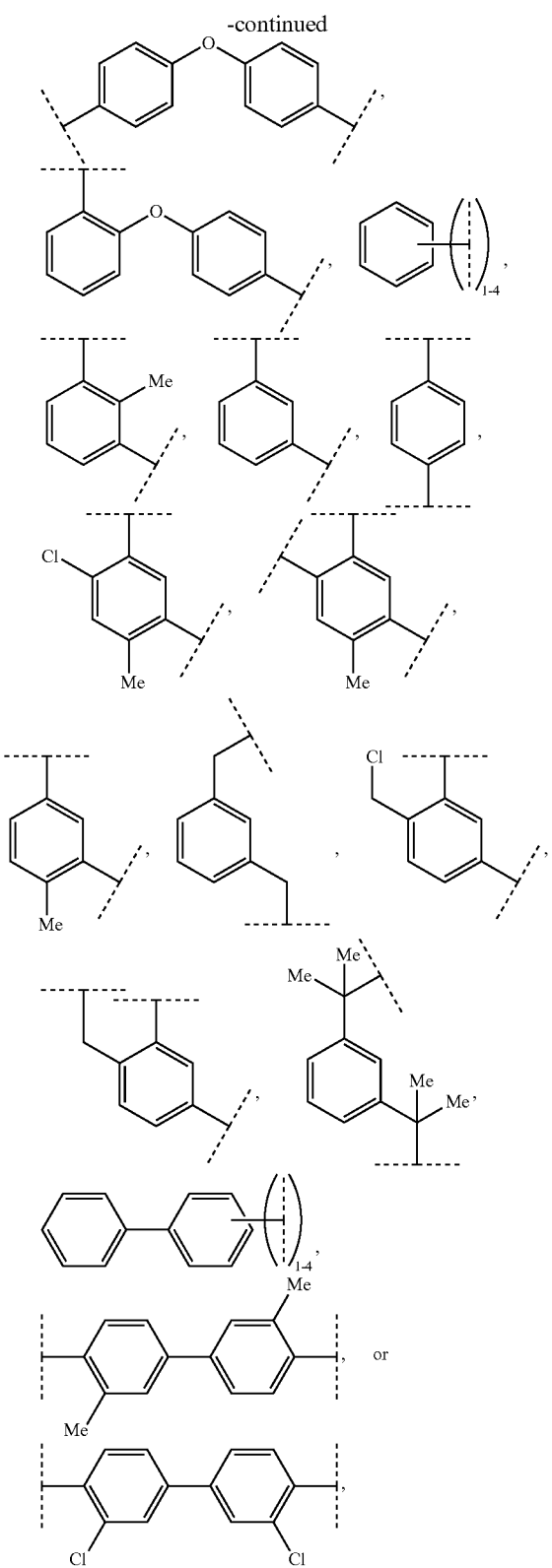

wherein ┊ represents any of the substituents attached to A in formula (I).

6. The porous polymeric material of claim 5, wherein the aryl diisocyanate crosslinker is 4,4'-methylene diphenyl diisocyanate, the aryl moiety is

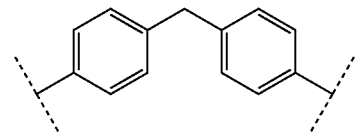

and x and $y_3$ are each 0.

7. The porous polymeric material of claim 6, wherein each cyclodextrin is a β-cyclodextrin.

8. The porous polymeric material of claim 5, wherein the aryl diisocyanate crosslinker is toluene 2,4-diisocyanate, the aryl moiety is

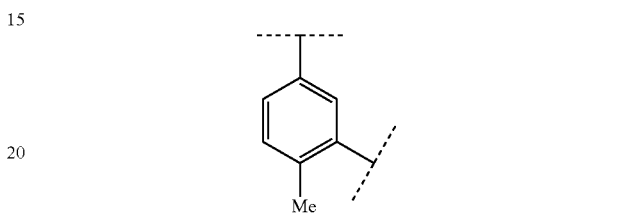

and x and $y_3$ are each 0.

9. The porous polymeric material of claim 8, wherein each cyclodextrin is a β-cyclodextrin.

10. The porous polymeric material of claim 1, wherein the porous polymeric material has a surface area from about 10 m²/g to about 2,000 m²/g.

11. A method of purifying a fluid sample comprising one or more pollutants, the method comprising contacting the fluid sample with the porous polymeric material of claim 1, whereby at least 50 wt. % of the total amount of the one or more pollutants in the fluid sample is adsorbed by the porous polymeric material.

12. A method of purifying a fluid sample comprising one or more pollutants, the method comprising contacting the fluid sample with the porous polymeric material of claim 7, whereby at least 50 wt. % of the total amount of the one or more pollutants in the fluid sample is adsorbed by the porous polymeric material.

13. A porous polymeric material comprising a plurality of cyclodextrins crosslinked with a plurality of acid chloride-containing crosslinkers or ester-containing crosslinkers, wherein one or more of the plurality of cyclodextrins are bound to a linker of formula (I):

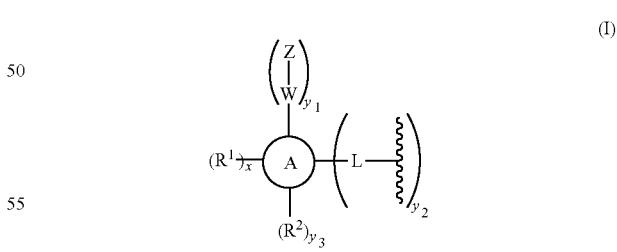

wherein
A is an aryl or heteroaryl moiety;
each $R^1$ is independently selected from the group consisting of H, $C_1$-$C_6$ alkyl, $C_1$-$C_3$ haloalkyl, aryl, heteroaryl, —$CF_3$, —$SO_3H$, —CN, —$NO_2$, —$NH_2$, —NCO, —C(O)$_2R^3$, —C(O)N($R^3$)$_2$, and -halogen;
each $R^2$ is independently H, —OH, —O-metal cation, alkyl, aryl, heteroaryl, —SH, —S-metal cation, —S-alkyl, —C(O)$_2$H, or —C(O)$NH_2$;

each R³ is independently —H, —C₁-C₆ alkyl, —C₁-C₃ haloalkyl, -aryl, —C(O)N(Rᵃ)(Rᵇ), —C(O)Rᶜ, —CO₂Rᶜ, —SO₂N(Rᵃ)(Rᵇ), or —SORᶜ, wherein each Rᵃ, Rᵇ, and Rᶜ is independently H, or C₁-C₆ alkyl;

each W is independently a bond, an alkylene group, an arylene group, a heteroarylene group, —O-arylene-, —(CH₂)ₐ-arylene-, —SO₂-arylene-, —NH-arylene-, —S-arylene-, —O— heteroarylene-, —(CH₂)ₐ-heteroarylene-, —SO₂-heteroarylene-, —NH-heteroarylene-, —S— heteroarylene-, —(—O—(CH₂)ₐ—)ₓ—, —(—NH—(CH₂)ₐ—)ₓ—, —(—S—(CH₂)ₐ—)ₓ—,

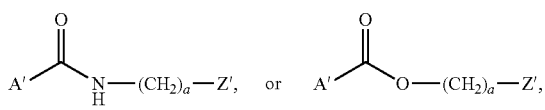

wherein a is 0-100 and x is 1-100, and each arylene or heteroarylene moiety can be substituted or unsubstituted;

each Z is a cationic or anionic moiety;

each L is

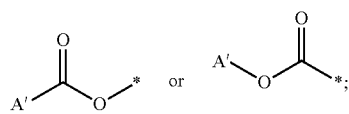

A' is a covalent bond to A;
Z' is a covalent bond to Z;
* is a covalent bond to ⦃;
⦃ is a point of attachment to the plurality of cyclodextrin carbon atoms;
x is 0-8;
y₁ is 1-4;
y₂ is 1-4; and
y₃ is 0-4.

14. The porous polymeric material of claim 13, wherein each Z is an anionic moiety and the anionic moiety is

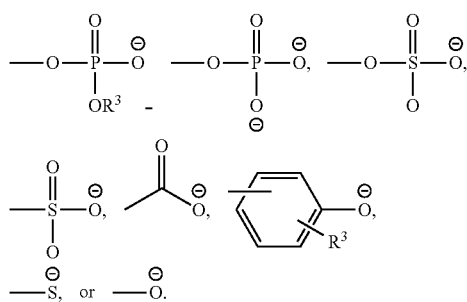

15. The porous polymeric material of claim 13, wherein each Z is a cationic moiety and the cationic moiety is —N(R³)₃⁺, —P(R³)₃⁺, —S(R³)₂⁺, or -Heteroaryl⁺.

16. The porous polymeric material of claim 15, wherein each cationic moiety is —N(R³)₃⁺.

17. The porous polymeric material of claim 15, wherein each cationic moiety is —N(Me)₃⁺.

18. The porous polymeric material of claim 13, wherein each cyclodextrin is selected from the group consisting of α-cyclodextrin, β-cyclodextrin, γ-cyclodextrin, and combinations thereof.

19. The porous polymeric material of claim 13, wherein x and y₃ are each 0.

20. The porous polymeric material of claim 13, wherein the aryl moiety is

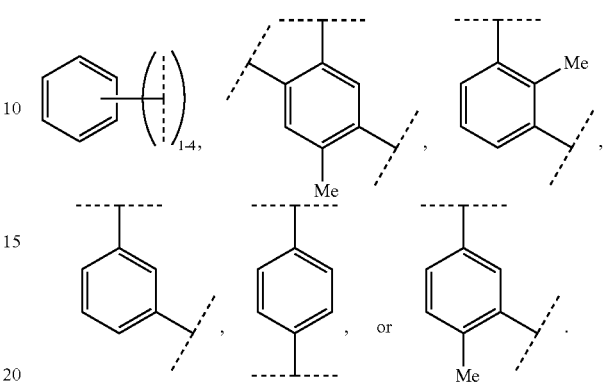

wherein ⦃ represents any of the substituents attached to A in formula (I).

21. The porous polymeric material of claim 20, wherein the aryl moiety is

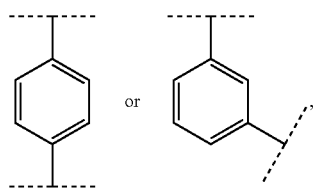

and x and y₃ are each 0.

22. The porous polymeric material of claim 21, wherein each cyclodextrin is a β-cyclodextrin.

23. The porous polymeric material of claim 20, wherein the aryl moiety is

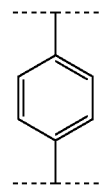

and x and y₃ are each 0.

24. The porous polymeric material of claim 23, wherein each cyclodextrin is a β-cyclodextrin.

25. The porous polymeric material of claim 20, wherein the aryl moiety is

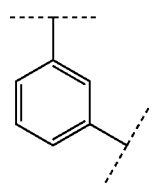

and x and y₃ are each 0.

26. The porous polymeric material of claim 25, wherein each cyclodextrin is a β-cyclodextrin.

27. The porous polymeric material of claim 13, wherein the porous polymeric material has a surface area from about 10 $m^2$/g to about 2,000 $m^2$/g.

28. A method of purifying a fluid sample comprising one or more pollutants, the method comprising contacting the fluid sample with the porous polymeric material of claim 13, whereby at least 50 wt. % of the total amount of the one or more pollutants in the fluid sample is adsorbed by the porous polymeric material.

29. A method of purifying a fluid sample comprising one or more pollutants, the method comprising contacting the fluid sample with the porous polymeric material of claim 24, whereby at least 50 wt. % of the total amount of the one or more pollutants in the fluid sample is adsorbed by the porous polymeric material.

30. A method of purifying a fluid sample comprising one or more pollutants, the method comprising contacting the fluid sample with the porous polymeric material of claim 26, whereby at least 50 wt. % of the total amount of the one or more pollutants in the fluid sample is adsorbed by the porous polymeric material.

* * * * *

UNITED STATES PATENT AND TRADEMARK OFFICE
CERTIFICATE OF CORRECTION

| | |
|---|---|
| PATENT NO. | : 11,512,146 B2 |
| APPLICATION NO. | : 17/481919 |
| DATED | : November 29, 2022 |
| INVENTOR(S) | : Barin et al. |

It is certified that error appears in the above-identified patent and that said Letters Patent is hereby corrected as shown below:

In the Specification

At Column 3, Line 1, replace "heteraoarylene" with --heteroarylene--

At Column 9, Line 58, replace "heteraoarylene" with --heteroarylene--

At Column 11, Lines 18-19, replace "heteraoarylene" with --heteroarylene--

In the Claims

At Claim 1, Column 51, Line 53, replace "heteraoarylene" with --heteroarylene--

At Claim 6, Column 53, Line 66, replace "aryl diisocyanate" with --polyisocyanate--

At Claim 8, Column 54, Line 12, replace "aryl diisocyanate" with --polyisocyanate--

At Claim 13, Column 55, Line 10, replace "heteraoarylene" with --heteroarylene--

Signed and Sealed this
Ninth Day of May, 2023

Katherine Kelly Vidal
*Director of the United States Patent and Trademark Office*